United States Patent
Ko et al.

(10) Patent No.: US 12,557,160 B2
(45) Date of Patent: Feb. 17, 2026

(54) METHOD AND WIRELESS COMMUNICATION TERMINAL FOR TRANSMITTING/RECEIVING DATA IN WIRELESS COMMUNICATION SYSTEM

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Sanghyun Kim, Seoul (KR); Jinsam Kwak, Gyeonggi-do (KR); Hanseul Hong, Seoul (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 311 days.

(21) Appl. No.: 18/118,067

(22) Filed: Mar. 6, 2023

(65) Prior Publication Data

US 2023/0284303 A1 Sep. 7, 2023

Related U.S. Application Data

(63) Continuation of application No. PCT/KR2021/012070, filed on Sep. 6, 2021.

(30) Foreign Application Priority Data

| Sep. 4, 2020 | (KR) | ................... | 10-2020-0112759 |
| Sep. 17, 2020 | (KR) | ................... | 10-2020-0119638 |
| Sep. 18, 2020 | (KR) | ................... | 10-2020-0120889 |

(51) Int. Cl.
*H04W 76/15* (2018.01)
*H04W 48/12* (2009.01)
*H04W 48/14* (2009.01)

(52) U.S. Cl.
CPC .......... *H04W 76/15* (2018.02); *H04W 48/12* (2013.01); *H04W 48/14* (2013.01)

(58) Field of Classification Search
None
See application file for complete search history.

(56) References Cited

U.S. PATENT DOCUMENTS

| 11,516,841 | B2 | 11/2022 | Lu et al. |
| 2019/0075549 | A1 | 3/2019 | Yucek et al. |

(Continued)

FOREIGN PATENT DOCUMENTS

| JP | 2016-25381 A | 2/2016 |
| KR | 10-2025179 | 9/2019 |

(Continued)

OTHER PUBLICATIONS

Rejection dated Mar. 25, 2025 for Japanese Patent Application No. 2023-515232 and its English translation provided by Applicant's foreign counsel.

(Continued)

*Primary Examiner* — Hong S Cho
(74) *Attorney, Agent, or Firm* — EIP US LLP

(57) ABSTRACT

Disclosed is a method by which a multi-link device (MLD) transmits a frame in a wireless communication system. A non-AP MLD can transmit, to an AP MLD, a probe request frame for association, and receive a beacon frame for the association from the AP MLD. Here, a plurality of links are configured for the AP MLD, and the plurality of links are composed of one basic link and at least one extended link and the beacon frame can be transmitted/received through the basic link.

14 Claims, 37 Drawing Sheets

(56) References Cited

U.S. PATENT DOCUMENTS

| | | | |
|---|---|---|---|
| 2019/0158413 A1* | 5/2019 | Patil | H04W 28/0838 |
| 2019/0297646 A1 | 9/2019 | Lou et al. | |
| 2020/0022070 A1 | 1/2020 | Yoshimura et al. | |
| 2020/0053773 A1 | 2/2020 | Seok et al. | |
| 2020/0221378 A1 | 7/2020 | Kneckt et al. | |
| 2021/0076413 A1* | 3/2021 | Lu | H04W 76/15 |
| 2023/0254802 A1* | 8/2023 | Kim | H04W 60/04 370/329 |

FOREIGN PATENT DOCUMENTS

| | | |
|---|---|---|
| WO | 2020/085997 A1 | 4/2020 |
| WO | 2022/050802 | 3/2022 |
| WO | 2022/263598 | 12/2022 |

OTHER PUBLICATIONS

Decision to Reject the Amendments dated Mar. 25, 2025 for Japanese Patent Application No. 2023-515232 and its English translation provided by Applicant's foreign counsel.

Extended European Search report dated Sep. 4, 2024 for European Patent Application No. 21 864 760.0.

Edward Au: "Draft P802.11be™M/D0.2 redline compared to D0.1. pdf", IEEE Draft WGDS; 942047952281, IEEE-SA Imeet Central, Piscataway, NJ USA, vol. 802.11—Editorial Nov. 2, 2019 (Nov. 2, 2019), p. 1, XP068241435, Retrieved from the Internet: URL: https://ieee-sa.imeetcentral.com/p/aQA.

Office Action dated Sep. 24, 2024 for Japanese Patent Application No. 2023-515232 and its English translation provided by Applicant's foreign counsel.

Edward AU: "Compendium of straw polls and potential changes to the Specification Framework Document", IEEE 802.11-20/0566r62, Aug. 2020, pp. 48, 52.

Office Action dated Aug. 11, 2023 for Indian Patent Application No. 202327016756.

International Search Report for PCT/KR2021/012070 mailed on Jan. 3, 2022 and its English translation from WIPO (now published as WO 2022/050802).

Written Opinion of the International Searching Authority for PCT/KR2021/012070 mailed on Jan. 3, 2022 and its English translation from WIPO (now published as WO 2022/050802).

Chitrakar, Rojan et al..: "Multi-Link Setup clarifications", IEEE 802.11-20/0751r0, Jun. 3, 2020, slides 1-18.

Lu, Kaiying et al.: "Multi-Link Operation and Channel Access Discussion", IEEE 802.11-19/1547r5, Apr. 20, 2020, slides 1-12.

Jinjing Jiang: "Operation with Non-STR AP", IEEE 802.11-20/755r1, May 2020, Slides 1-12.

Jinjing Jiang: "Terminology for Soft AP MLD", IEEE 802.11-20/1036r5, Jul. 2020, Slides 1-11.

Lu, Kaiying et al.: "MLO: Soft AP MLD Operation", IEEE 802.11-20/1407r14, Sep. 2020, pp. 1-3.

Office Action dated Mar. 25, 2024 for Japanese Patent Application No. 2023-515232 and its English translation provided by Applicant's foreign counsel.

Insun Jang (LG Electronics), Considerations for Multi-link Channel Access Without Simultaneous TX/RX Capability, IEEE 802.11-19/1917r1, IEEE, Internet<URL:https://mentor.ieee.org/802.11/dcn/ 11-19-1917-01-00be-considerations-for-multi-link-channel-access-without-simultaneous-tx-rx-capability.pptx>, Jan. 2020.

Rojan Chitrakar (Panasonic), Power Consideration for Multi-link Transmissions, IEEE 802.11-19/1536r2, IEEE, Internet<URL:https://mentor.ieee.org/802.11/dcn/19/11-19-1536-02 -00be-power-considerationfor-multi-link-transmissions.pptx > , 2019.

Yifan Zhou (Huawei), Simultaneous Tx/Rx Capability indication for multi-link operation, IEEE 802.11-19/1550r1, IEEE, Internet <URL:https://mentor.ieee.org/802.11/dcn/19/11-19 -1550-01-00be-simultaneous-tx-rx-capability-indication-for-multi-link-operation. pptx > , 2019.

European Office Action issued in 21864760.0 on Jul. 31, 2025, 7 pgs.

Vietnamese Office Action issued in 1-2023-02187 on Sep. 8, 2025, 4 pgs.

* cited by examiner

METHOD AND WIRELESS COMMUNICATION TERMINAL FOR TRANSMITTING/RECEIVING DATA IN WIRELESS COMMUNICATION SYSTEM

TECHNICAL FIELD

The present invention relates to a wireless communication system and, more specifically, to a communication method, device, and system for transmitting or receiving a frame in a multi-link operation including a wireless access point in which simultaneous transmission and reception is unavailable.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band. In IEEE 802.11be, techniques such as a 320 MHz bandwidth, a multi-link operation, a multi-access point (multi-AP) operation, and a retransmission operation (hybrid automatic repeat request (HARD)) have been proposed.

A multi-link operation may be performed in various forms according to an operation scheme and an implementation method thereof. In this case, a problem which has not been found in the conventional IEEE 802.11-based wireless LAN communication operation may occur, and thus a detailed operation method in the multi-link operation needs to be defined.

Meanwhile, this description on the related arts is written for understanding of the background of the present invention, and thus the contents other than conventional technologies already known to those skilled in the art to which the present disclosure belongs may be included in this description.

DISCLOSURE OF INVENTION

Technical Problem

The present disclosure is to provide a super-high speed wireless LAN service for new multimedia applications, as described above.

In addition, the present invention is to effectively perform a transmission and reception operation of a frame when a simultaneous transmission and reception operation is unavailable between multi-link devices (MLDs) corresponding to a set of logical entities.

In addition, the present invention is to transmit and receive frames for association only through a specific link among links formed between MLDs, in performing an operation for the association between the MLDs.

Technical tasks to be achieved in the specification are not limited to the technical tasks mentioned above, and other technical tasks that are not mentioned may be clearly understood by those skilled in the art on the basis of the following descriptions.

Solution to Problem

A multi-link device (MLD) in a wireless communication system includes a communication module and a processor configured to control the communication module, wherein the processor is configured to transmit a probe request frame for association to an AP MLD, and receive a beacon frame for the association from the AP MLD, multiple links are set up for the AP MLD, the multiple links include one basic link and at least one extended link, and the beacon frame is transmitted or received through the basic link.

In addition, in the present invention, a probe response frame is received as a response to the probe request frame through the basic link when the probe request frame is transmitted through the basic link.

In addition, in the present invention, the beacon frame and the response frame are received only through the basic link except for the at least one extended link.

In addition, in the present invention, a probe response frame corresponding to a response to the probe request frame is not received through the at least one extended link when the probe request frame is transmitted through the at least one extended link.

In addition, in the present invention, the non-AP MLD includes multiple stations (STAs), one of the multiple STAs constituting the non-AP MLD forms the basic link with one of multiple APs constituting the AP MLD, and STAs remaining after excluding the one of the multiple STAs constituting the non-AP MLD form the at least one extended link with APs remaining after excluding the one of the multiple APs constituting the AP MLD.

In addition, in the present invention, the basic link and the at least one extended link do not support simultaneous transmission and reception (STR) by the AP MLD, and the AP MLD corresponds to an NSTR soft AP MLD which forms, with one of multiple STAs constituting the non-AP MLD, the basic link for transmitting the beacon frame and a probe response frame as a response to the probe request frame.

In addition, in the present invention, when the AP MLD operates as an NSTR soft AP MLD, the number of links set up by the AP MLD is equal to or less than a specific number.

In addition, in the present invention, link information related to a link set up between the AP MLD and the non-AP MLD is received from the AP MLD, wherein the link information includes at least one of the number of the multiple links formed between the non-AP MLD and the AP MLD and a bitmap indicating whether each of the multiple links supports an STR operation.

In addition, in the present invention, PPDUs are transmitted to the AP MLD through the basic link and the at least one extended link, wherein transmission start time points of the PPDUs in the basic link and the at least one extended link are identical.

In addition, the present invention provides a method including: transmitting a probe request frame for association from an AP MLD; and receiving a beacon frame for the association from the AP MLD, wherein multiple links are set up for the AP MLD, the multiple links include one basic link and at least one extended link, and the beacon frame is transmitted or received through the basic link.

Advantageous Effects of Invention

According to an embodiment of the present invention, multi-link information can be effectively signaled.

In addition, according to an embodiment, in a contention-based channel access system, a total resource use rate can be increased, and performance of a wireless LAN system can be enhanced.

When an AP MLD including multiple wireless access points (APs) cannot perform a simultaneous transmission and reception (STR) operation for some or all APs, an STR available link and one of STR unavailable links are defined as basic links. The remaining links of the STR unavailable links are defined as extended links. In a case of a wireless LAN station (STA) not belonging to an MLD, association is allowed only in the STR available link or the basic link. In a case of an STA MLD including multiple STAs, association with an AP MLD is performed together with association in the basic link during association with an STR available AP. Accordingly, frame transmission through a backoff operation is performed only through the basic link or the STR available link. Here, when the STA MLD recognizes that another terminal performs frame transmission in the basic link, the STA MLD exceptionally performs the frame transmission through the backoff operation in an extended link which is extended from the basic link. Here, after the corresponding frame transmission, a simultaneous transmission-type multi-link operation is performed. The corresponding multi-link transmission operation is used, and thus a multi-link communication operation can be effectively performed and communication efficiency can be increased even though a reception MLD cannot perform a simultaneous transmission and reception operation while performing the multi-link simultaneous transmission operation.

The effects obtainable in the present invention are not limited to the above-mentioned effects, and other effects that are not mentioned may be clearly understood by those skilled in the art to which the present invention belongs, from descriptions below.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively. Hereinafter, in the present invention, a field and a subfield may be interchangeably used.

Figure 1:
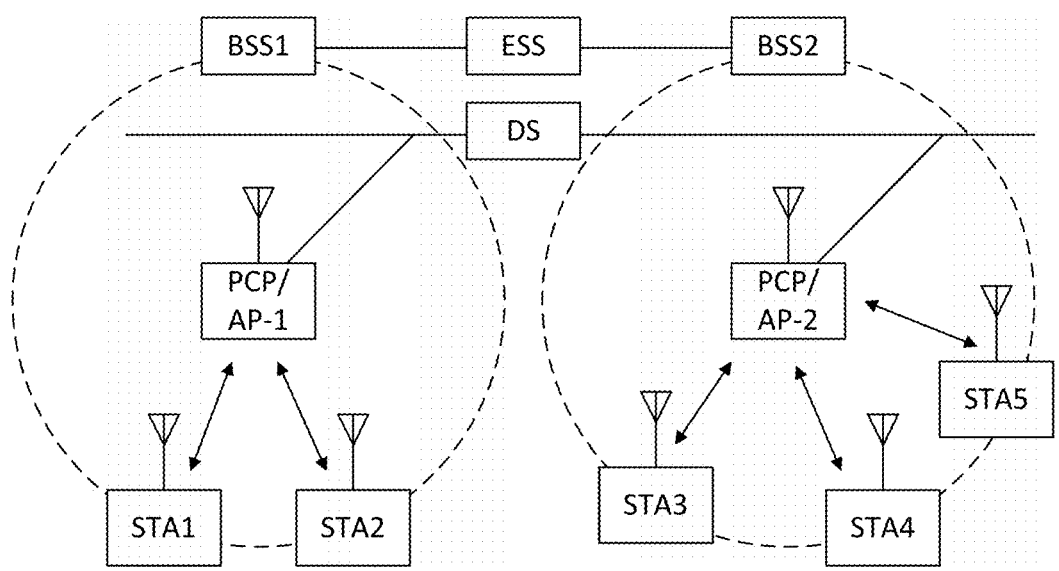
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
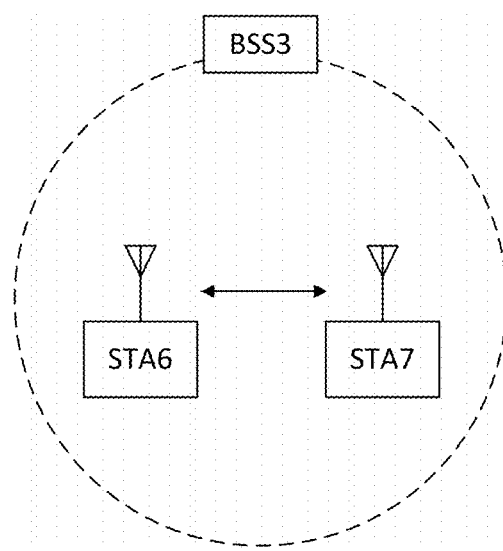
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
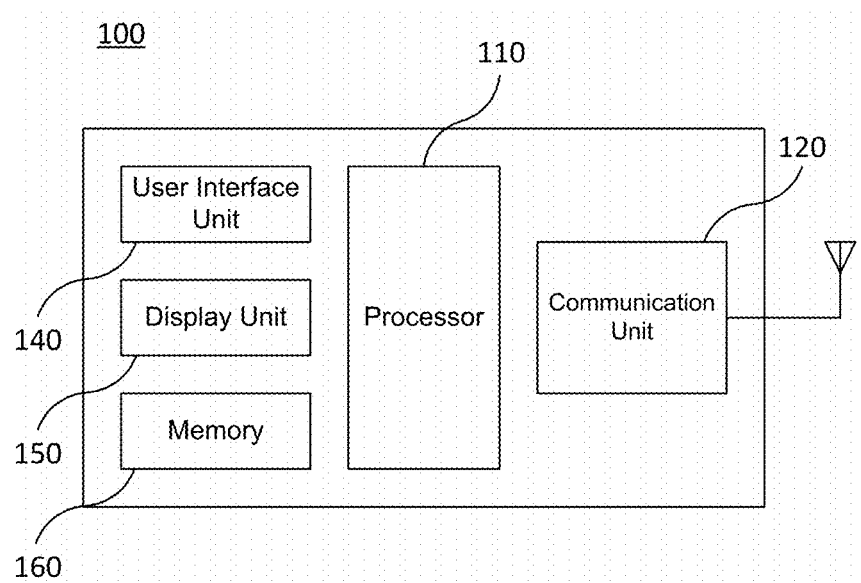
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
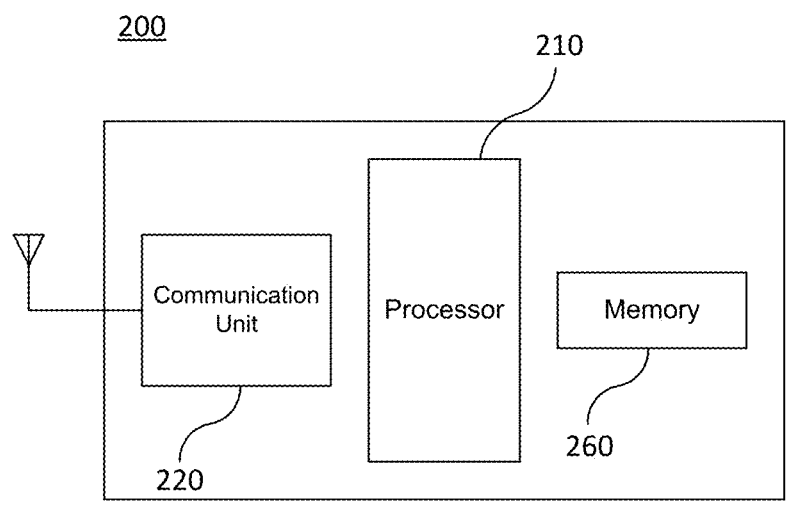
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
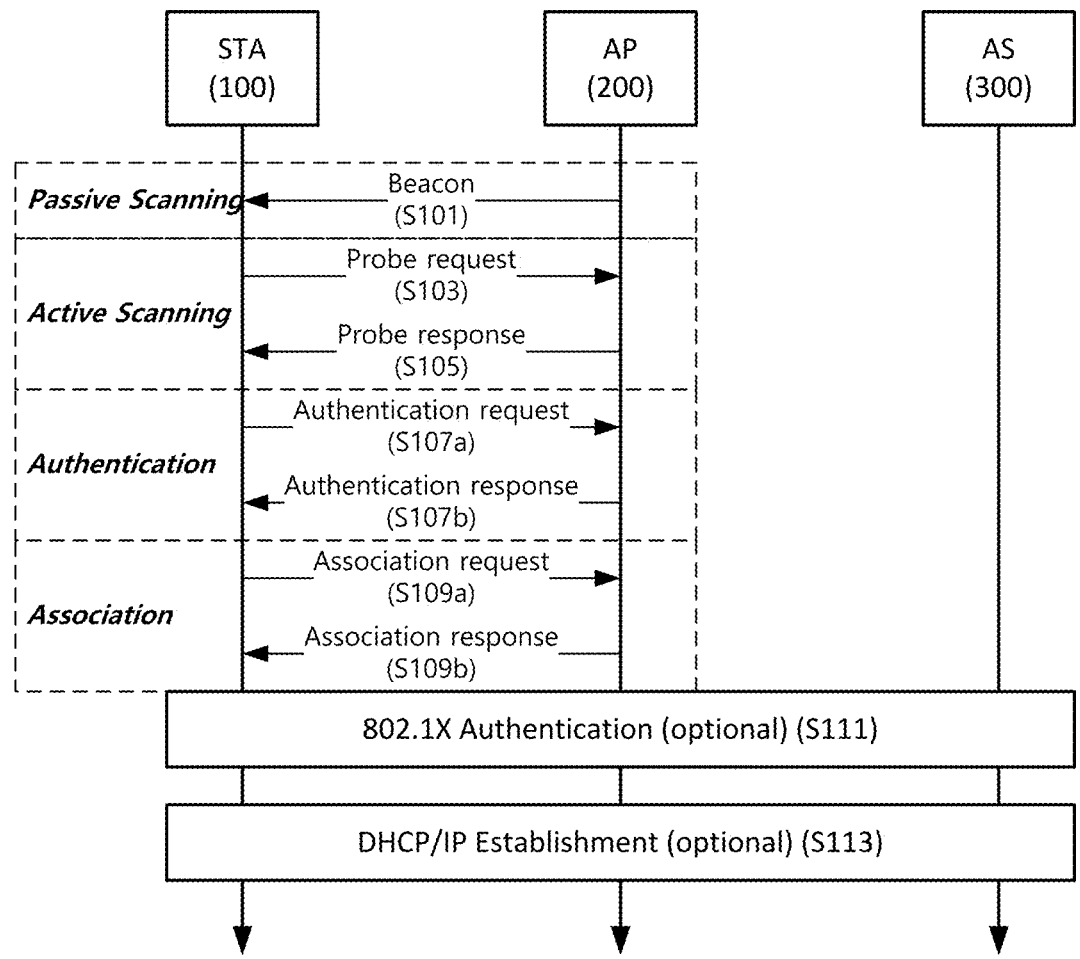
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b).

After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
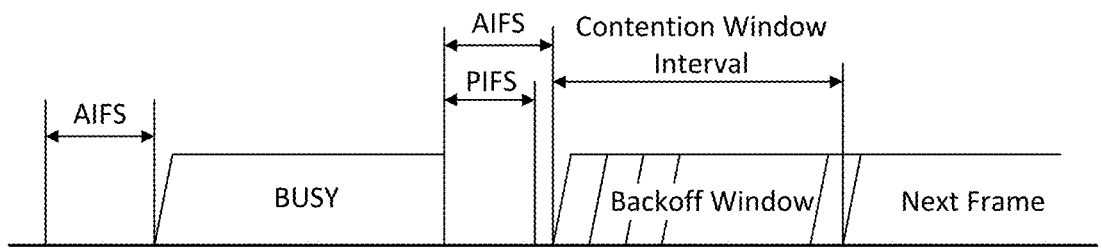
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, a terminal of the present disclosure is referred to as a non-AP STA, an AP STA, an AP, a STA, a receiving device or a transmitting device, but the present disclosure is not limited thereto. In addition, the AP STA of the present disclosure may be referred to as the AP.

<Examples of Various PPDU Formats>

Figure 7:
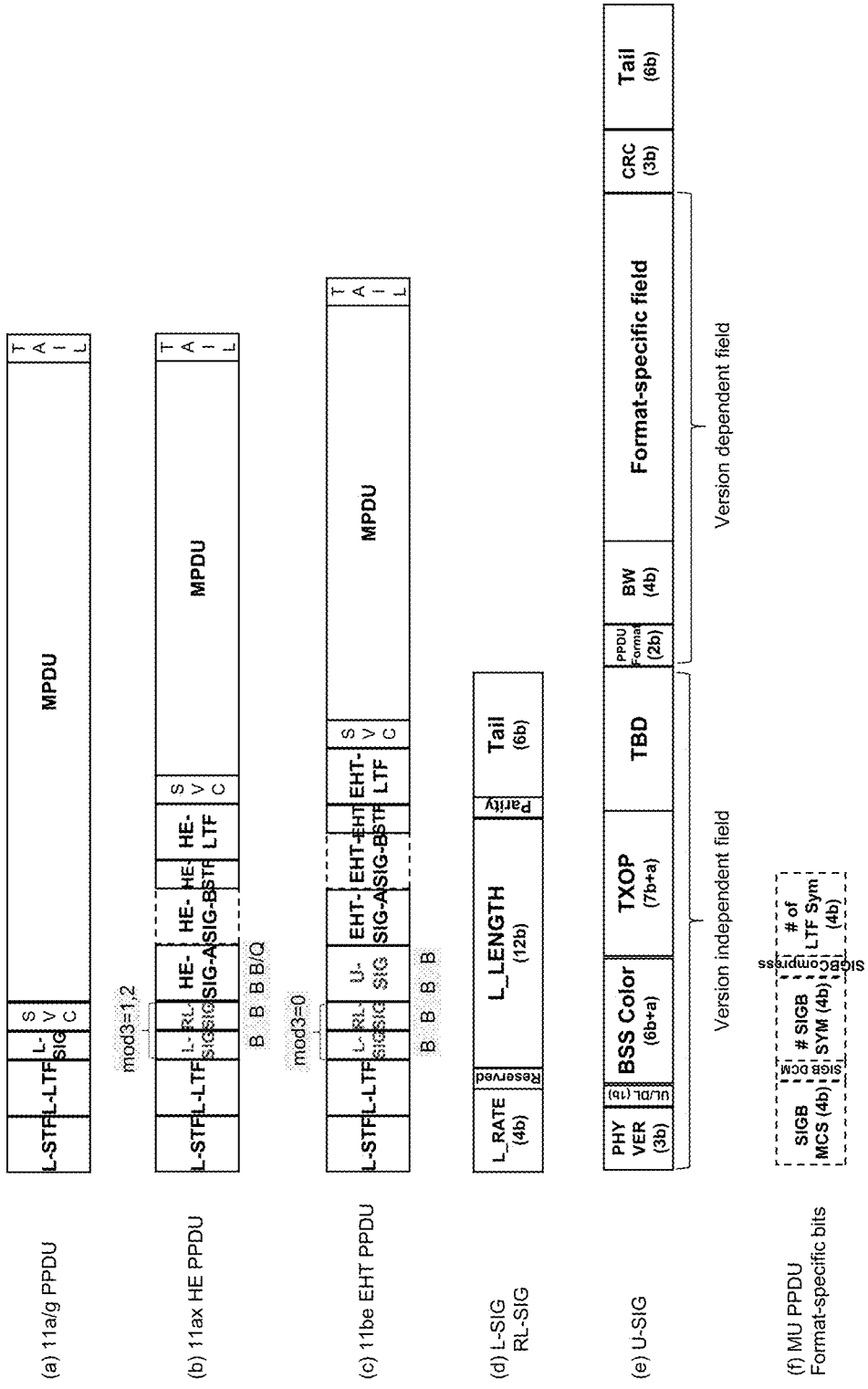
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of 1/2, 2/3, 3/4, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L_RATE field is configured to indicate 6 Mbps, 3 bytes during 4 us which is one symbol duration of 64 FET (i.e., 24 bits) may be transmitted. Therefore, the 64 FET standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration and then adding 20 us which is consumed to transmit the L-STF, the L-LTF, and the L-SIG, the length of a corresponding PPDU, i.e., a receipt time (RX-TIME) is acquired, which is expressed by Equation 1 below.

$$RXTIME(us) = \left(\left\lceil\frac{L\_LENGTH+3}{3}\right\rceil\right) \times 4 + 20 \quad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil\frac{TXTIME-20}{4}\right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME(us) = \qquad \text{[Equation 3]}$$

$$T_{L-STF} + T_{L-LTF} + T_{L-SIG} + T_{RL-SIG} + T_{U-SIG} + (T_{EHT-SIG-A}) +$$

$$(T_{EHT-SIG-B}) + T_{EHT-STF} + N_{EHT-LTF} \cdot T_{EHT-LTF} + T_{DATA}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating bits to signal a discontinuous channel type of single user transmission may act as excessively large signaling overhead in consideration of a low transmission rate of a signaling part.

The present disclosure suggests a signaling technique of a discontinuous channel type of the SU PPDU and illustrates the discontinuous channel type determined according to the suggested technique. In addition, the present disclosure suggests a signaling technique of a puncturing type of each of a primary 160 MHz and a secondary 160 MHz in 320 MHz BW configuration of the SU PPDU.

In addition, an embodiment of the present disclosure suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT-SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
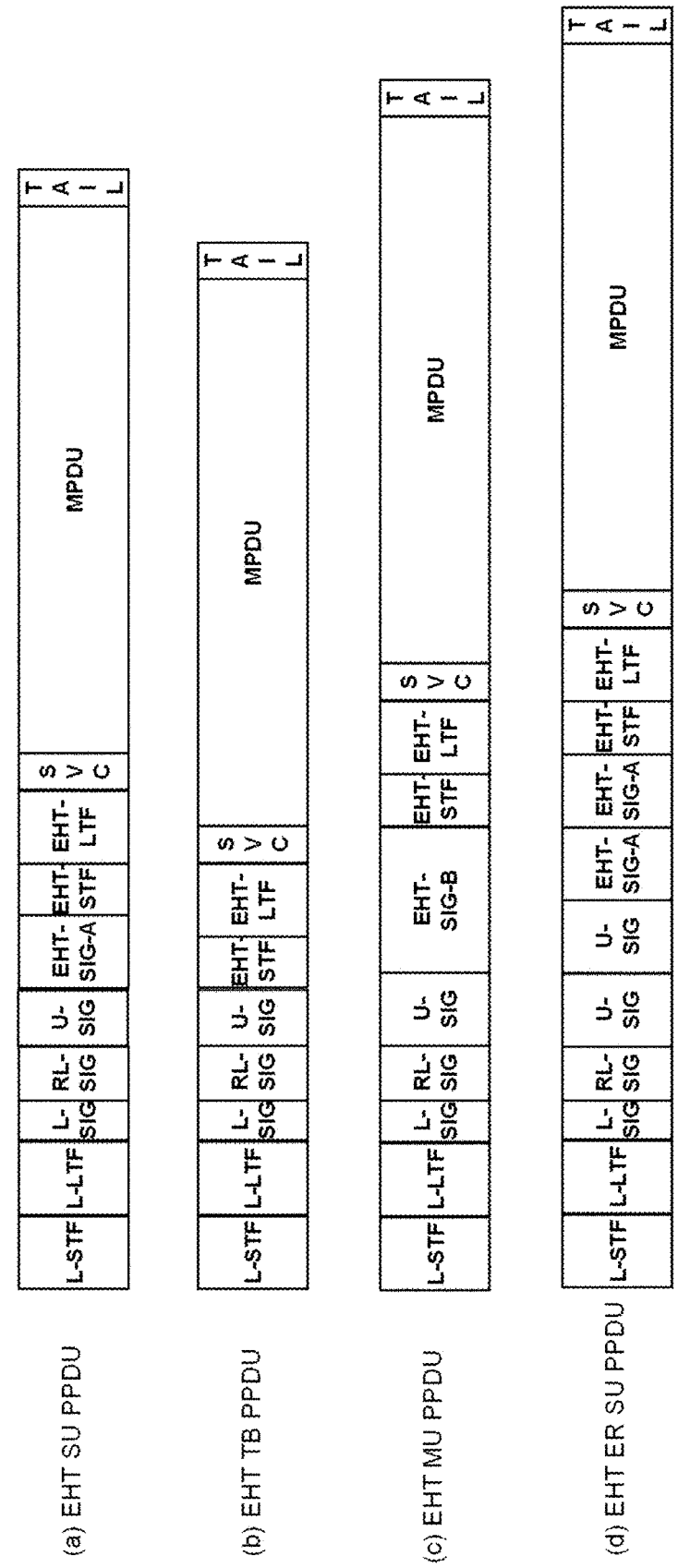
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Two or more PPDUs illustrated in FIG. 8 may be indicated by a value indicating the same PPDU format. That is, two or more PPDUs may be indicated by the same PPDU format through the same value. For example, the EHT SU PPDU and the EHT MU PPDU may be indicated by the same value through the U-SIG PPDU format subfield. At this time, the EHT SU PPDU and the EHT MU PPDU may be divided by the number of the STAs receiving the PPDU. For example, the PPDU receiving one STA may be identified as the EHT SU PPDU, and when the number of the STAs is configured to receive two or more STAs, the PPDU may be identified as the EHT MU PPDU. In other words, two or more PPDU formats illustrated in FIG. 8 may be indicated through the same subfield value.

In addition, a part field among the fields illustrated in FIG. 8 or part information of the field may be omitted, and the case that the part field or the part information of the field is omitted may be defined as a compression mode or a compressed mode.

Figure 9:
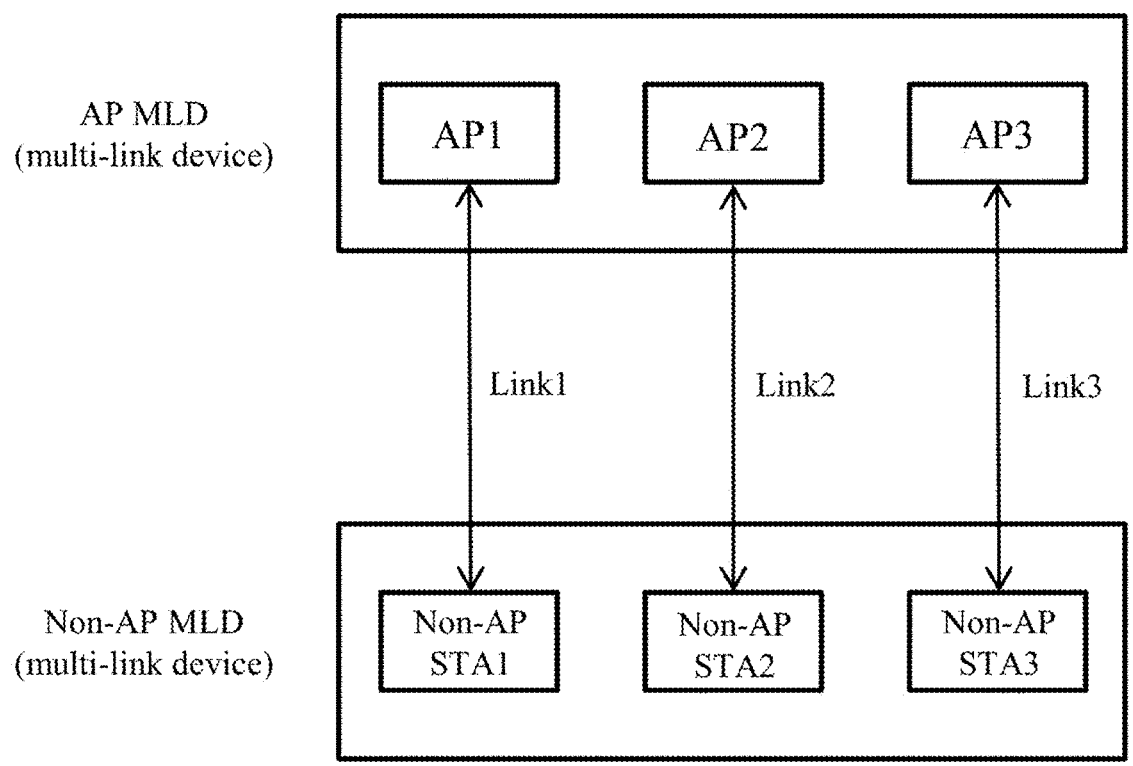
FIG. 9 is a view illustrating a multi-link device according to an embodiment of the present disclosure.

FIG. 9 is a view illustrating a multi-link device according to an embodiment of the present disclosure.

Referring to FIG. 9, a concept of a device to which one or more STAs are affiliated may be defined. According to an embodiment of the present disclosure, the devices to which more than one STA (i.e., two or more) are affiliated may be defined. At this time, the device may be a logical concept. Therefore, the devices to which one or more STAs or more than one STA having such a concept are affiliated may be referred to as a multi-link device (MLD), a multi-band device, or a multi-link logical entity (MLLE).

Otherwise, the devices of the concept may be referred to as a multi-link entity (MLE). In addition, the MLD may have one medium access control service access point (MAC SAP) until a logical link control (LLC), and the MLD may have one MAC data service.

It is possible that the STAs included in the MLD operate in one or more links or channels. That is, it is possible that the STAs included in the MLD operate in multiple channels which are different from each other. For example, it is possible that the STAs included in the MLD operate by using the channels of the different frequency bands of 2.4 GHz, 5 GHz, and 6 GHz. Accordingly, it is possible that the MLD obtains a benefit from the channel access, and increases the performance of the entire network. A conventional wireless LAN operates by the single link, but the MLD operation may obtain much more channel access opportunities by using the plurality of links or the STA may efficiently operate in the plurality of links in consideration of a situation of the channel.

In addition, in case that the STAs affiliated to the MLD are the APs, the MLD to which the APs are affiliated may be the AP MLD. However, in case that the STAs affiliated to the MLD are the non-AP STA, the MLDs to which the non-APs are affiliated may be the non-AP MLD.

In addition, an AP multi-link device (MLD) may be a device including one or more wireless access points (APs), and may be a device connected to a higher layer through one interface. That is, the AP MLD may be connected to a logical link control (LLC) layer through one interface. Multiple APs included in the AP MLD may share some functions in a MAC layer. The respective APs in the AP MLD may operate in different links. An STA MLD may be a device including one or more non-AP STAs, and may be a device connected to a higher layer through one interface.

That is, the STA MLD may be connected to an LLC layer through one interface. Multiple STAs included in the STA MLD may share some functions in a MAC layer. In addition, the STA MLD may be also called a non-AP MLD. In this case, the AP MLD and the STA MLD may perform a multi-link operation of performing communication using multiple individual links. That is, when the AP MLD includes multiple APs, each of the APs configures a separate link to perform a frame transmission or reception operation using multiple links with each terminal included in the STA MLD. In this case, each link may operate in a 2.4 GHz, 5 GHz, or 6 GHz band, and a bandwidth extension operation may be performed in each link. For example, when the AP MLD sets up one link in the 2.4 GHz band and two links in the 5 GHz band, in the 2.4 GHz band, frame transmission may be performed in a 40 MHz band through a bandwidth extension scheme, and in each link using the 5 GHz band, frame transmission may be performed in a maximum of 320 MHz band by utilizing a non-consecutive bandwidth.

Meanwhile, in the AP MLD or the STA MLD, while one terminal in the MLD performs a transmission operation, another terminal may not be able to perform a reception operation, due to an interference problem inside the device. As such, an operation in which while one AP or terminal in an MLD performs a transmission operation, another AP or terminal in the MLD performs a reception terminal is referred to as simultaneous transmission and reception (STR). The AP MLD may perform an STR operation for all links. Alternatively, the STR operation may not be possible in some links of the AP MLD. A terminal MLD which can perform the STR operation may be associated with the AP MLD, and an MLD which cannot perform the STR operation for some or all links may be associated with the AP MLD. In addition, a terminal (for example, IEEE 802.11a/b/g/n/ac/ax terminal) not belonging to an MLD may be additionally associated with an AP included in an AP MLD.

In the scanning and association process described in FIG. 5, the AP MLD and the STA MLD may perform a negotiation process for a multi-link use operation. For example, in the scanning process described in FIG. 5, an AP included in the AP MLD may transmit a beacon frame including an indicator indicating that a multi-link operation is available, the number of available links, and information on multiple available links. Alternatively, a terminal belonging to the STA MLD may transmit a probe request frame including an indicator indicating that a multi-link operation is available, and an AP belonging to the AP MLD may include an indicator indicating that a multi-link operation is available, in a probe response frame. In this case, the AP may additionally include the number of available links during a multi-link operation, link information, etc., and transmit the same.

The STA MLD having identified, in the scanning process above, whether the multi-link operation is available for the AP MLD and the information on the available links may perform an association process with the AP MLD. In this case, the AP MLD and the STA MLD may start a negotiation process for the multi-link operation. In this case, the negotiation process for the multi-link operation may be performed in an association process between the AP belonging to the AP MLD and the terminal belonging to the STA MLD. That is, a terminal (for example, STA1) belonging to the STA MLD may transmit an indicator indicating that a multi-link operation of the terminal is available and a request indicator for requesting to perform the multi-link operation to an AP (for example, AP1) while transmitting an association request frame. The AP having received the association request frame from the terminal may identify the indicator for requesting the multi-link operation, and when the AP can perform the multi-link operation, the AP may include information on a link to be used for the multi-link operation, a parameter used in each link, etc. in an association response frame allowing the multi-link operation, and transmit the association response frame to the corresponding terminal. The parameter for the multi-link operation may include one or more of a band of each link, a bandwidth extension direction, a target beacon transmission time (TBTT), and whether an STR operation is performed. The AP MLD and the STA MLD between which the association request frame and the response frame have been exchanged and which have identified the use of the multi-link operation may perform a frame transmission operation using multiple links by using multiple APs included in the AP MLD and multiple terminals included in the STA MLD after the corresponding association process.

Referring to FIG. 9, there may be an MLD including multiple STAs, and the multiple STAs included in the MLD may operate in multiple links. In FIG. 9, an MLD including AP1, AP2, and AP3, which are APs, may be called an AP MLD, and an MLD including non-AP STA1, non-AP STA2, and non-AP STA3, which are non-AP STAs, may be called a non-AP MLD. The STAs included in the MLD may operate in link 1 (Link1), link 2 (Link2), link 3 (Link3), or some of links 1 to 3.

According to an embodiment of the present invention, the multi-link operation may include a multi-link setup operation. The multi-link setup operation may be an operation corresponding to association performed in a single link operation. To exchange a frame in multiple links, the multi-link setup needs to performed first. The multi-link setup operation may be performed using a multi-link setup element. Here, the multi-link setup element may include capability information related to the multi-link, and the capability information may include information related to whether an STA included in an MLD can simultaneously receive a frame through one link while another STA included in the MLD transmits a frame through another link. That is, the capability information may include information related to whether STAs (non-AP STAs) and/or APs (or AP STAs) can simultaneously transmit/receive frames in different transmission directions through links included in the MLD. In addition, the capability information may further include information related to an available link and an operating channel. The multi-link setup may be performed through a negotiation between peer STAs, and the multi-link operation may be set up through one link.

According to an embodiment of the present invention, there may be a mapping relationship between a TID and an MLD. For example, when the TID 15 mapped to a link, the TID may be transmitted through the mapped link. The mapping between the TID and the link may be performed based on a transmission direction. For example, the mapping may be performed for both directions between MLD1 and MLD2. In addition, there may be a default setup for the mapping between the TID and the link. For example, the mapping between the TID and the link may correspond to mapping of all TIDs to a link by default.

Figure 10:
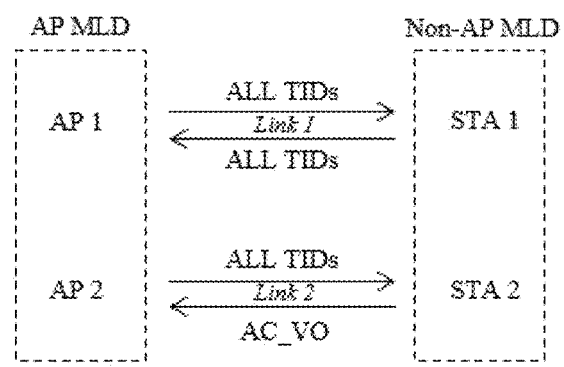
FIG. 10 illustrates an example of a TID-to-link mapping method according to an embodiment of the present invention.

FIG. 10 illustrates an example of a TID-to-link mapping method according to an embodiment of the present invention.

Referring to FIG. 10, as described in FIG. 9, there may be a mapping relationship between a TID and a link. In addition, in the present invention, the mapping between the TID and the link may be referred to as TID-to-link mapping, TID to link mapping, TID mapping, link mapping, etc. A TID may be a traffic identifier. In addition, the TID may be an identifier (ID) for classifying traffic, data, etc. to support a quality of service (QoS).

In addition, the TID may be an ID used or allocated in a layer higher than a MAC layer. The TID may indicate traffic categories (TCs) and traffic streams (TSs). In addition, the TID may have 16 values, which can be indicated as, for example, values of 0 to 15. In addition, a used TID value may vary according to an access policy or channel access and medium access methods. For example, when an enhanced distributed channel access (EDCA) (hybrid coordination function (HCF) contention-based channel access) is used, a possible TID value may be 0 to 7. In addition, when the EDCA is used, the TID value may indicate a user priority (UP), and the UP may relate to a TC or a TS. In addition, the UP may be a value allocated in a layer higher than the MAC. In addition, HCF controlled channel access (HCCA) or SPCA is used, a possible TID value may be 8 to 15. In addition, when the HCCA or the SPCA is used, the TID may indicate a TSID. In addition, when HEMM or SEMM is used, a possible TID value may be 8 to 15. In addition, when the HEMM or the SEMM is used, the TID may indicate a TSID.

In addition, there may be a mapping relationship between the UP and an access category (AC). The AC may be a label for providing the QoS in the EDCA, or a label indicating a set of EDCA parameters. The EDCA parameter of the set of the EDCA parameters may be used for channel connection. The AC may be used by a QoS STA.

An AC value may be configured as one of AC_BK, AC_BE, AC_VI, and AC_VO. AC_BK, AC_BE, AC_VI, and AC_VO may indicate background, best effort, video, and voice, respectively. In addition, AC_BK, AC_BE, AC_VI, and AC_VO may be subdivided. For example, AC_VI may be subdivided into AC_VI primary and AC_VI alternate. In addition, AC_VO may be subdivided into AC_VO primary and AC_VO alternate. In addition, the UP value or the TID value may be mapped to the AC value. For example, UP or TID values 1, 2, 0, 3, 4, 5, 6, and 7 may be mapped to AC_BK, AC_BK, AC_BE, AC_BE, AC_VI, AC_VI, AC_VO, and AC_VO, respectively. Alternatively, UP or TID values 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, UP or TID values 1, 2, 0, 3, 4, 5, 6, and 7 may have sequentially have higher priorities. That is, a value near UP or TID value 1 may have a low priority, and a value near UP or TID value 7 may have a high priority. Accordingly, AC_BK, AC_BE, AC_VI, and AC_VO may have sequentially higher priorities. In addition, AC_BK, AC_BE, AC_VI, and AC_VO may correspond to AC indices (ACIs) 0, 1, 2, and 3, respectively.

Accordingly, there may be a relationship between the TID and the AC. Accordingly, the TID-to-link mapping of the present invention may correspond to a mapping relationship between an AC and a link. In addition, in the present invention, when the TID is mapped, it may mean that the AC is mapped, and when the AC is mapped, it may mean that the TID is mapped.

According to an embodiment of the present invention, there may be a TID mapped to each link of a multi-link. For example, there may be mapping relating to one of multiple links through which a TID or an AC is allowed to perform transmission and reception. In addition, such mapping may be defined separately for both directions of the link. In addition, as described above, there may be a default setup for the mapping between the TID and the link. For example, the mapping between the TID and the link may correspond to mapping of all TIDs to a link by default. In addition, according to an embodiment, at a specific time point, a TID or an AC may be mapped to at least one link. In addition, a management frame or a control frame may be transmitted in all links.

In the present invention, a data frame corresponding to a TID or an AC mapped to a direction of a link may be transmitted. In addition, a data frame corresponding to a TID or an AC not mapped to a direction of a link may not be transmitted.

According to an embodiment, the TID-to-link mapping may be applied to acknowledgement. For example, a block ack agreement may be based on the TID-to-link mapping. Alternatively, the TID-to-link mapping may be based on the block ack agreement. For example, there may be a block ack agreement for a TID for which the TID-to-link mapping is performed.

By performing the TID-to-link mapping, a QoS service can be provided. For example, by mapping an AC or a TID having a high priority to a link in which a channel state is good or there are small number of STAs, data of the corresponding AC or TID may be promptly transmitted. Alternatively, the TID-to-link mapping can assist in power saving (or entering into a doze state) by an STA of a specific link.

Referring to FIG. 10, there may be an AP MLD including AP 1 and AP 2. In addition, there may be a non-AP MLD including STA 1 and STA 2. In addition, in the AP MLD, there may be Link 1 and Link 2 which are multiple links. AP 1 and STA 1 may be associated in Link 1, and AP 2 and STA 2 may be associated in Link 2.

Accordingly, Link 1 may include a link for transmission from AP 1 to STA 1 and/or a link for transmission from STA 1 to AP 1, and Link 2 may include a link for transmission from AP 2 to STA 2 and/or a link for transmission from STA 2 to AP 2. In this case, each link may be mapped to a TID and/or an AC.

For example, all TIDs and all ACs may be mapped to the link for transmission from AP 1 to STA 1 in Link 1, and a link for transmission from STA 1 to AP 1 in Link 1. In addition, only AC_VO or a TID corresponding to AC_VO may be mapped to a link for transmission from STA 2 to AP 2 in Link 2. In addition, only data of the mapped TID and/or AC can be transmitted in the corresponding link. In addition, data of the TID or AC not mapped to a link cannot be transmitted in the corresponding link.

Figure 11:
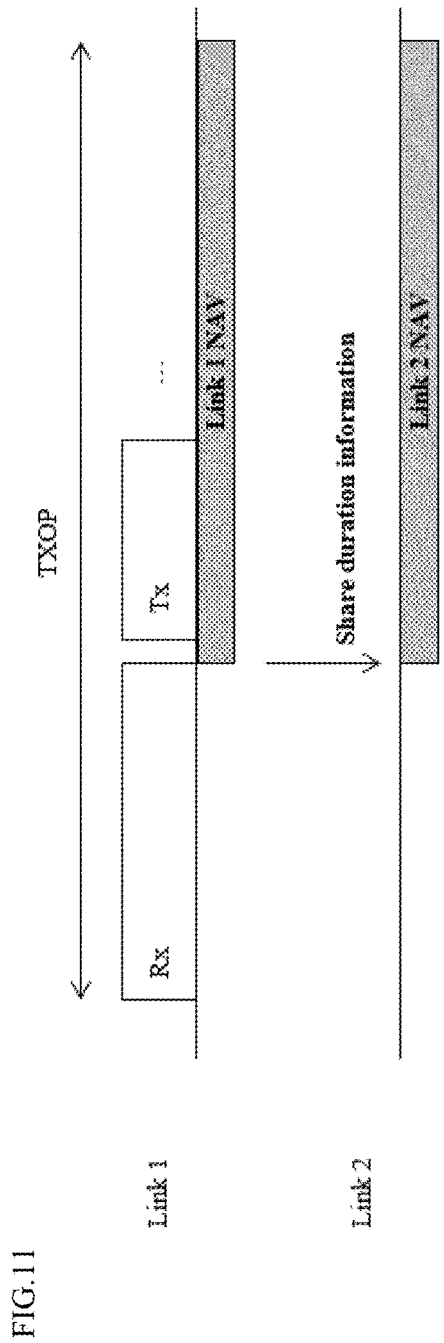
FIG. 11 illustrates an example of a multi-link NAV setup operation according to an embodiment of the present invention.

FIG. 11 illustrates an example of a multi-link NAV setup operation according to an embodiment of the present invention.

An operation of performing simultaneous transmission and reception (STR) by an MLD may be restricted, which may be associated with a frequency spacing between multiple links operating as a multi-link.

Accordingly, according to an embodiment of the present invention, when a spacing between links is m MHz, simultaneous transmission and reception may be restricted, and a spacing between links is n MHz (where, m is greater than n), simultaneous transmission and reception may not be restricted. This embodiment is provided to solve the problem that the simultaneous transmission and reception is restricted, and a redundant description may be omitted. In addition, this embodiment is appliable to an MLD which cannot perform the STR.

According to an embodiment of the present invention, duration information may be shared among links operating as a multi-link. In an embodiment, the duration information may be TXOP duration information transmitted in a signaling field of a preamble. The signaling field may be the above-described U-SIG field. Alternatively, the signaling field may be the above-described HE-SIG-A field. In another embodiment, the duration information may be duration information indicated by a duration/ID field included in a MAC header. In another embodiment, the duration information may be duration information indicated by a length field (L_length field) included in an L-SIG field. According to an embodiment, the duration information indicated by the U-SIG field, the HE-SIG-A field, or the duration/ID field may be a value indicating TXOP duration. According to an embodiment, the duration information indicated by the L-SIG field may be a value indicating the length of a physical layer protocol data unit (PPDU) including the L-SIG field or the end of the PPDU including the L-SIG field.

In addition, according to an embodiment of the present invention, it may be restricted to perform transmission or channel access in a period based on the duration information shard among the links. A method for restricting transmission or channel access may include setting up an NAV. Alternatively, to resume the transmission or channel access, the NAV may be reset. In this case, the NAV may be an intra-BSS NAV. The intra-BSS NAV may be an NAV set up by an intra-BSS frame (or PPDU). That is, an STA belonging to an MLD may set up an NAV on the basis of a frame (or PPDU) directed to another STA belonging to the MLD.

According to an embodiment of the present invention, there may be an inter-link NAV. The inter-link NAV may be an NAV used by STAs of multiple links belonging to an MLD in a case of operating as a multi-link. For example, transmission may not be performed in link 2 on the basis of the inter-link NAV configured on the basis of the duration information received in link 1. In addition, the inter-link NAV may exist or may be used for an MLD which cannot perform the STR. For example, when an inter-link NAV is set up, an MLD having set up the corresponding inter-link NAV may not perform transmission or channel access in multiple links (or all links used by the MLD).

In addition, as one of types of NAV, there may be a basic NAV other than the intra-BSS NAV. The basic NAV may be an NAV set up by an inter-BSS frame (or PPDU), and the basic NAV may be set up by a frame (or PPDU) which is not determined as either an intra-BSS or an inter-BSS.

In a case where an inter-link NAV is separately used, it may be advantageous in a situation in which an NAV setup is updated, compared to a case where the inter-link NAV is not used. For example, there may be a situation in which it is allowed to reset an NAV set up by another link. For example, it may be allowed to set up an inter-link NAV on the basis of a frame (or PPDU), and then reset the set inter-link NAV upon determination that the frame (or PPDU) is not directed to the same MLD. If there is an MLD operating in link 1 and link 2, an NAV for link 1 may be set up on the basis of a frame received in link 1. Thereafter, the NAV of link 1 may be updated on the basis of the frame of link 2. In addition, in a case where the NAV by the link 2 does not need to be maintained, when the NAV of link 1 is reset, information of the NAV set up on the basis of the frame received in link 1 may be lost. If the inter-link NAV is used together with the NAV for each link, the NAV for each link can be maintained even though the inter-link NAV is reset, and thus such a problem can be solved.

In an embodiment of the present invention, the NAV setup is provided as an example, but the embodiment of the present invention is not limited thereof, and is applicable to a case of indicating suspension of channel access or indicating a channel state as busy to a physical layer. In addition, the present invention is not limited to a case of resetting an NAV, and is also applicable to a case of indicating continuing channel access to a physical layer or indicating a channel state as idle to a physical layer. In this case, the primitive exchanged between the physical layer and the MAC layer may be used. Alternatively, the primitive exchanged between one STA and another STA of an MLD may be used. Alternatively, the primitive exchanged between one MAC layer and another MAC layer of an MLD may be used.

According to an embodiment of the present invention, when an STA belonging to an MLD starts PPDU reception, another STA belonging to the MLD may need to stop performing channel access. As described above, the channel access can be stopped on the basis of the received duration information, but there may be a time required to acquire duration information from a time point at which the PPDU reception starts due to the location of a field including the duration information or a time required to perform decoding, etc. Accordingly, if the channel access is performed and the transmission starts during this time, the above-described problem may occur. Accordingly, according to an embodiment of the present invention, an STA of an MLD may suspend channel access from a time point at which another STA of the MLD starts to perform reception. In addition, when it is identified that a frame received after another STA of the MLD starts performing reception is not directed to another STA, channel access can be restarted.

Figure 12:
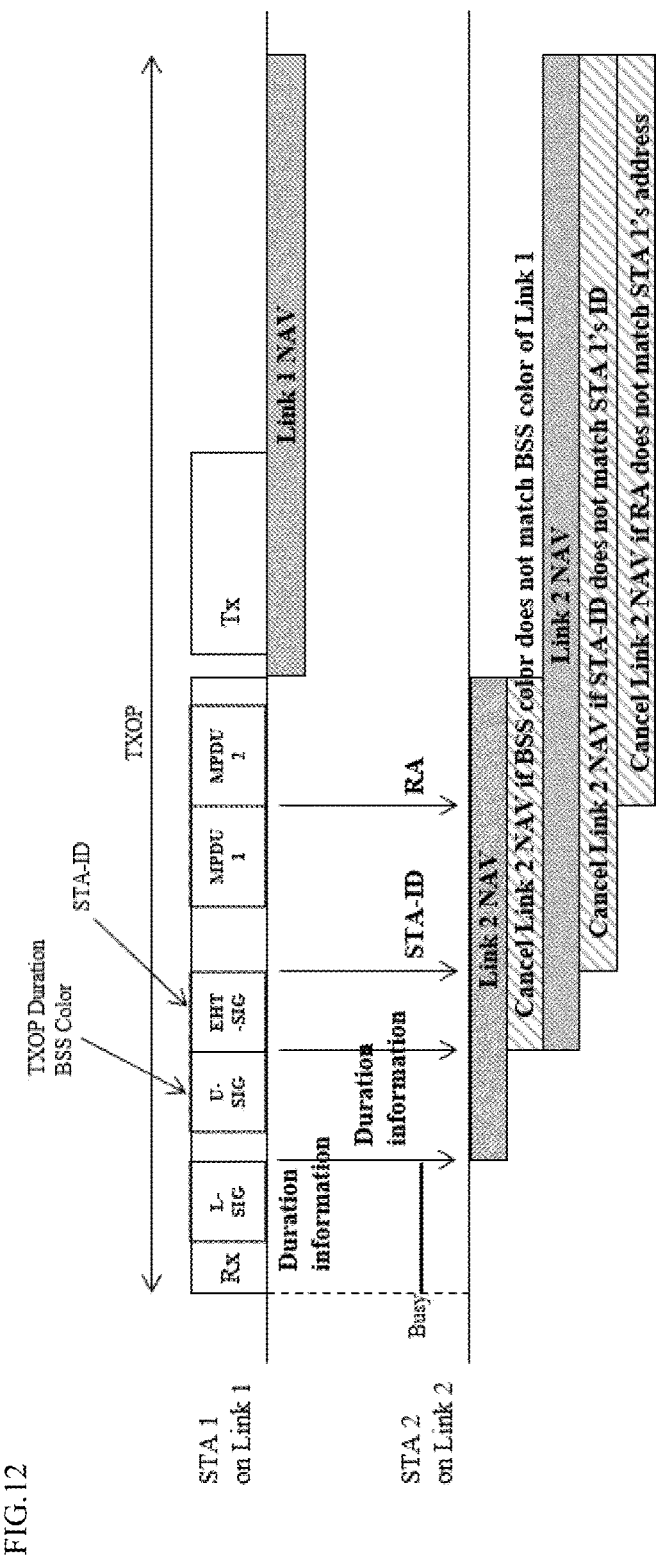
FIG. 12 illustrates another example of a multi-link NAV setup operation according to an embodiment of the present invention.

FIG. 12 illustrates another example of a multi-link NAV setup operation according to an embodiment of the present invention.

FIG. 12 is a detailed description of a specific method of the embodiment described in FIG. 11, and a redundant description may be omitted.

As described above, on the basis of a frame or a PPDU received by an STA belonging to an MLD, another STA belonging to the same MLD may suspend or resume channel access or transmission. In the present invention, suspending channel access or transmission may include an operation of setting up (updating) an NAV, determining a channel as busy, suspending CCA, etc. In addition, resuming channel access or transmission may include an operation of resetting an NAV, canceling a NAV setup, determining a channel as idle, performing CCA, etc. Hereinafter, such an operation may be indicated as suspending or resuming. In addition, hereinafter, it may be described that STA 1 and STA 2 belong to an MLD, and STA 1 and STA 2 operate in Link 1 and Link 2, respectively. In addition, a frame and a PPDU may be interchangeable indicated. In addition, the NAV in this case may be an intra-BSS NAV or an inter-link NAV as described in FIG. 11.

According to an embodiment of the present invention, when STA 1 starts receiving a frame, STA 2 may suspend channel access. In addition, when STA 1 acquires duration information from an L-SIG, STA 2 may continue the state of suspending the channel access. In this case, the state of suspending the channel access by STA 2 may be determined to last by the end of the frame received by STA 1. In addition, when STA 1 fails to accurately decode the L-SIG (in a case of invalid L-SIG), STA 2 may resume channel access.

In addition, TXOP duration and a BSS color may be received from the U-SIG of the frame received by the STA 1. If the received BSS color indicates an intra-BSS or the BSS color is a BSS color corresponding to STA 1, channel access may be suspended. In an embodiment, in this case, channel access suspending duration may last by the end of the received frame. In this case, it is advantageous in that channel access can be started faster after the received frame ends. In another embodiment, in this case, channel access suspending duration may be TXOP duration. In this case, duration of the channel access suspended on the basis of the L-SIG may be updated. In this case, it is advantageous in that a sequence after the received frame can be better protected.

Alternatively, there may be a case where TXOP duration and a BSS color are received from the U-SIG of the frame received by STA 1, and the received BSS color indicates non-intra-BSS, or the BSS color is not a BSS color corresponding to STA 1. Alternatively, there may be a case where STA 1 fails to successfully decode the U-SIG. In this case, STA 2 may resume channel access.

Alternatively, when information acquired from the U-SIG of the frame received by STA 1 indicates that the corresponding frame is a frame not received by STA 1, STA 2 may resume channel access. For example, when a PHY identifier acquired from the U-SIG is an ID corresponding to a future standard or an unrecognizable ID, STA 2 may resume channel access.

In addition, the case of receiving the U-SIG is described, but the same embodiment is also applicable to a case of receiving a HE PPDU and a case of receiving a HE-SIG-A. For example, the HE-SIG-A may include TXOP duration and a BSS color, and accordingly, the operation as described above may be performed.

In addition, an STA-ID may be received from an EHT-SIG of the frame received by STA 1. If the received STA-ID is an indicator which needs to be received by STA 1, for example, if the STA-ID indicates STA 1, the STA-ID indicates a group to which STA 1 belongs, or the STA-ID indicates broadcast, STA 2 may continue the state of suspending the channel access.

Alternatively, an STA-ID may be received from an EHT-SIG of the frame received by STA 1. If the received STA-ID is an indicator not corresponding to STA 1, for example, if the STA-ID does not indicate an indicator corresponding to STA 1, the STA-ID does not indicate a group to which STA 1 belongs, or the STA-ID does not indicate broadcast, STA 2 may resume channel access. Alternatively, also in a case where STA 1 fails to successfully decode the EHT-SIG, STA 2 may resume channel access.

In addition, the case of receiving the EHT-SIG is described, but the same embodiment is also applicable to a case of receiving a HE PPDU and a case of receiving a HE-SIG-B. For example, the HE-SIG-B may include the STA-ID, and accordingly, the operation as described above may be performed.

In addition, a MAC header of the frame received by STA 1 may be received. If a receiver address (RA) or a destination address (DA) included in the received MAC header indicates a value which needs to be received by STA 1, for example, if the RA or DA indicates STA 1 or indicates a group to which STA 1 belongs to, or the STA-ID indicates broadcast, STA 2 may continue the state of suspending the channel access. In this case, duration of the suspended channel access may be based on duration information included in the received MAC header. More specifically, the duration of the suspended channel access may be based on duration information indicated by a duration/ID field included in the received MAC header.

In addition, a MAC header of the frame received by STA 1 may be received. If an RA or DA included in the received MAC header is an indicator not corresponding to STA 1, for example, if the RA or DA does not indicate an indicator corresponding to STA 1, does not indicate a group to which STA 1 belongs to, or does not indicate broadcast, STA 2 may resume channel access. Alternatively, STA 1 may fail to receive all MAC headers. For example, STA 1 may fail to receive all MPDU included in an A-MPDU. In this case, STA 2 may resume channel access.

The suspending and resuming of the channel access, described in FIG. 12, may be sequentially performed according to an order of decoding as STA 1 starts receiving a frame (or PPDU) and sequentially performs decoding. The decoding order may be based on a PPDU format, a frame format, etc. For example, the decoding may be performed in the sequence of the L-SIG, the U-SIG, the EHT-SIG, and the MAC header (in a case of an EHT PPDU). Alternatively, the decoding may be performed in the sequence of the L-SIG, the HE-SIG-A, and the MAC header (in a case of a HE SU PPDU or a HE TB PPDU). Alternatively, the decoding may be performed in the sequence of the L-SIG, the HE-SIG-A, the HE-SIG-B, and the MAC header (in a case of a HE MU PPDU). Alternatively, the decoding may be performed in the sequence of the L-SIG and the MAC header (in a case of an 11a/g PPDU).

According to an embodiment of the present invention, the above-mentioned STA-ID may be a value indicating an intended receiver of a PPDU or a resource unit (RU). In addition, the STA-ID may be included in the EHT-SIG field, the HE-SIG-B field, or the like. In addition, the STA-ID may indicate a value corresponding to a single STA. For example, when multiple STAs are included in an MLD, the STA-ID may indicate a value corresponding to one of the multiple STAs. In addition, the STA-ID may be a value based on an AID or a MAC address.

Figure 13:
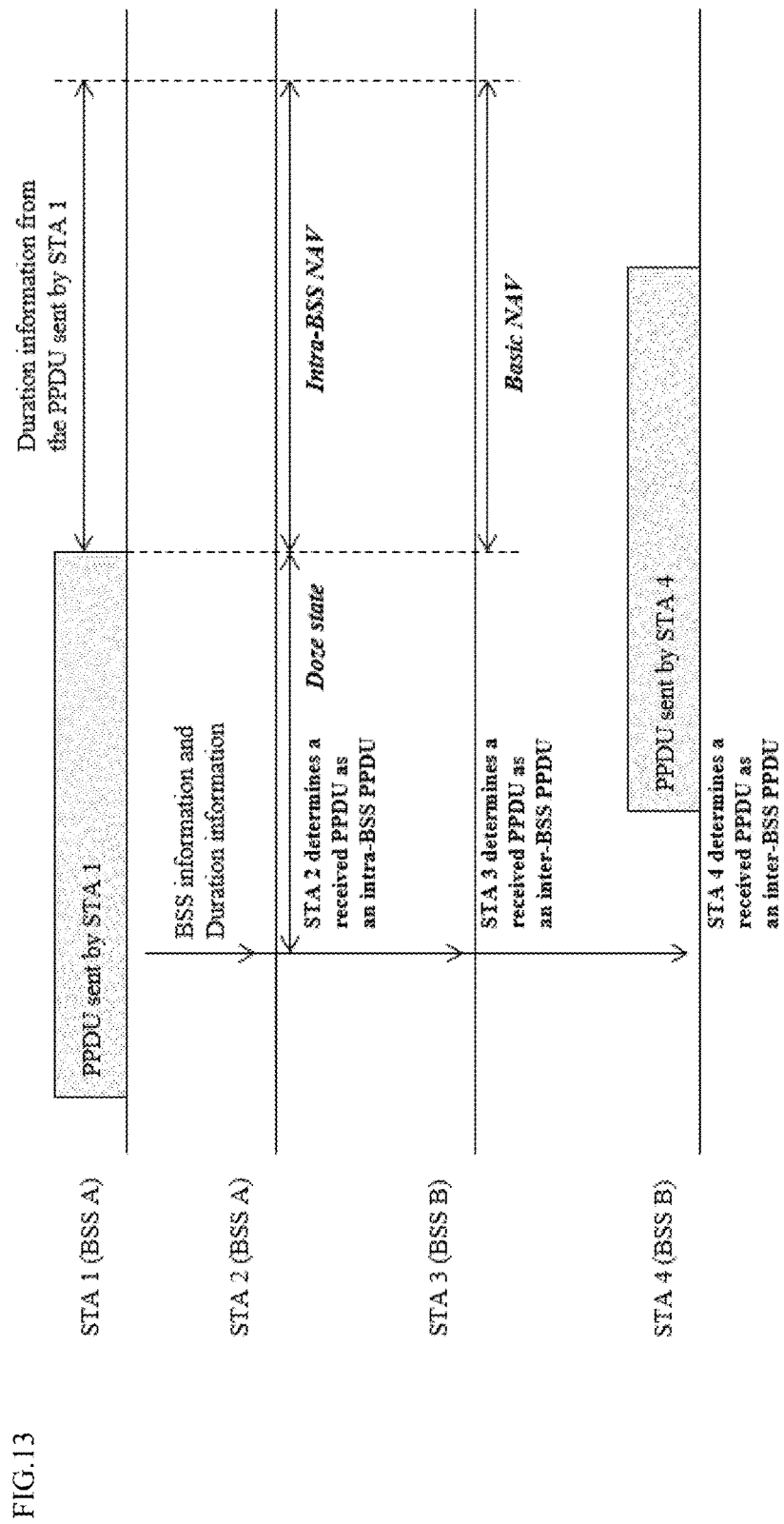
FIG. 13 illustrates an example of BSS classification and an operation based thereon according to an embodiment of the present invention.

FIG. 13 illustrates an example of BSS classification and an operation based thereon according to an embodiment of the present invention.

According to an embodiment of the present invention, an STA may classify (or determine) a BSS on the basis of a received frame or a received PPDU. Classifying the BSS may include an operation of classifying whether the received frame or the received PPDU corresponds to a BSS to which the classifying STA belongs. Alternatively, classifying the BSS may mean an operation of classifying whether the received frame or the received PPDU has been transmitted from a BSS to which the classifying STA belongs. In addition, classifying the BSS may include an operation of classifying whether the received frame or the received PPDU corresponds to a BSS to which the classifying STA does not belong. Alternatively, classifying the BSS may mean an operation of classifying whether the received frame or the received PPDU has been transmitted from a BSS to which the classifying STA does not belong. In addition, classifying the BSS may include an operation of classifying a BSS to which the received frame or the received PPDU belongs. Alternatively, classifying the BSS may mean an operation of classifying a BSS from which the received frame or the received PPDU has been transmitted. According to an embodiment of the present invention, a BSS to which the classifying STA belongs may be called an intra-BSS. Alternatively, BSSs including a BSS to which the classifying STA belongs may be called an intra-BSS. In addition, a BSS other than the intra-BSS may be called an inter-BSS. Alternatively, a BSS other than the intra-BSS may be an inter-BSS or an unclassified BSS. Alternatively, the inter-BSS may include the unclassified BSS. In addition, a BSS to which the classifying STA does not belong may be called an inter-BSS.

According to an embodiment, when it is determined that the received frame or the received PPDU corresponds to the intra-BSS or has been transmitted from the intra-BSS, the received frame and the received PPDU may be called an intra-BSS frame and an intra-BSS PPDU, respectively. In addition, when it is determined that the received frame or the received PPDU corresponds to the inter-BSS or has been transmitted from the inter-BSS, the received frame and the received PPDU may be called an inter-BSS frame and an inter-BSS PPDU, respectively. In addition, a PPDU including the intra-BSS frame may be an intra-BSS PPDU. In addition, a PPDU including the inter-BSS frame may be an inter-BSS PPDU.

According to an embodiment of the present invention, a BSS may be classified on the basis of one or more BSS classification conditions. For example, the BSS may be classified according to whether at least one of the one or more BSS classification conditions is satisfied.

The BSS classification condition may include a condition based on a BSS color. The BSS color may be an identifier for a BSS. In addition, the BSS color may be included in a preamble of a PPDU, more specifically, a signaling field (e.g., a HE-SIG-A field, a U-SIG field, or a VHT-SIG-A field). In addition, the BSS color may be included in TXVECTOR transferred from a MAC layer to a PHY layer of a transmitter. In addition, the BSS color may be included in RXVECTOR transferred from a PHY layer to a MAC layer of a receiver. Parameters included in TXVECTOR and RXVECTOR may be called a TXVECTOR parameter and an RXVECTOR parameter, respectively. In addition, the BSS color may be included in the TXVECTOR parameter or the RXVECTOR parameter. In addition, a BSS color configured by an AP may be notified to STAs. According to an embodiment, the BSS may be classified on the basis of a BSS color included in a received PPDU. If a BSS color included in a received PPDU differs from a BSS color of a BSS corresponding to an STA, the STA may classify the received PPDU as an inter-BSS PPDU. Alternatively, if a BSS color included in a received PPDU differs from a BSS color of a BSS corresponding to the STA and has a value other than 0, the STA may classify the received PPDU as an inter-BSS PPDU. In addition, if a BSS color included in a received PPDU is identical to a BSS color of a BSS corresponding to the STA, the STA may classify the received PPDU as an intra-BSS PPDU.

The BSS classification condition may include a condition based on a MAC address. The MAC address may be included in a MAC header of a frame. In addition, the MAC address may include a receiver address (RA), a transmitter address (TA), a BSSID, a source address (SA), a designation address (DA), etc. According to an embodiment, a BSS may be classified on the basis of a MAC address included in a received frame. If a MAC address included in a received frame differs from a BSSID of a BSS corresponding to an STA, the received frame may be classified as an inter-BSS frame. More specifically, if all MAC addresses included in the received frame differ from a BSSID of a BSS corresponding to the STA, the received frame may be classified as an inter-BSS frame. In addition, if a MAC address included in the received frame is identical to a BSSID of a BSS corresponding to the STA, the received frame may be classified as an intra-BSS frame. More specifically, if at least one of MAC addresses included in the received frame is identical to a BSSID of a BSS corresponding to the STA, the received frame may be classified as an intra-BSS frame.

The corresponding BSS may include an BSS to with which an STA is associated. In addition, the corresponding BSS may include a BSS included the same multiple-BSSID set as that of a BSS with which the STA is associated. In addition, the corresponding BSS may include a BSS included in the same co-hosted BSSID set as that of a BSS with which the STA is associated. In addition, one or more BSSs included in the same multiple-BSSID set or the same co-hosted BSSID set may transfer information relating to the one or more BSSs through a frame.

The BSS classification condition may include a condition based on a partial AID field value included in a VHT PPDU. The partial AID field may be included in a preamble of the VHT PPDU. In addition, the partial AID field may be included in a VHT-SIG-A field included in the VHT PPDU. According to an embodiment, the partial AID field may indicate a part of a BSS color. For example, when a partial BSS color function is used, the partial AID field may indicate a part of the BSS color. Alternatively, when an AID assignment rule is used, the partial AID field may indicate a part of the BSS color. The AID assignment rule may be a method for assigning an AID on the basis of a BSS color. In addition, when a group ID field included in the VHT-SIG-A field of the VHT PPDU has a pre-configured value (for example, when the group ID field is configured as 63), the partial AID field may indicate a part of the BSS color. According to an embodiment, when a partial AID field of a received PPDU indicates a part of the BSS color and a received partial AID field value differs from the part of the BSS color corresponding to the receiving STA, the received PPDU may be classified as an inter-BSS PPDU.

In addition, when a partial AID field of a received PPDU indicates a part of the BSS color and a received partial AID field value is identical to the part of the BSS color corresponding to the receiving STA, the received PPDU may be classified as an intra-BSS PPDU. In addition, in this case, the part of the BSS color may be 4 LSBs of the BSS color. According to another embodiment, the partial AID field may indicate a part of a BSSID. For example, when a group ID field included in the VHT-SIG-A field of the VHT PPDU has a pre-configured value (for example, when a group ID field is configured as 0), the partial AID field may indicate a part of a BSSID. According to an embodiment, when a partial AID field of a received PPDU indicates a part of the BSSID and a received partial AID field value differs from the part of the BSSID corresponding to the receiving STA, the received PPDU may be classified as an inter-BSS PPDU. In addition, when a partial AID field of a received PPDU indicates a part of the BSSID and a received partial AID field value is identical to the part of the BSSID corresponding to the receiving STA, the received PPDU may be classified as an intra-BSS PPDU. In addition, in this case, the part of the BSSID may be 9 MSBs of the BSSID. In addition, the partial AID field value may be included in TXVECTOR parameter PARTIAL_AID or RXVECTOR parameter PARTIAL_AID. In addition, the group ID field value may be included in TXVECTOR parameter GROUP_ID and RXVECTOR parameter GROUP_ID.

The BSS classification condition may include a condition for receiving a PPDU of a pre-configured condition by an AP. For example, the PPDU of the pre-configured condition may include a downlink PPDU. According to an embodiment, the downlink PPDU may include a VHT MU PPDU. In addition, the downlink PPDU may include a PPDU in which signaling indicating either an uplink or a downlink is configured as a pre-configured value. The signaling indicating either the uplink or the downlink may be included in a signaling field of a HE PPDU. Alternatively, the signaling indicating either the uplink or the downlink may be included in a U-SIG. The U-SIG may be included in a preamble of an EHT PPDU or a PPDU after the EHT standard.

In addition, there may be a case where classification into an intra-BSS PPDU or an inter-BSS PPDU cannot be made. For example, when both the condition for making classification into an intra-BSS PPDU and the condition for making classification into an inter-BSS PPDU, which are described above, fail to be satisfied, classification into the intra-BSS PPDU or the inter-BSS PPDU cannot be made.

In addition, in a case where classification results upon multiple conditions do not match when classifying the BSS, a final result may be determined according to a pre-configured condition. For example, when a result upon the condition based on the BSS color and a result upon the condition based on the MAC address do not match, the result upon the condition based on the MAC address is prioritized, or the result upon the condition based on the MAC address may be determined as a final result. Alternatively, when both the condition for making classification into the intra-BSS PPDU and the condition for making classification into the inter-BSS PPDU are satisfied, classification into an intra-BSS PPDU can be made.

According to an embodiment of the present invention, an STA may perform an operation based on a classified BSS. The operation based on the classified BSS may include an intra-PPDU power save operation. The intra-PPDU power save operation may be a power save operation based on a received PPDU. When a pre-configured condition is satisfied, the intra-PPDU power save operation may be performed. The pre-configured condition may include a condition for classifying the received PPDU as an intra-BSS PPDU. In addition, the pre-configured condition may include a condition in which an intended receiver of the received PPDU is not an STA having received the PPDU. For example, when an ID or an address included in a PPDU does not correspond to an STA having received the PPDU, an intended receiver of the PPDU may not be the STA having received the PPDU. The ID may be included in a preamble of a PPDU. For example, the ID may be STA_ID included in a preamble of a PPDU. In addition, STA_ID may be included in a HE MU PPDU or an EHT PPDU. In addition, the address may be the above-described MAC address. In addition, when the signaling indicating either the uplink or the downlink, which is included in the received PPDU, indicates the uplink, the intended receiver of the PPDU may not be the STA having received the PPDU. In addition, when a configuration of the received PPDU is not supported by the STA having received the PPDU, the intended receiver of the PPDU may not be the STA having received the PPDU. The configuration of the received PPDU may include an MCS of the PPDU, the number of spatial streams, a channel width, etc. In addition, when the configuration of the received PPDU is not supported by the STA having received the PPDU, the PHY-RXEND.indication (UnsupportedRate) primitive may be received. In addition, when the received PPDU has a pre-configured format, the intended receiver of the PPDU may not be the STA having received the PPDU. The pre-configured format may include a TB PPDU. The TB PPDU may include a HE TB PPDU and an EHT TB PPDU. In addition, the TB PPDU may be a PPDU transmitted as a response to a triggering frame. The triggering frame may include a trigger frame. The triggering frame may include a frame including information to be triggered. The information to be triggered may be included in a MAC header, for example, an A-control field. In addition, the information to be triggered or information included in the trigger frame may include the length of a responding PPDU, an RU to be used during responding, a PHY configuration and a MAC configuration to be used during responding, etc. The intra-PPDU power save operation may be an operation of entering into a doze state by the end of the received PPDU. In another embodiment, when it is determined that an intended receiver of a received PPDU or frame is not an STA, the STA may suspend reception or decoding of the PPDU or frame.

The operation based on the classified BSS may include an operation of setting up (or updating) an NAV. According to an embodiment, an STA may operate one or more NAVs. In addition, when an STA receives a PPDU or a frame, the STA may set up an NAV corresponding to a BSS classified on the basis of the received PPDU or the received frame. For example, an intra-BSS VAN may be an NAV corresponding to an intra-BSS PPDU. In addition, a basic NAV may be an NAV corresponding to a PPDU other than the intra-BSS PPDU. Alternatively, the basic NAV may be an NAV corresponding to an inter-BSS PPDU. In addition, when an NAV is set up on the basis of the received PPDU or the received frame, duration information included in the received PPDU or the received frame may be used. The duration information may include a TXOP. The TXOP may mean a value included in a TXOP field. The TXOP field may be included in a preamble of a PPDU. For example, the TXOP field may be included in a HE-SIG-A field of a HE PPDU. Alternatively, the TXOP field may be included in a U-SIG field of an ETH PPDU or a PPDU of a standard after the EHT. In addition, the duration information may be included in a MAC header. For example, the duration information may be included in a duration/ID field included in the MAC header.

The operation based on the classified BSS may include a spatial reuse operation. In addition, the operation based on the classified BSS may include a channel access operation. The spatial reuse operation may be a channel access operation. When an STA receives a PPDU or a frame and a pre-configured condition is satisfied, the spatial reuse operation may be performed. The pre-configured condition may include a condition in which a received PPDU or a received frame corresponds to an inter-BSS. In addition, the pre-configured condition may include a condition in which a signal strength of the received PPDU or the received frame is less than a threshold. For example, the threshold may be variable. In addition, the threshold may be a threshold for an OBSS PD-based spatial reuse operation. In addition, the threshold may be a value equal to or greater than a CCA threshold. In addition, the threshold may be a value based on power at transmission is to be performed. The spatial reuse operation may include an operation of transmitting a PPDU. In addition, the spatial reuse operation may include an operation of resetting a PHY. For example, the PHY resetting operation may be an operation of issuing the PHY-CCARESET.request primitive. In addition, the spatial reuse operation may include an operation of not setting up an NAV on the basis of a received PPDU or a received frame. If an STA performs the spatial reuse operation, the STA may transmit a PPDU while the received PPDU or the received frame is transmitted or received.

Referring to FIG. 13, there may be BSS A and BSS B, and BSS A and BSS B may be different from each other. In addition, each of BSS A and BSS B may correspond to an inter-BSS. That is, a PPDU or a frame transmitted by an STA associated with BSS A in BSS B may be classified as an inter-BSS PPDU or an inter-BSS frame. In addition, there may be STA 1 and STA 2 belonging to BSS A (or associated with an AP operating BSS A). There may be STA 3 and STA 4 belonging to BSS B (or associated with an AP operating BSS B). Referring to FIG. 13, STA 1 may transmit a PPDU. In addition, a PPDU transmitted by STA 1 may include information on a BSS. For example, the information on the BSS may be the above-described information for classifying the BSS. In addition, a PPDU transmitted by STA 1 may include duration information.

STA 2 may receive the PPDU transmitted by STA 1 and classify a BSS for the PPDU. In addition, STA 2 and STA 1 belong to BSS A, and thus the PPDU received by STA 2 may be classified as an inter-BSS PPDU. In addition, the PPDU received by STA 2 may be a UL PPDU or a PPDU, the intended receiver of which is not the STA. Accordingly, according to the above-described embodiment, STA 2 may perform intra-PPDU power saving. Referring to FIG. 13, STA 2 may enter into a doze state by the end of the received PPDU. In addition, STA 2 may set up an NAV on the basis of duration information included in the received PPDU. STA 2 has classified the received PPDU as the intra-BSS PPDU, the NAV may be set up as an intra-BSS NAV.

STA 3 may receive the PPDU transmitted by STA 1 and classify a BSS for the PPDU. In addition, STA 3 and STA 1 belong to BSS B and BSS A, respectively, and thus the PPDU received by STA 3 may be classified as an inter-BSS PPDU. In addition, STA 3 may set up an NAV on the basis of duration information included in the received PPDU. STA 3 has classified the received PPDU as the inter-BSS PPDU, the NAV may be set up as a basic NAV.

STA 4 may receive the PPDU transmitted by STA 1 and classify a BSS for the PPDU. In addition, STA 4 and STA 4 belong to BSS B and BSS A, respectively, and thus the PPDU received by STA 4 may be classified as an inter-BSS PPDU. In addition, a signal strength of the PPDU received by STA 4 may be less than a threshold. Accordingly, the PPDU received by STA 4 has been classified as the inter-BSS PPDU and the signal strength of the PPDU received by STA 4 is less than the threshold, and thus STA 4 may perform a spatial reuse operation. Accordingly, STA 4 may perform channel access and a backoff procedure, and start performing transmission. For example, STA 4 may start performing transmission at a time point at which the PPDU transmitted by STA 1 does not end.

Figure 14:
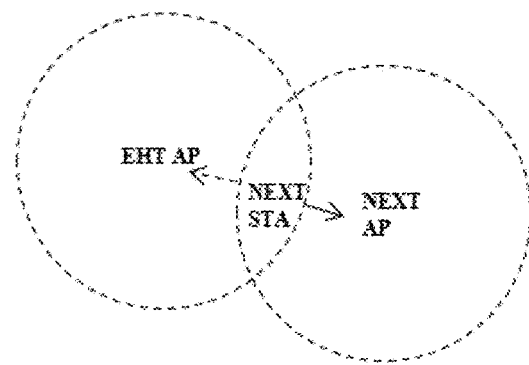
FIG. 14 illustrates an example of BSS classification based on a U-SIG field according to an embodiment of the present invention.

FIG. 14 illustrates an example of BSS classification based on a U-SIG field according to an embodiment of the present invention.

According to an embodiment of the present invention, an STA may classify a BSS on the basis of an EHT PPDU or a PPDU after an ETH standard. For example, the STA may classify the BSS on the basis of a U-SIG field. As described above, the U-SIG field may be included in the EHT PPDU or the PPDU after the EHT standard, and may be included in a preamble of the EHT PPDU or the PPDU after the EHT standard. Alternatively, the STA may determine whether the STA is an intended receiver of the PPDU on the basis of the EHT PPDU or the PPDU after the EHT standard. For example, the STA may determine, on the basis of the U-SIG field, whether the STA is the intended receiver of the PPDU. An operation after classifying the BSS or determining whether the STA is the intended receiver may follow the embodiment described in FIG. 13, and may omitted in the description of FIG. 14. In addition, with respect to a description of a field included in a PPDU and a PPDU format, the above-described contents may be omitted. The EHT PPDU or the PPDU after the EHT standard may sequentially include L-STF, L-LTF, L-SIG, RL-SIG, and U-SIG fields.

According to an embodiment of the present invention, an operation of classifying a BSS or determining whether an STA is an intended receiver may be based on a PHY version field. As described above, the PHY version field may be included in a U-SIG field. In addition, the PHY version field may play a role of indicating a standard corresponding to a PPDU including the PHY version field.

According to an embodiment, the PHY version field included in a PPDU received by an STA indicates a value corresponding to a standard not supported by the STA, it may be determined that the PPDU is an inter-BSS PPDU, or it may be determined that an intended receiver of the PPDU is not the STA. Alternatively, the PHY version field included in a PPDU received by an STA indicates a value corresponding to a standard not associated with or not set up by the STA, it may be determined that the PPDU is an inter-BSS PPDU, or it may be determined an intended receiver of the PPDU is not the STA. Such an operation may be possible since the PHY version field is included in a version independent field.

For example, the standard may be determined as a standard not supported to a value greater than a PHY version field value corresponding to a standard supported by the STA. For example, in a case where a PHY version field value corresponding to an EHT standard or an EHT PPDU is 0(000), when an EHT STA receives a PHY version field configured with a value greater than 0, the PPDU may be determined as a PPDU corresponding to a standard not supported by the PPDU including the PHY version field. Alternatively, when a value corresponding to a future standard is configured, compared to the standard supported by the PHY version field received by the STA, the standard may be determined as an unsupported standard.

For example, when a PHY version field included in a PPDU received by an AP indicates a value corresponding to a standard not supported by the AP, it may be determined that the PPDU is an inter-BSS PPDU, or it may be determined that an intended receiver of the PPDU is not the AP. Alternatively, when a PHY version field included in a PPDU received by an AP indicates a value corresponding to a standard not associated with or not set up by the AP, it may be determined that the PPDU is an inter-BSS PPDU, or it may be determined that an intended receiver of the PPDU is not the AP. This is because in a BSS operated by the AP, an operation of a standard not supported by the AP or a standard not associated with the AP is not be operated.

According to an embodiment, standards supported by an AP may be signaled. Accordingly, an STA having received the signaling may recognize standards that are supported or used in the BSS. Accordingly, the STA may also classify the BSS on the basis of the PHY version field.

In addition, according to an embodiment, when a PHY version field included in a PPDU received by an AP or a non-AP STA indicates a value corresponding to an unsupported standard, the AP or the non-AP STA may determine the PPDU as an inter-BSS PPDU, or may determined that an intended receiver of the PPDU is not the AP or the non-AP STA itself. Accordingly, for example, when a BSS color of a PPDU received by a non-AP STA is identical to a BSS color value corresponding to a BSS of the non-AP STA and a PHY version field of the received PPDU corresponds to a value corresponding to an unsupported standard, the non-AP STA may perform intra-PPDU power saving, or may determine that an intended receiver is not the non-AP STA itself. By determining an intended receiver in a U-SIG field, more prompt determination can be made compared to identifying ID information existing after the U-SIG field.

As described above, classifying a BSS may be performed on the basis of a BSS color. However, there may be a case where a BSS color corresponding to a BSS is identical to a BSS color of an OBSS (a case of a BSS color collision). Alternatively, there may be a case where use of a BSS color is suspended (for example, a case where an AP indicates to suspend use of a BSS color or a case where a BSS color disabled field is configured as a pre-configured value). Accordingly, it may be useful to determine the BSS on the basis of a value other than the BSS color.

According to an embodiment, when classification based on a BSS color and classification based on a PHY version field do not match, classification can be made on the basis of a PHY version field, or classification into an inter-BSS PPDU can be made.

Referring to FIG. 14, there may be an EHT standard and a NEXT standard corresponding to a standard after the EHT standard. In addition, there may be a NEXT STA and a NEXT AP supporting the NEXT standard. The NEXT STA may be associated with the NEXT AP. In addition, there may be an EHT AP supporting the EHT standard. In addition, the EHT AP may receive a PPDU transmitted by the NEXT STA. The PPDU may include a U-SIG field. For example, the U-SIG field may exist after L-STF, L-LTF, L-SIG, and RL-SIG fields. In addition, the EHT AP may receive a PHY version field value included in the U-SIG. In this case, the received PHY version field value may be configured as a value corresponding to the NEXT standard. In this case, the EHT AP may classify the PPDU as an inter-BSS PPDU. In addition, the EHT AP may determine that an intended receiver of the PPDU is not the EHT AP itself. On the basis of such classification or determination, an NAV setup, a spatial reuse operation, etc. can be performed.

Figure 15:
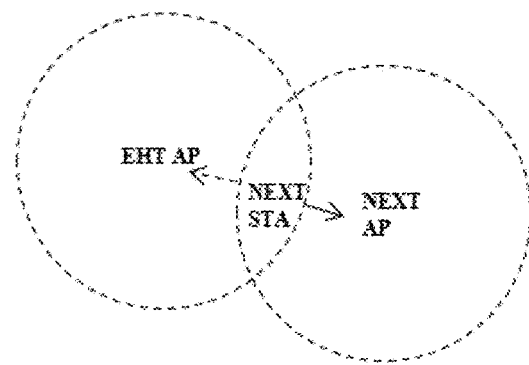
FIG. 15 illustrates an example of BSS classification based on a U-SIG field or an EHT field according to an embodiment of the present invention.

FIG. 15 illustrates an example of BSS classification based on a U-SIG field or an EHT field according to an embodiment of the present invention.

According to an embodiment of the present invention, an STA may classify a BSS on the basis of an EHT PPDU or a PPDU after an EHT standard. For example, an STA may classify a BSS on the basis of a U-SIG field or an EHT-SIG field. As described above, the U-SIG field may be included in the EHT PPDU or the PPDU after the EHT standard, and may be included a preamble of the EHT PPDU or the PPDU after the EHT standard. In addition, the EHT-SIG field may be included in a preamble of the EHT PPDU. Alternatively, an STA may determine whether an intended receiver of the PPDU is the STA on the basis of the EHT PPDU or the PPDU after the EHT standard. For example, the STA may determine whether an intended receiver of the PPDU is the STA on the basis of the U-SIG field or the EHT-SIG field. An operation after classifying the BSS or determining whether the STA is the intended receiver may follow the embodiment described in FIG. 13, and may omitted in the description of FIG. 15. In addition, with respect to a description of a field included in a PPDU and a PPDU format, the above-described contents may be omitted. The EHT PPDU or the PPDU after the EHT standard may sequentially include L-STF, L-LTF, L-SIG, RL-SIG, U-SIG, and SIG fields. In this case, the EHT PPDU may include an EHT-SIG field as the SIG field, and the PPDU after the EHT standard may include an SIG field corresponding to each standard, as the SIG field.

According to an embodiment of the present invention, an operation of classifying a BSS or determining whether an STA is an intended receiver may be based on puncturing pattern information. According to an embodiment, the puncturing pattern information may be included in the U-SIG field or the EHT-SIG field. For example, the puncturing pattern information may be included in both the U-SIG field and the EHT-SIG field. In an embodiment of the present invention, the puncturing pattern information may include information indicating a punctured channel. In addition, the puncturing pattern information may include channel width (bandwidth) information. In addition, the puncturing pattern information may include RU allocation information.

The puncturing pattern information may indicate information on a punctured channel (subchannel) or a punctured RU. In the description of the present invention, a channel may be replaced by a subchannel or an RU. When a channel or an RU is punctured, it may mean that the channel or the RU is not used. The punctured channel may be in the middle or at the end of an operating channel. Accordingly, channel usability and efficiency may increase, compared to using only contiguous channels. In addition, according to an embodiment, a puncturing pattern may be determined for a BSS. For example, a puncturing pattern may be determined during association. For example, the puncturing pattern information may be included in an association response frame or a reassociation response frame. Alternatively, the puncturing pattern information may be included in a probe response frame or a beacon frame. In this case, for a channel indicated to be punctured, no PPDU transmission may be always performed, and it may be expected that a PPDU is not transmitted in the channel. In addition, according to an embodiment, the puncturing pattern may be determined for each PPDU. For example, transmission may be performed for each PPDU by using different puncturing patterns. In addition, a puncturing pattern determined for a BSS and a puncturing pattern determined for each PPDU may be used together. In this case, for a channel determined to be punctured for the BSS, a PPDU is also punctured and transmitted. According to an embodiment, the puncturing pattern information may have a bitmap format. For example, bits corresponding to a channel may exist in the bitmap. If a bit corresponding to a channel has a pre-configured value, it may indicate that puncturing is performed. In addition, if a bit corresponding to a channel as another pre-configured value, it may indicate that puncturing is not performed. In addition, when it is indicated that the puncturing is not performed, it may be possible to indicate later that puncturing is performed, through additional signaling. For example, with respect to a channel for which puncturing pattern information included in the U-SIG indicates that puncturing is not performed, puncturing pattern information included in the EHT-SIG may indicate that puncturing is performed. The puncturing determined for the BSS may be called static puncturing. The puncturing determined for each PPDU may be called dynamic puncturing.

In addition, according to an embodiment, there may be a channel that is not punctured. For example, a channel that is not always punctured may be indicated. For example, an AP may indicate a channel that is not always punctured. The channel that is not always punctured may include a primary 20 MHz channel.

According to an embodiment, an STA may classify a BSS or determine whether the STA is an intended receiver on the basis of a result of comparison between received puncturing pattern information and a channel expected to be punctured. According to an embodiment, when the puncturing pattern information acquired from a received PPDU indicates, to the STA, that a channel expected to be punctured is not punctured, the STA may classify the PPDU as an inter-BSS PPDU or determine that an intended receiver of the PPDU is not the STA. The channel expected to be punctured, by the STA may be based on the puncturing pattern information indicated from the AP by the STA. Alternatively, the STA may be the AP, and may configure or indicate a channel to be punctured in the BSS.

Alternatively, according to an embodiment, an STA may classify a BSS or determine whether the STA is an intended receiver on the basis of a result of comparison between received puncturing pattern information and a channel expected not to be punctured. According to an embodiment, when the puncturing pattern information acquired from a received PPDU indicates, to the STA, that a channel expected not to be punctured is punctured, the STA may classify the PPDU as an inter-BSS PPDU or determine that an intended receiver of the PPDU is not the STA. The channel expected not to be punctured, by the STA may be based on the puncturing pattern information indicated from the AP by the STA. Alternatively, the STA may be the AP, and may configure or indicate a channel not to be punctured in the BSS.

Referring to FIG. 15, an EHT STA may be associated with an EHT AP. In addition, the EHT STA may receive puncturing pattern information from the EHT AP. In this case, the puncturing pattern information may be information relating to static puncturing. For example, the EHT AP may indicate that a part of an operating channel is to be punctured. Referring to FIG. 15, it may be indicated that a channel indicated by a hatched part is to be punctured. Accordingly, this channel may not be used for the BSS. In addition, the EHT STA may receive a PPDU. The PPDU may include puncturing pattern information. For example, a U-SIG or EHT-SIG field included in the PPDU may include the puncturing pattern information. In this case, the EHT STA may compare the puncturing pattern information included in the PPDU and puncturing pattern information received from the EHT AP. For example, when a channel which is indicated to be punctured by the puncturing pattern information received from the EHT AP is not punctured according to the puncturing information included in the PPDU, the PPDU may be determined as an inter-BSS PPDU. In addition, in this case, it may be determined that an intended receiver of the PPDU is not the EHT STA. A channel access operation, a spatial reuse operation, and an NAV setup operation may be performed according to the determination. Referring to FIG. 15, puncturing pattern information may be indicate in a bitmap format, and each bit may correspond to a 20 MHz channel. In addition, the bitmap may be mapped to a channel according to the order of the frequency. In addition, when a bit of the bitmap is 0, it may indicate that puncturing is not performed, and when the bit of the bit map is 1, it may indicate that puncturing is performed. If puncturing pattern information included in the PPDU indicates 0000000, it may indicate that all 20 MHz channels are not punctured. Accordingly, in this case, a channel indicated to be punctured according to the puncturing pattern information received from the EHT AP is not punctured according to the puncturing pattern information included in the PPDU, and thus it may be determined that an intended receiver of the PPDU is not the EHT STA.

Figure 16:
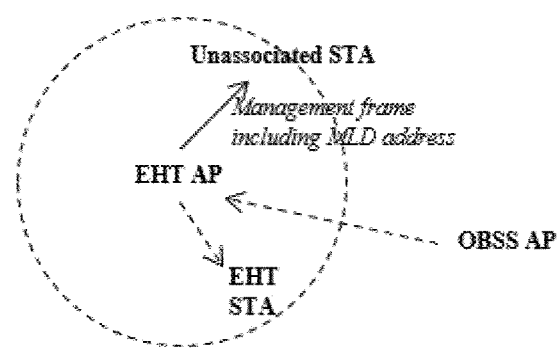
FIG. 16 illustrates an example of BSS classification based on an MLD address according to an embodiment of the present invention.

FIG. 16 illustrates an example of BSS classification based on an MLD address according to an embodiment of the present invention.

According to an embodiment of the present invention, there may be an MLD address. The MLD address may be an address for an MLD. The MLD address may be an identifier for an MLD. For example, there may be a MAC address for STAs belonging to the MLD, and there may be also an address for the MLD. The MLD address may be used for a multi-link setup process. The MLD address may be included in a MAC header of a frame. More specifically, the MLD address may be included in an address field included in the MAC header. In another embodiment, the MLD address may be included in a multi-link (ML) element. The ML element may be an element related to multi-link setup, multi-link configuration, or multi-link operation. When performing multi-link setup request or multi-link setup response, the ML element may be included in the frame. According to an embodiment, the ML element may be included in an association Request frame, an association a response frame, a reassociation request frame, a reassociation response frame, a probe request frame, a probe response frame, a beacon frame, an authentication request frame, an authentication Response frame, etc. In addition, the ML element may include elements common to links of the multi-link and elements corresponding to respective links. In addition, the ML element may include an operation element, a capabilities element, etc. for the links of the multi-link. In another embodiment, the MLD address may be included in a reduced neighbor report (RNR) element. The RNR element may include information on an MLD, information on a neighbor AP, information on a neighbor BSS, etc. The RNR element may include information on whether an MLD or an AP corresponds to the same BSS as an STA transmitting the RNR element, or information on whether an MLD or an AP corresponds to the same MLD.

According to an embodiment of the present invention, an STA may identify information on an MLD address corresponding to an AP associated with the STA. For example, the STA may perform multi-link setup, and identify an address of an AP MLD that is set up. An MLD address corresponding to the AP associated with the STA may correspond to an intra-BSS. When the STA performs multi-link setup, the MLD address corresponding to the set up MLD may correspond to an intra-BSS. Alternatively, the STA may have received the MLD address from the RNR element or the ML element. In addition, it may be possible to determine whether the MLD address received by the STA corresponds to an intra-BSS or an inter-BSS. For example, signaling relating to whether the MLD address received by the STA corresponds to an intra-BSS or an inter-BSS may be received together, and the determination can be made on the basis of the signaling. The signaling may be included in the RNR element or the ML element. When an MLD address corresponds to an intra-BSS and a frame or an element including the MLD address is received, the frame may be determined as an intra-BSS frame. When an MLD address corresponds to an inter-BSS and a frame or an element including the MLD address is received, the frame may be determined as an inter-BSS frame.

Referring to FIG. 16, an EHT STA may be associated with an EHT AP. The EHT STA may receive an MLD address corresponding to the EHT AP. In an embodiment, the MLD address corresponding to the EHT AP may be received when the EHT STA and the EHT AP set up a multi-link. For example, the MLD address may be received through a MAC address field included in a management frame or an RNR element or an ML element. When the EHT STA receives an MLD address corresponding to the EHT AP, a frame including the MLD address may be determined as an intra-BSS frame. For example, as illustrated in FIG. 16, the EHT AP may transmit a management frame including the MLD address. For example, the management frame may be transmitted for an unassociated STA. In addition, the management frame may include the MLD address corresponding to the EHT AP in a MAC header or an element included in the management frame. The EHT STA may receive the management frame, and in this case, the frame may be classified as an intra-BSS frame.

In another embodiment, the EHT STA may receive an address (or an address corresponding to an OBSS AP) corresponding to an MLD to which an OBSS AP belongs. For example, the EHT STA may receive an address (OBSS AP MLD address) corresponding to an MLD to which an OBSS AP belongs from the EHT AP. For example, the EHT AP may include the OBSS AP MLD address in an RNR element. Alternatively, by receiving frames for a predetermined period, the EHT STA may collect OBSS AP MLD address information. If a frame or an element received by the EHT STA includes the OBSS AP MLD address, the frame may be classified as an inter-BSS frame.

The table below indicates an example of a U-SIG content field.

TABLE 1

| U-SIG | |
|---|---|
| Version Independent | Version Dependent |
| PHY version (3 bits) | |
| UL/DL (1 bit) | ... |
| BSS color (N_B bits) | Extended BSS color (N_EB bits) |
| TXOP (N_T bits) | Extended TXOP (N_ET bits) |
| Bandwidth | ... |
| Puncturing pattern | |
| ... | |

Referring to Table 1, an EHT PPDU or a PPDU after an EHT standard may include a U-SIG field. For example, the EHT PPDU or the PPDU after the EHT standard may sequentially include L-STF, L-LTF, L-SIG, RL-SIG, and U-SIG fields. In addition, the U-SIG field may be positioned immediately after the RL-SIG field. In addition, the U-SIG field may be jointly encoded. In addition, the U-SIG field may include 52 data tones and four pilot tones every 20 MHz. In addition, the U-SIG field may be subject to BPSK modulation.

In addition, the U-SIG field may include a version independent field and a version dependent field. The version independent field may be a version independent part. That is, the version independent field may be a part included the same regardless of a standard of a PPDU in which the U-SIG field is included. The version independent field may have the same format regardless of a standard of a PPDU in which the U-SIG field is included. For example, respective subfields included in the version independent field may indicate the same meaning regardless of a standard of a PPDU in which the respective subfields are included. In addition, the respective subfields included in the version independent field may exist at the same position regardless of a standard of a PPDU in which the respective subfields are included. In addition, the respective subfields included in the version independent field may have the same number of bits (or the same bit width) regardless of a standard of a PPDU in which the respective subfields are included.

The meaning of "regardless of a standard of a PPDU in which the U-SIG field is included" may be "regardless of a PHY version field value included in the U-SIG field". The meaning of "regardless of a standard of a PPDU in which the U-SIG field is included" may be "regardless of whether to be included in an EHT PPDU or a PPDU after an EHT standard".

The version dependent field may be a version dependent part. That is, the version dependent field may be different parts according to a standard of a PPDU in which the U-SIG field is included. The version dependent field may have different formats according to a standard of a PPDU in which the U-SIG field is included. For example, respective subfields (or bits) included in the version dependent field may have different meanings or positions according to a standard of a PPDU in which the respective subfields are included. The meaning of "being different according to a standard of a PPDU in which the U-SIG field is included" may be "being different when a PHY version field value included in the U-SIG field is different". The meaning of "being different according to a standard of a PPDU in which the U-SIG field is included" may be "being different according to whether to be included in an EHT PPDU or a PPDU after an EHT standard".

According to an embodiment of the present invention, the U-SIG field may include a PHY version field. In an embodiment, the version independent field of the U-SIG field may include a PHY version field. The meaning of the PHY version field may be the same as one described above. For example, the PHY version field may indicate a standard of a PPDU including the PHY version field. In addition, the PHY version field may indicate a standard to which a format or a function of a MAC frame included in a PPDU including the PHY version field corresponds. Alternatively, the PHY version field may indicate a format of the version dependent field of the U-SIG field including the PHY version field. According to an embodiment, the PHY version field may be 3 bits. For example, when the PHY version field is configured as 000 (in a binary number; 0 in a decimal number), the EHT standard may be indicated.

According to an embodiment of the present invention, the U-SIG field may include a UL/DL field. In an embodiment, the version independent field of the U-SIG field may include a UL/DL field. The UL/DL field may take a role of indicating whether a PPDU including the UL/DL field is an uplink or a downlink. Alternatively, the UL/DL field may take a role of indicating whether the PPDU including the UL/DL field has been transmitted by an AP or a non-AP STA. Alternatively, the UL/DL field may take a role of indicating whether an intended receiver of the PPDU including the UL/DL field is an AP or a non-AP STA. According to an embodiment, the UL/DL field may be 1 bit.

According to an embodiment of the present invention, the U-SIG field may include a bandwidth field. In an embodiment, the version independent field of the U-SIG field may include a bandwidth field. The bandwidth field may indicate a bandwidth of a PPDU including the bandwidth field. In this case, the bandwidth of the PPDU may mean a maximum bandwidth occupied by the PPDU. For example, the bandwidth of the PPDU may mean a bandwidth when the PPDU is not punctured. According to an embodiment, the bandwidth field may be 3 bits.

According to an embodiment of the present invention, the U-SIG field may include a puncturing pattern field. In an embodiment, the version independent field of the U-SIG field may include a puncturing pattern field. In another embodiment, the version dependent field of the U-SIG field may include a puncturing pattern field. The puncturing pattern field may indicate the above-described puncturing pattern information.

Figure 17:
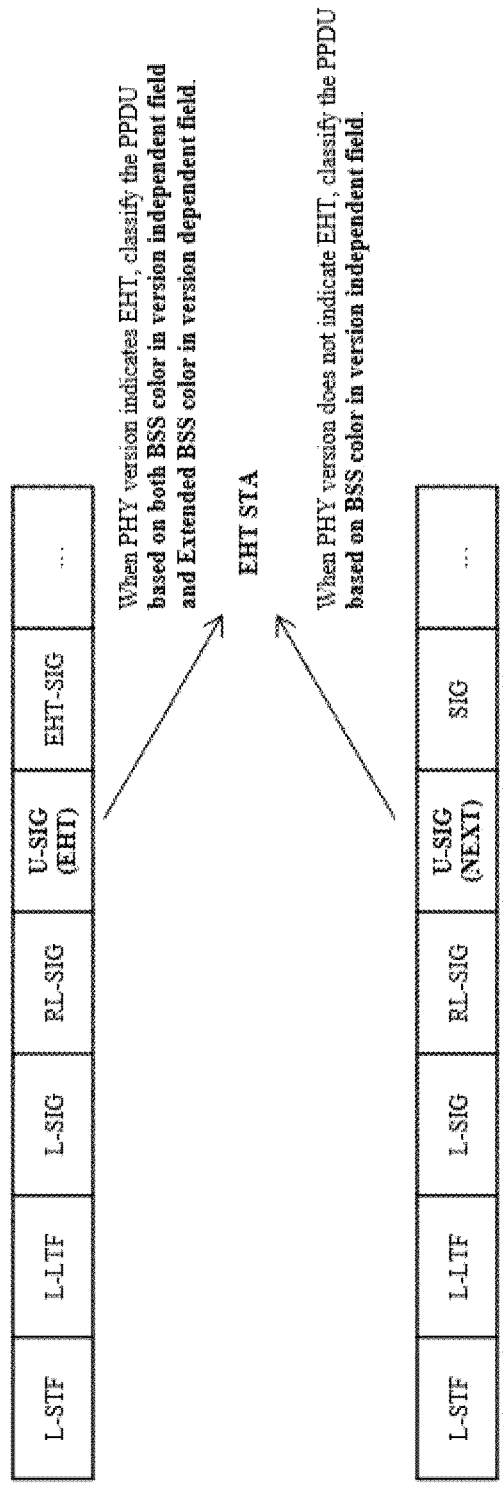
FIG. 17 illustrates an example of a method for using an extended BSS color field according to an embodiment of the present invention.

According to an embodiment of the present invention, the U-SIG field may include a BSS color field. In an embodiment, the version independent field of the U-SIG field may include a BSS color field. The BSS color field may include a BSS color. Alternatively, the BSS color field may indicate a BSS color. In this case, the BSS color included in the U-SIG field may be the BSS color described above in FIGS. 7, 13, etc. According to an embodiment, the BSS color may be an identifier of a BSS. Referring to FIG. 17, the BSS color field may include N_B bits. According to an embodiment, N_B bits may be 6 bits. According to another embodiment, N_B may be a value greater than 6. For example, N_B may be 7. Alternatively, N_B may be 8. By using N_B bits greater than 6 bits, BSS classification resolution based on the BSS color can be increased compared to a case where 6 bits are used for the BSS color. The number of BSS color bits corresponding to a HE standard may be six. In another embodiment, N_B may be a value smaller than six, and in this case, it is advantageous in that a content other than the BSS color may be further included in the U-SIG field. In an additional embodiment, the BSS color field of N_B bits described in the present invention may be configured as separate fields including a 6-bit BSS color 1 field and an (N_B−6)-bit BSS color 2 field, and embodiments are applicable to such configuration.

According to an embodiment of the present invention, the version dependent field of the U-SIG field may include an extended BSS color field. The extended BSS color field may include a BSS color. For example, the extended BSS color field may indicate the BSS color. More specifically, the extended BSS color field may include an additional BSS color value. Alternatively, the extended BSS color field may include some information of the BSS color. Referring to FIG. 17, the extended BSS color field may include N_EB bits. According to an embodiment, N_EB may be smaller than N_B. That is, the BSS color information included in the version dependent field may use a smaller number of bits than BSS color information included in the version independent field. For example, N_EB may be 1 or 2.

According to an embodiment, the U-SIG field may include both a BSS color field included in the version independent field and an extended BSS color field included in the version dependent field. By using the extended BSS color field, using a BSS color having a higher resolution is possible compared to a case where only the BSS color field included in the version independent field is used. In addition, by including some of the BSS color information in the version dependent field, it may be possible to flexibly define and use limited signaling resources of the U-SIG field according to a function of a standard defined later.

According to another embodiment, the U-SIG field may include a BSS color field included in the version independent field. In addition, in this case, the U-SIG field may not include the extended BSS color field included in the version dependent field. In this case, it is advantageous in that a BSS color having a higher resolution can be used also for a PPDU of a standard defined later, compared to a case where limited signaling resources of the U-SIG field are used for the extended BSS color field.

According to an embodiment, the BSS color field included in the version independent field may be configured on the basis of one or more operation elements. An operation element may be transmitted by an AP. The operation element may include a beacon frame, an association response frame, a reassociation response frame, a probe response frame, etc. The operation element may include parameters related to an operation of a BSS. The operation element may include a HE operation element, an EHT operation element, etc. The HE operation element and the EHT operation element may be operation elements corresponding to a HE standard and an EHT standard, respectively. In a more detailed example, a BSS color field included in a version independent field may be configured on the basis of a BSS color indicated from the HE operation element and a BSS color indicated from the EHT operation element. Alternatively, a BSS color field included in a version independent field may be configured on the basis of a BSS color configured in the HE operation element and a BSS color configured in the EHT operation element. In this case, as described above, configuring the BSS color field may indicate configuring TXVECTOR parameter BSS_COLOR. In addition, as described in the description of the BSS color field, TXVECTOR parameter BSS_COLOR and RXVECTOR parameter BSS_COLOR may include BSS_COLOR 1 which is indicated by 6 bits (which can indicate values of 0 to 63) and BSS_COLOR 2 which can be indicated by (N_B−6) bits (which can indicate values of 0 to (2^(N_B−6)−1)). A 6-bit BSS color field included in the version independent field may be configured by the BSS color indicated from the HE operation element (or the BSS color configured in the HE operation element), and an (N_B−6)-bit BSS color field included in the version independent field may be configured by the BSS color indicated from the EHT operation element (or the BSS color configured in the EHT operation element). This may correspond to a case where N_B is greater than 6. When N_B is equal to 6, a BSS color field included in the version independent field may be configured by using only the BSS color included in the HE operation element.

According to an embodiment, an extended BSS color field included in the version dependent field may be configured on the basis of one or more operation elements. The above description of the operation element is applied the same. In a more detailed example, an extended BSS color field included in the version dependent field may be configured on the basis of a BSS color indicated from the EHT operation element. Alternatively, an extended BSS color field included in the version dependent field may be configured on the basis of a BSS color configured in the EHT operation element. In this case, as described above, configuring the BSS color field may indicate configuring TXVECTOR parameter BSS_COLOR. Alternatively, there may be an EXTENDED BSS_COLOR parameter, separately from TXVECTOR parameter BSS_COLOR and RXVECTOR parameter BSS_COLOR. The EXTENDED BSS_COLOR parameter may be indicated by N_ET bits. The EXTENDED BSS_COLOR parameter may indicate values of 0 to (2^N_ET-1). In combination with the embodiment above relating to the BSS color field included in the version independent field, some bits of the BSS color included in the EHT operation element may be used to configure the BSS color field included in the version independent field, and some other bits of the BSS color included in the EHT operation element may be used to configure the extended BSS color field included in the version dependent field.

In the embodiment above, the embodiment of configuring the BSS color field or configuring the extended BSS color field may be also applied to a case of configuring an active BSS color.

In addition, the above-described method for using the BSS color field included in the version independent field and the extended BSS color field included in the version dependent field is further described through an embodiment of other drawing.

According to an embodiment of the present invention, a U-SIG field may include a TXOP field. In an embodiment, a version independent field of the U-SIG field may include a TXOP field. The TXOP field may include a TXOP. The TXOP may be a value which can be used to set up the above described TXOP, TXOP duration, duration information, TXVECTOR parameter TXOP_DURATION, RXVECTOR parameter TXOP_DURATION, or the NAV. Alternatively, the TXOP field may indicate the TXOP. Referring to FIG. 17, the TXOP field may include N_T bits. According to an embodiment, N_T bits may be 7 bits. According to another embodiment, N_T may be a value greater than 7. For example, N_T may be 8. Alternatively, N_T may be 9. By using N_T bits greater than 7 bits, a resolution of duration information which can be indicated by the TXOP can be increased and the range can be increased. The number of TXOP bits corresponding to the HE standard may be 7. In another embodiment, N_T may be a value smaller than 7, and in this case, it is advantageous in that a content other than the TXOP can be further included in the U-SIG field. In an additional embodiment, the TXOP field of the N_T bits mentioned in the present invention may be configured by separate fields including a 7-bit TXOP 1 field and an (N_T-7)-bit TXOP 2 field, and embodiments are applicable to such a configuration.

According to an embodiment of the present invention, the version dependent field of the U-SIG field may include an extended TXOP field. The extended TXOP field may include a TXOP. For example, the extended TXOP field may indicate the TXOP. More specifically, the extended TXOP field may include an additional TXOP value. Alternatively, the extended TXOP field may include some information of the TXOP. Alternatively, the extended TXOP field includes information correcting the TXOP. Referring to FIG. 17, the extended TXOP field may include N_ET bits. According to an embodiment, N_ET may be smaller than N_T. That is, TXOP information included in the version dependent field may use a smaller bit than TXOP information included in the version independent field. For example, N_ET may be 1 or 2.

According to an embodiment, the U-SIG field may include both the TXOP field included in the version independent field and the extended TXOP field included in the version dependent field. In such a case, by using the extended TXOP field, a TXOP having a higher resolution or having a wider range which can be indicated by the TXOP may be used, compared to a case where only the TXOP field included in the version independent field is used. In addition, by including the additional TXOP information in the version dependent field, limited signaling resources of the U-SIG field may be flexibly defined and used according to a function of a standard to be defined later.

According to another embodiment, the U-SIG field may include a TXOP field included in the version independent field. In addition, in this case, the U-SIG field may not include the extended TXOP field included in the version dependent field. In such a case, it is advantageous in that a TXOP having a higher resolution or having a wider range which can be indicated by the TXOP can be used also for the PPDU of the standard defined later, compared to a case of using limited signaling resources of the U-SIG field for the extended TXOP field.

The above-described method for using the TXOP field included in the version independent field and the extended TXOP field included in the version dependent field may be further described through an embodiment of other drawing.

According to an embodiment of the present invention, when an STA configures a received PHY version field as a pre-configured value, the STA may ignore information included in the U-SIG field including the PHY version field. Alternatively, when the PHY version field is configured as a pre-configured value, information included in the version independent field including the PHY version field may be ignored. The pre-configured value may be a value having all bits configured by 1. When the PHY version field is 3 bits, the pre-configure value may be 7. Alternatively, when the PHY version field configures as a pre-configured value, there may be a PHY version field other than the PHY version field. Alternatively, when the PHY version field is configured as a pre-configured value, a format of the U-SIG field or the version independent field may vary. When the STA ignores information included in a received U-SIG field, the STA may ignore a PPDU including the U-SIG field or suspend decoding. In addition, the STA ignores the information included in the received U-SIG field, the STA may not update the NAV. In addition, when the STA ignores the information included in a received U-SIG field, it is possible to conclude that BSS classification in not performed or BSS classification cannot be performed.

In the PHY version field, the number of PHY versions to be signaled may be limited. Accordingly, when there are more than a limited number of PHY versions, a method for indicating the same may be required, and thus the PHY version field may be configured as a pre-configured value and a U-SIG having another configuration may be used. Alternatively, the U-SIG field includes the version independent field having the same format regardless of the PHY version, but if a design error related thereto occurs, to prevent an STA in a past standard causes malfunction due to the version independent field corresponding to the past standard, an operation such as the embodiment above may be performed.

FIG. 17 illustrates an example of a method for using an extended BSS color field according to an embodiment of the present invention.

Referring to FIG. 17, a BSS may be classified using a BSS color field included in a PPDU.

Specifically, as described above, BSS classification based on the BSS color may be performed. In addition, in this embodiment, the above-described BSS color information may be used, and the description thereof above may be omitted.

According to an embodiment of the present invention, an STA may classify a BSS on the basis of multiple pieces of BSS color information included in a received PPDU. In an embodiment, all of the multiple pieces of BSS color information included in the received PPDU and multiple pieces of BSS color corresponding to the STA are matched, the STA may classify the PPDU as an intra-BSS PPDU. In addition, when at least one of the multiple pieces of BSS color information included in the received PPDU and BSS color information corresponding to the STA are not matched, the STA may classify the PPDU as an inter-BSS PPDU. For example, the multiple pieces of BSS color information may mean the BSS color included in the version independent field and the BSS color included in the version dependent field. Alternatively, the multiple pieces of BSS color information may mean the BSS color 1 field included in the version independent field and the BSS color 2 field included in the version independent field. Accordingly, for example, the STA may classify the BSS on the basis of the BSS color included in the version independent field and the BSS color, included in the version dependent field, included in the received PPDU. Alternatively, the STA may classify BSS color 1 included in the version independent field and BSS color 2 included in the version independent field, included in the received PPDU.

According to an embodiment of the present invention, classifying, by the STA, the BSS on the basis of the BSS color included in the version independent field and the BSS color included in the version dependent field, included in the received PPDU, may be limited to a case where the received PPDU corresponds to a standard of the STA or a standard before the standard of the STA. The standard corresponding to the received PPDU may be determined on the basis of the PHY version field. Accordingly, for example, when an EHT STA receives an EHT PPDU, the BSS may be classified on the basis of the BSS color included in the version independent field and the BSS color included in the version dependent field. In addition, when the EHT STA receives a PPDU of a NEXT standard, an operation of classifying the BSS on the basis of the BSS color included in the version independent field and the BSS color included in the version dependent field may not be performed. When a NEXT STA receives a PPDU of the NEXT standard or a standard before the NEXT standard, the BSS may be classified on the basis of the BSS color included in the version independent field and the BSS color included in the version dependent field.

According to an embodiment of the present invention, classifying, by the STA, the BSS only on the basis of the BSS color included in the version independent field included in the received PPDU (not on the basis of the BSS color included in the version dependent field) may be limited to a case where the received PPDU corresponds to a standard after the standard of the STA. The standard corresponding to the received PPDU may be determined on the basis of the PHY version field. Accordingly, for example, when the EHT STA received a PPDU of the NEXT standard, the BSS may be classified on the basis of the BSS color included in the version independent field. When the NEXT STA receives the PPDU after the NEXT standard, the BSS may be classified on the basis of the BSS color included in the version independent field.

As described above, when the STA classifies the BSS of the received PPDU, the STA may perform another operation on the basis of the standard corresponding to the received PPDU. For example, as described above, when the STA classifies the BSS of the received PPDU, the STA may perform an operation based on a different number of pieces of BSS color information or BSS color information having a different number of bits on the basis of the standard corresponding to the received PPDU.

Referring to FIG. 17, an EHT STA may receive a PPDU. For example, the PPDU may include a U-SIG field. If a PHY version field included in the U-SIG field indicates an EHT standard, a BSS may be classified on the basis of a BSS color included in a version independent field and an extended BSS color included in a version dependent field. If at least one of the BSS color included in the version independent field and the extended BSS color included in the version dependent field is different from a value corresponding to a BSS of a receiving STA, the received PPDU may be classified as an inter-BSS PPDU. If both the BSS color included in the version independent field and the extended BSS color included in the version dependent field are the same as a value corresponding to a BSS of a receiving STA, the received PPDU may be classified as an intra-BSS PPDU.

If a PHY version field included in the U-SIG field indicates a standard after the EHT standard, the BSS may be classified on the basis of the BSS color included in the version independent field. In this case, the BSS may be classified not on the basis of the BSS color included in the version dependent field. If the BSS color included in the version independent field is different from a value corresponding to the BSS of the receiving STA, the received PPDU may be classified as an inter-BSS PPDU. If the BSS color included in the version independent field is identical to a value corresponding to the BSS of the receiving STA, the received PPDU may be classified as an intra-BSS PPDU.

According to an embodiment of the present invention, when the BSS color field included in the version independent field indicates no meaning, it may be determined that the extended BSS color field included in the version dependent field also indicates no meaning. When the BSS color field indicates no meaning, the BSS color field may be configured as a pre-configured value. For example, the pre-configured value may be 0. In addition, when the BSS color field or the extended BSS color field indicates no meaning, a BSS classification operation based thereon may not be performed.

Figure 18:
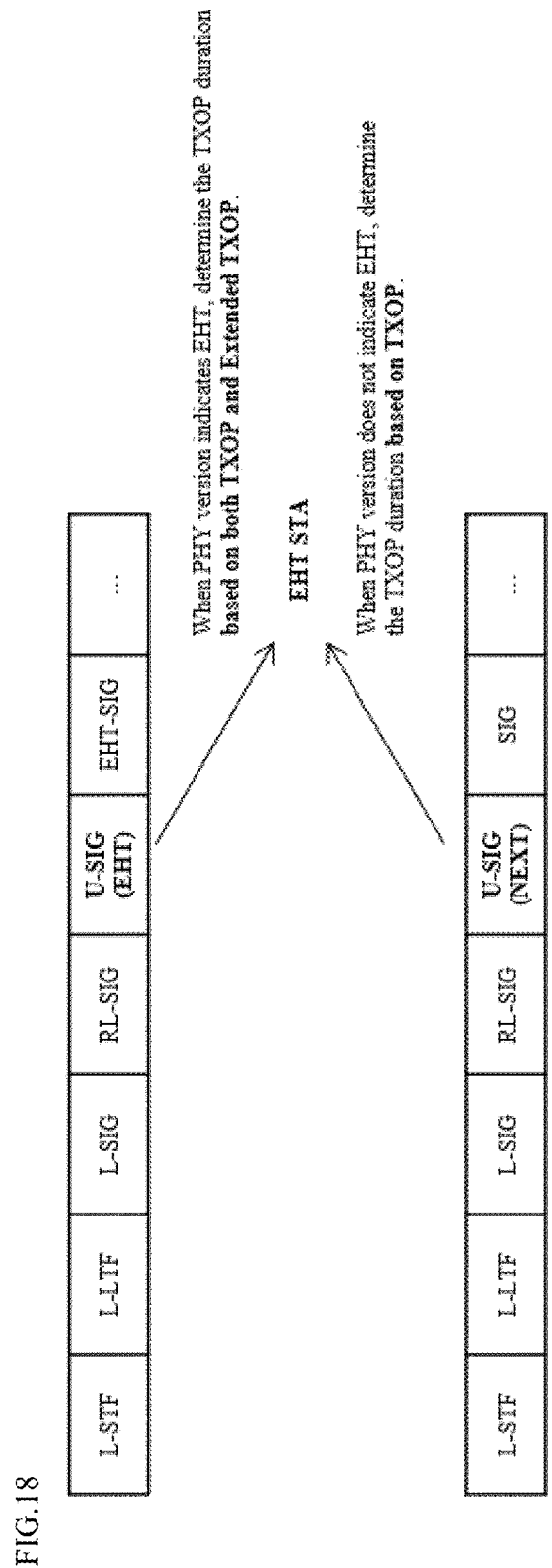
FIG. 18 illustrates an example of a method for using an extended TXOP field according to an embodiment of the present invention.

FIG. 18 illustrates an example of a method for using an extended TXOP field according to an embodiment of the present invention.

As described above, an NAV may be set up on the basis of a TXOP. Alternatively, channel access may be performed on the basis of a TXOP. More specifically, channel access may be restricted for a period based on a TXOP. The above-described contents of a TXOP may be omitted. The TXOP may be a value which can be used to set up the above-described TXOP, TXOP duration, duration information, TXVECTOR parameter TXOP_DURATION, RXVECTOR parameter TXOP_DURATION, or NAV.

According to an embodiment of the present invention, an STA may determine (or configure) the TXOP on the basis of multiple pieces of TXOP information included in a received PPDU. By determining the TXOP, the TXOP-based operation may be performed as described above. That is, a TXOP may be determined on the basis of multiple pieces of TXOP information, and an NAV may be set up or channel access may be performed on the basis of the determined TXOP. For example, the multiple pieces of TXOP information may mean a TXOP included in a version independent field and a TXOP included in a version dependent field. Accordingly, for example, an STA may determine a TXOP on the basis of a TXOP included in a version independent field and a TXOP included in a version dependent field, included in a received PPDU.

According to an embodiment of the present invention, determining, by the STA, a TXOP on the basis of the TXOP included in the version independent field and the TXOP included in the version dependent field may be limited to a case where the received PPDU corresponds to a standard of the STA or a standard before the standard of the STA. The standard corresponding to the received PPDU may be determined on the basis of a PHY version field. Accordingly, for example, when an EHT STA receives an EHT PPDU, the TXOP may be determined on the basis of the TXOP included in the version independent field and the TXOP included in the version dependent field. In addition, when the EHT STA receives a PPDU of a NEXT standard, an operation of determining the TXOP on the basis of the TXOP included in the version independent field and the TXOP included in the version dependent field may not be performed. When a NEXT STA receives a PPDU of the NEXT standard or a standard before the NEXT standard, the TXOP may be determined on the basis of the TXOP included in the version independent field and the TXOP included in the version dependent field.

According to an embodiment of the present invention, determining, by the STA, the TXOP only on the basis of the TXOP included in the version independent field included in the received PPDU (not on the basis of the TXOP included in the version dependent field), may be limited to a case where the received PPDU corresponds to a standard after the standard of the STA. The standard corresponding to the received PPDU may be determined on the basis of the PHY version field. Accordingly, for example, when the EHT STA receives a PPDU of the NEXT standard, the TXOP may be determined on the basis of the TXOP included in the version independent field. When the NEXT STA receives a PPDU of a standard after the NEXT standard, the TXOP may be determined on the basis of the TXOP included in the version independent field.

As described above, when the STA determines the TXOP from the received PPDU, the STA may perform another operation on the basis of the standard corresponding to the received PPDU. For example, as described above, when the STA determines the TXOP from the received PPDU, the STA may perform an operation based on a different number of pieces of TXOP information or TXOP information having a different number of bits on the basis of the standard corresponding to the received PPDU. In this case, the TXOP received from the received PPDU may be acquired from a preamble included in the received PPDU. More specifically, in this case, the TXOP acquired from the received PPDU may be acquired from a U-SIG field included in the received PPDU.

When duration information is received from a MAC frame included in a received PPDU, an operation based on TXOP information included in the preamble of the received PPDU may not be performed. In this case, instead, an operation based on the duration information received from the MAC frame may be performed.

Referring to FIG. 18, an EHT STA may receive a PPDU. For example, the PPDU may include a U-SIG field. If a PHY version field included in the U-SIG field indicates an EHT standard, a TXOP may be determined on the basis of a TXOP included in a version independent field and a TXOP included in a version dependent field. In this case, an operation of setting up an NAV or performing channel access (for example, an operation of not performing channel access or transmission) may be performed on the basis of the determined TXOP.

If the PHY version field included in the U-SIG field indicates a standard after the EHT standard, a TXOP may be determined on the basis of a TXOP included in a version dependent field. In this case, the TXOP may be determined not on the basis of the TXOP included in the version dependent field. In this case, an operation of setting up an NAV or performing channel access (for example, an operation of not performing channel access or transmission) may be performed on the basis of the determined TXOP.

According to an embodiment of the present invention, when a TXOP field included in a version independent field indicates no meaning, it may be determined that an extended TXOP field included in the version dependent field also indicates no meaning. When a TXOP field indicates no meaning, the TXOP field may be configured as a pre-configured value. For example, the pre-configured value may be UNSPECIFIED Alternatively, the pre-configured value may be a value which makes all bits of the field be configured as 1. In addition, when the TXOP field or the extended TXOP field indicates no meaning, an NAV setup or channel access operation based thereon may not be performed.

A TXOP may be determined on the basis of the multiple pieces of TXOP information. The description of the TXOP or the multiple pieces of information may refer to the embodiments above, and the description thereof may be omitted in this embodiment. Determining a TXOP may be determining TXVECTOR parameter TXOP_DURATION or RXVECTOR parameter TXOP_DURATION.

The multiple pieces of TXOP information may include a TXOP field included in a version independent field and an extended TXOP field included in a version dependent field. According to an embodiment of the present invention, a TXOP may be determined by summing a value based on the TXOP field included in the version independent field and a value based on the extended TXOP field included in the version dependent field. This may be an operation performed when receiving TXOP information. Alternatively, a TXOP may be determined by subtracting a value based on the extended TXOP field included in the version dependent field from a value based on the TXOP field included in the version independent field.

Equation 4 below shows an example of a method for obtaining TXOP_DURATION corresponding to an RXVECTOR parameter.

$$\text{TXOP\_DURATION}=(\text{value based on TXOP})+(\text{value based on Extended TXOP}) \quad \text{[Equation 4]}$$

Referring to Equation 4, a value based on the TXOP field included in the version independent field may be a "(value based on TXOP)", and a value based on the extended TXOP field included in the version dependent field may be a "(value based on Extended TXOP)".

The TXOP field included in the version independent field may be a field also included in a PPDU of another standard, and an STA supporting only the past standard may need to determine a TXOP on the basis of the TXOP field included in the version independent field. Accordingly, the TXOP may be determined on the basis of the TXOP field included in the version independent field, and the extended TXOP field included in the version dependent field may be subsidiarily used. For example, as described in FIG. 18 and according to an embodiment, the TXOP field included in the version independent field and the extended TXOP field included in the version dependent field may be used. For example, the extended TXOP field included in the version dependent field may be a value for correcting the value based on the TXOP field included in the version independent field. For example, the value based on the extended TXOP field included in the version dependent field may be a value smaller than granularity (an indicatable unit; resolution) of the TXOP. The value based on the extended TXOP field included in the version dependent field may be a value smaller than granularity indicated by the TXOP field included in the version independent field.

According to an embodiment, the value based on the extended TXOP field may be a value based on the granularity of the TXOP. Referring to Equation 5, the value based on the extended TXOP field may be determined as follows. This may be an operation performed when TXOP information is received.

$$\text{(value based on Extended TXOP)}=\text{granularity}/2^N*\text{extendedTXOP}, \quad \text{[Equation 5]}$$

where N is the number of bits of Extended TXOP field, granularity is a granularity that TXOP field in version independent field represents, and extendedTXOP is a value of Extended TXOP field In Equation 5, N indicates the number of bits of a TXOP field.

The granularity may be granularity of a TXOP. Alternatively, the granularity may be granularity indicated by the TXOP field included in the version independent field. In addition, the granularity may be indicated by some bits of the TXOP field included in the version independent field. If there two types of granularity, the granularity may be indicated by one bit which is a part of the TXOP field included in the version independent field. If there are two types of granularity, the granularity may have values such as 8 us and 128 us. If there are four types of granularity, the granularity may be indicated by two bits corresponding to a part of the TXOP field included in the version independent field. If there are four types of granularity, the granularity may have values such as 8 us, 32 us, 64 us, and 128 us. Alternatively, the granularity may have a pre-configured value. In such a case, signaling for indicating the granularity may not be required. For example, the granularity may be 8 us.

In addition, extendedTXOP may be a value indicated by the extended TXOP

FIELD

Accordingly, for example, when the extended TXOP field includes two bits and the TXOP (e.g., the TXOP which can be indicated by the TXOP field included in the version independent field) is indicated in a 128 us unit, a value of the extended TXOP field may be values of 0 to 3 (00, 01, 10, and 11), and "(value based on Extended TXOP)" values corresponding thereto may be 0 us, 32 us, 64 us, 96 us, respectively.

In addition, when configuring or transmitting a TXVECTOR parameter, the extended TXOP field may be configured as follows. This may be an operation performed when TXOP information is transmitted. For example, the extended TXOP field may be configured on the basis of a value obtained by dividing a value based on TXOP_DURATION by the above-described (granularity/$2^N$). More specifically, for example, the extended TXOP field may be configured by flooring or ceiling a value obtained by dividing the value based on TXOP_DURATION by (granularity/$2^N$). In addition, the value based on the TXOP_DURATION may be a value obtained by subtracting (a minimum value which can be indicated by granularity of a current corresponding TXOP) from TXOP_DURATION. For example, when a value equal to or greater than 512 us is indicated by granularity of 128 us, the value based on TXOP_DURATION may be (TXOP_DURATION−512). In addition, when the extended TXOP field includes two bits and the TXOP (for example, the TXOP which can be indicated by the TXOP field included in the version independent field) is indicated in a 128 us unit, the extended TXOP field may be based on (value based on TXOP_DURATION)/(128/4). For example, in this case, the extended TXOP field may be floor((value based on TXOP_DURATION)/(128/4)).

Figure 21:
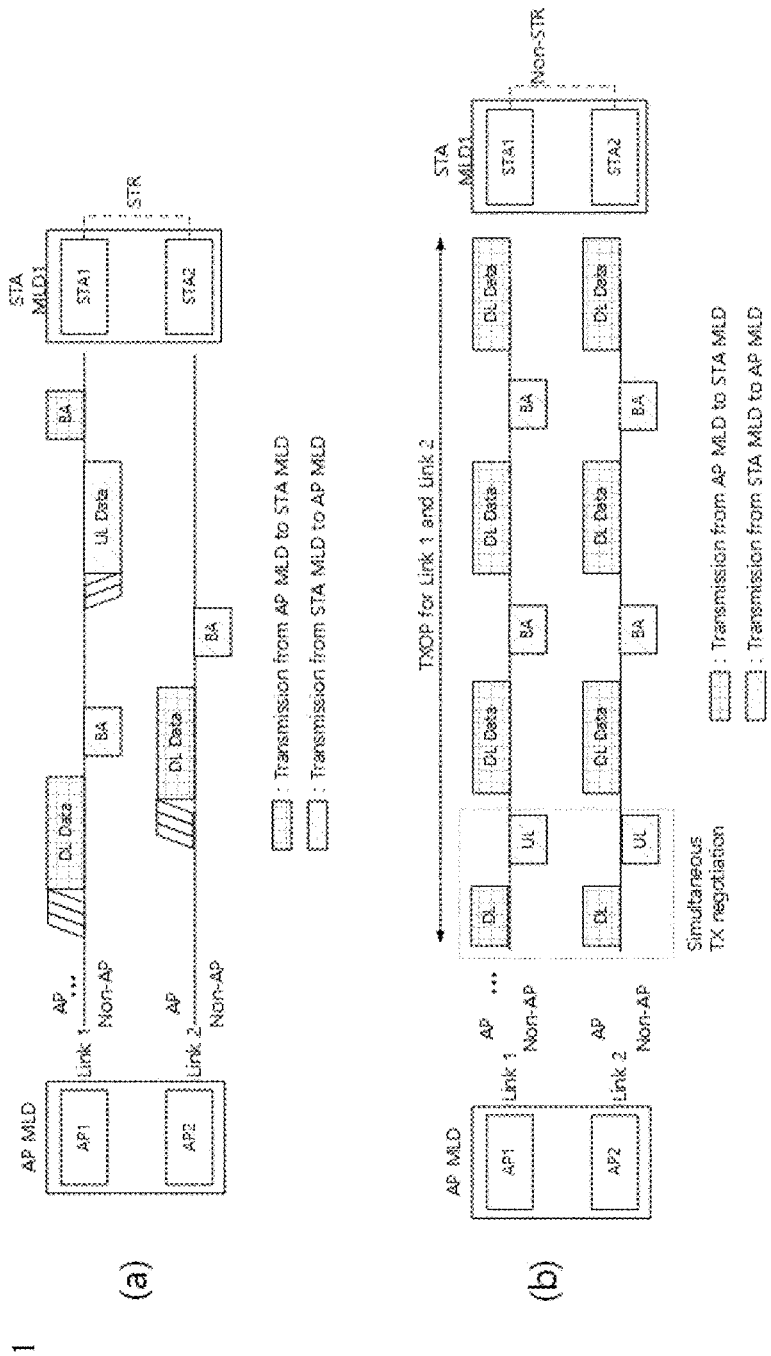
FIG. 21 is a timing diagram illustrating a transmission scheme using a multi-link.

In addition, the value based on the TXOP field included in the version independent field may be the same as descried in FIG. 21.

According to an embodiment, the extended TXOP field included in the version dependent field may be used when granularity of the TXOP has a value equal to or greater than a pre-configured value. For example, the extended TXOP field included in the version dependent field may be used when granularity of the TXOP indicated by the TXOP field included in the version independent field has a value equal to or greater than a pre-configured value. This is because a value of high resolution can be indicated without correction for the TXOP when the granularity has a smaller value. For example, when the granularity is equal to or greater than 128 us, the extended TXOP field included in the version dependent field may be used.

A TXOP value based on the TXOP field included in the version independent field may be determined according to Equation 6 below.

$$\text{(value based on TXOP)}=\text{offset}+\text{granularity}*p\text{TXOP} \quad \text{[Equation 6]}$$

where granularity is a granularity that TXOP field in version independent field represents, and pTXOP is a value of predefined bits of TXOP field offset=sum{(granularity less than the current granularity)*$2^{(N\_p\text{TXOP})}$}

Alternatively, the description of the TXOP and the multiple pieces of TXOP information may refer to the embodiments above, and the description thereof may be omitted in this embodiment. Determining a TXOP may be determining TXVECTOR parameter TXOP_DURATION or RXVECTOR parameter TXOP_DURATION.

According to an embodiment, the TXOP determination method described in Equation 6 may be used when determining a TXOP only on the basis the TXOP field included in the version independent field. For example, when the U-SIG field does not include the extended TXOP field included in the version dependent field, the TXOP may be determined only on the basis of the TXOP field included in the version independent field. Alternatively, as described in FIG. 19, when the version indicated by the U-SIG field corresponds to a standard not corresponding to the STA having received the PPDU (or an unrecognizable standard or a future standard), the TXOP may be determined only on the basis of the TXOP field included in the version independent field.

According to another embodiment, the TXOP determination method described in Equation 6 may be used when the TXOP is determined on the basis of the TXOP field included in the version independent field and the extended TXOP field included in the version dependent field, as described in FIGS. 17 and 18. For example, as described in FIGS. 17 and 18, the TXOP determination method described in FIG. 21 may be used when the value based on the TXOP field included in the version independent field is determined in a case where the TXOP is determined on the basis of the TXOP field included in the version independent field and the extended TXOP field included in the version dependent field. That is, for example, by using the TXOP determination method described in FIG. 21, the "(value based on TXOP)" described in FIG. 20 may be determined.

In the present invention, a TXOP based on a TXOP field included in a version independent field may be called a "(value based on TXOP)".

According to an embodiment, the "(value based on TXOP)" may be based on an offset, granularity, and a TXOP field value. This may be an operation performed when TXOP information is received. Referring to FIG. 21, the "(value based on TXOP)" may be based on an offset, granularity, and pTXOP. For example, the "(value based on TXOP)" may be determined on the basis of the offset and a (value indicated by TXOP field). For example, the "(value based on TXOP)" may be a value obtained by summing the offset and the (value indicated by TXOP field). The (value indicated by TXOP field) may be based on pTXOP. In addition, pTXOP may be a value indicated by some bits of the TXOP field. For example, pTXOP may be a value indicated by bits remaining after excluding a bit indicating granularity from the TXOP field. In addition, pTXOP may be a value obtained by converting some bits of the TXOP field into a decimal number. In addition, the (value indicated by TXOP field) may be based on granularity. The granularity may indicate some bits of the TXOP field. The granularity may indicate $N\_G$ bits of the TXOP field. For example, the granularity may indicate $N\_G$ LSBs of the TXOP field. In addition, the TXOP field may be $N\_T$ bits. In this case, pTXOP may be a value indicated by bits (($N\_T$–$N\_G$) bits) remaining after excluding a bit indicting the granularity from the TXOP field. In addition, in the present invention, the ($N\_T$–$N\_G$) value may be indicated by $N\_pTXOP$. For example, there may be a case where a TXOP field is 7 bits, and B0 (LSB) indicates granularity. In this case, a value indicated by a B1 bit to a B6 bit of the TXOP field may be pTXOP. For example, when all of the B1 bit to the B6 bit are configured as 1, pTXOP may be 63. In addition, when all bits remaining after a B3 bit from among the B1 bit to the B6 bit are configured as 1 (where, B3 is configured as 0), pTXOP may be 59.

The granularity may indicate some bits of the LSB of the TXOP field. The granularity may be a value of a power of 2. For example, the granularity may indicate 4, 8 us, 16 us, 32 us, 64 us, 128 us, etc. For example, the granularity may be indicated by one bit of the TXOP field. For example, one bit of the TXOP field may indicate granularity of 8 us and 128 us. In another example, the granularity may be indicated by two bits of the TXOP field. For example, two bits of the TXOP field may indicate granularity of 4 us, 8 us, 32 us, and 128 us. Alternatively, two bits of the TXOP field may indicate granularity of 8 us, 32 us, 64 us, and 128 us. Alternatively, two bits of the TXOP field may indicate granularity of 8 us, 16 us, 32 us, and 128 us. Alternatively, two bits of the TXOP field may indicate granularity of 8 us, 16 us, 32 us, and 64 us.

For example, the (value indicated by TXOP field) may be a value obtained by multiplying the granularity and pTXOP.

In addition, the offset may be a value based on (granularity having a value different from current granularity). In addition, the offset may be a value based on a maximum value of pTXOP. For example, the offset may be based on a value obtained by multiplying the (granularity having a value different from current granularity) and the (value based on maximum value of pTXOP). In addition, the (granularity having a value different from current granularity) may be possible granularity less than current granularity. For example, the offset may be based on a value obtained by summing values obtained by multiplying the (granularity having a value different from current granularity) and the (value based on maximum value of pTXOP). When the (value based on maximum value of pTXOP) is constant, the offset may be also based on a value obtained by multiplying the (value based on maximum value of pTXOP) and a value obtained by summing values of the (granularity having a value different from current granularity).

The value based on the maximum value of pTXOP may be a $2\char`\^N\_pTXOP$ value. Alternatively, the value based on the maximum value of pTXOP may be a value obtained by summing the maximum value of pTXOP and current granularity. For example, when $N\_pTXOP$ is 6, the value based on maximum value of pTXOP may be 64.

Referring to Equation 6, the offset may be based on a value obtained by summing values obtained by multiplying the (granularity having a value different from current granularity) and ($2\char`\^N\_pTXOP$). If the (granularity having a value different from current granularity) does not exist, the offset may be 0. For example, when there are two types of granularity available for the TXOP, which are 8 us and 128 us, and current granularity is 8 us, the offset may be 0. In addition, for example, when there are two types of granularity available for the TXOP, which are 8 us and 128 us, and current granularity is 128 us, the offset may be $8*(2\char`\^N\_pTXOP)$.

In another example, when there are four types of granularity available for the TXOP, which are 8 us, 32 us, 64 us, and 128 us, and current granularity is 8 us, the offset may be 0. When there are four types of granularity available for the TXOP, which are 8 us, 32 us, 64 us, and 128 us, and current granularity is 32 us, the offset may be $(8)*(2\char`\^N\_pTXOP)$. When there are four types of granularity available for the TXOP, which are 8 us, 32 us, 64 us, and 128 us, and current granularity is 64 us, the offset may be $(8+32)*(2\char`\^N\_pTXOP)$. When there are four types of granularity available for the TXOP, which are 8 us, 32 us, 64 us, and 128 us, and current granularity is 128 us, the offset may be $(8+32+64)*(2\char`\^N\_pTXOP)$.

In another example, when there are four types of granularity available for the TXOP, which are 4 us, 8 us, 32 us, and 128 us, and current granularity is 4 us, the offset may be 0. When there are four types of granularity available for the TXOP, which are 4 us, 8 us, 32 us, and 128 us, and current granularity is 8 us, the offset may be $(4)*(2\char`\^N\_pTXOP)$. When there are four types of granularity available for the TXOP, which are 4 us, 8 us, 32 us, and 128 us, and current granularity is 32 us, the offset may be $(4+8)*(2\char`\^N\_pTXOP)$. When there are four types of granularity available for the TXOP, which are 4 us, 8 us, 32 us, and 128 us, and current granularity is 128 us, the offset may be $(4+8+32)*(2\char`\^N\_pTXOP)$.

In addition, $N\_pTXOP$ may be a value equal to or greater than 6. That is, six or more preconfigured bits of the TXOP field may indicate pTXOP. For example, 6, 7, 8, 9, 10, or 11 pre-configured bits of the TXOP may indicate pTXOP.

In addition, when configuring or transmitting a TXVECTOR parameter, the TXOP field may be configured as follows. This may be an operation performed when TXOP information is transmitted. For example, the TXOP field may be configured on the basis of a value obtained by dividing a value based on TXOP_DURATION by granularity. More specifically, the TXOP field may be configured by flooring or ceiling a value obtained by dividing the value based on TXOP_DURATION by granularity. For example, N_pTXOP bits indicating pTXOP may be configured on the basis of a value obtained by dividing the value based on TXOP_DURATION by granularity. In addition, the value based on TXOP_DURATION may be a value obtained by subtracting, from TXOP_DURATION, a value obtained by summing values obtained by multiplying the (granularity having a value different from current granularity) and (2^N_pTXOP).

For example, possible granularity values may be G_1, G_2, ..., G_(N−2), G_(N−1), and G N in an ascending order. If TXOP_DURATION is equal to or greater than (G_1+G_2+ ... +G_(N−1))*2^N_pTXOP, the value based on TXOP_DURATION may be as follows.

(value based on TXOP_DURATION)=TXOP_DURATION−{(G_1+G_2+ ... +G_(N−1))*2^N_pTXOP}

In addition, if TXOP_DURATION is equal to or greater than (G_1+G_2++G_(N−2))*2^N_pTXOP and less than (G_1+G_2+ ... +G_(N−1))*2^ N_pTXOP, the value based on TXOP_DURATION may be as follows.

(value based on TXOP_DURATION)=TXOP_DURATION−{(G_1+G_2+ ... +G_(N−2))*2^N_pTXOP}

In addition, if TXOP_DURATION is equal to or greater than (G_1)*2^ N_pTXOP and is less than (G_1+G_2)*2^N_pTXOP, the value based on TXOP_DURATION may be as follows.

(value based on TXOP_DURATION)=TXOP_DURATION−{(G_1)*2^N_pTXOP}

In addition, if TXOP_DURATION is less than (G_1)*2^N_pTXOP, the value based on TXOP_DURATION may be as follows.

(value based on TXOP_DURATION)=TXOP_DURATION

By using such a rule, the value based on TXOP_DURATION may be configured according to a TXOP_DURATION range.

More specifically, when there are four possible granularity values, the values may be G_1, G_2, G_3, and G_4 in an ascending order. For example, G_1, G_2, G_3, and G_4 may indicate granularity of 4 us, 8 us, 32 us, and 128 us, respectively. Alternatively, G_1, G_2, G_3, and G_4 may indicate granularity of 8 us, 32 us, 64 us, and 128 us, respectively. Alternatively, G_1, G_2, G_3, and G_4 may indicate granularity of 8 us, 16 us, 32 us, and 128 us, respectively. Alternatively, G_1, G_2, G_3, and G_4 may indicate granularity of 8 us, 16 us, 32 us, and 64 us, respectively. In this case, if TXOP_DURATION is equal to or greater than (G_1+G_2+G_3)*2^N_pTXOP, the value based on TXOP_DURATION may be as follows.

(value based on TXOP_DURATION)=TXOP_DURATION−{(G_1+G_2+ ... + G_3)*2^N_pTXOP}

In addition, if TXOP_DURATION is equal to or greater than (G_1+G_2)*2^N_pTXOP and less than (G_1+G_2+G_3)*2^N_pTXOP, the value based on TXOP_DURATION may be as follows.

(value based on TXOP_DURATION)=TXOP_DURATION−{(G_1+G_2)*2^N_pTXOP}

In addition, if TXOP_DURATION is equal to or greater than (G_1)*2^N_pTXOP and less than (G_1+G_2)* 2^N_pTXOP, the value based on TXOP_DURATION may be as follows.

(value based on TXOP_DURATION)=TXOP_DURATION−{(G_1)*2^N_pTXOP}

In addition, if TXOP_DURATION is less than (G_1)*2^N_pTXOP, the value based on TXOP_DURATION may be as follows.

(value based on TXOP_DURATION)=TXOP_DURATION

More specifically, when there two possible granularity values, the values may be G_1 and G_2 in an ascending order. For example, G_1 and G_2 may be 8 us and 128 us, respectively. In this case, if TXOP_DURATION is equal to or greater than (G_1)*2^N_pTXOP, the value based on TXOP_DURATION may be as follows.

(value based on TXOP_DURATION)=TXOP_DURATION−{(G_1)*2^N_pTXOP}

In addition, if TXOP_DURATION is less than (G_1)*2^N_pTXOP, the value based on TXOP_DURATION may be as follows.

(value based on TXOP_DURATION)=TXOP_DURATION

Figure 19:
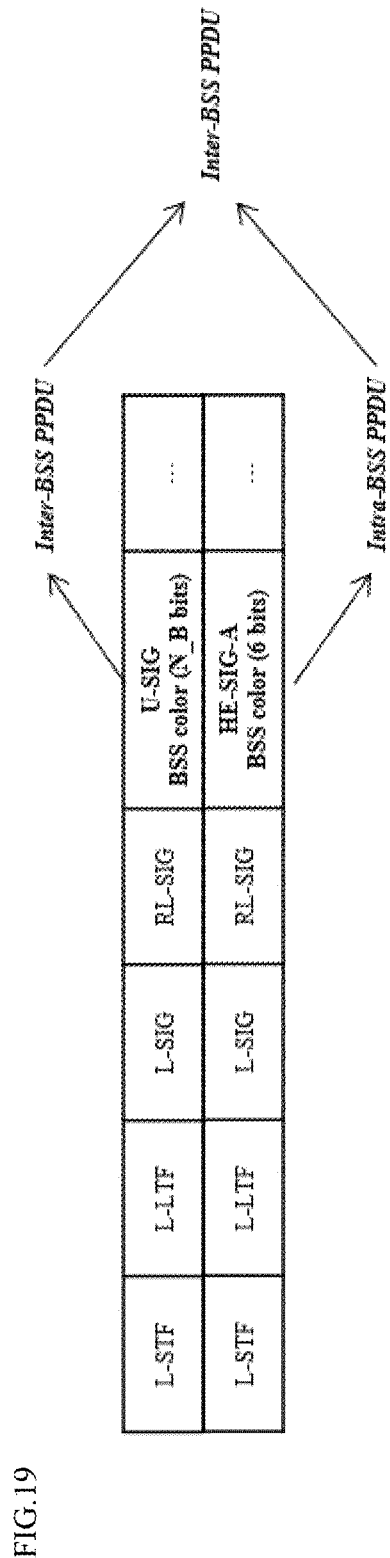
FIG. 19 illustrates an example of a BSS classification method according to an embodiment of the present invention.

FIG. 19 illustrates an example of a BSS classification method according to an embodiment of the present invention.

As described in the embodiment above, a BSS may be classified on the basis of a BSS color. In this embodiment, a description of a method for classifying a BSS on the basis of a BSS color or an operation based a classified BSS may be omitted.

According to an embodiment of the present invention, an STA may receive multiple pieces of BSS color information or multiple BSS color fields. For example, when the STA receives multiple PPDUs, multiple pieces of BSS color information may be received. In an embodiment, the STA may receive a BSS color field included in a U-SIG field and a BSS color field included in a HE-SIG-A field. Alternatively, the STA may receive a BSS color field included in a U-SIG field included in PPDU 1 and a BSS color field included in a U-SIG field included in PPDU 2. In addition, in this case, BSS color information received from PPDU 1 and BSS color information received for PPDU 2 may be different. For example, as described in FIG. 18, this is because there may be a case where BSS color information included in a version dependent field is received or not received.

In addition, when the STA receives an aggregated PPDU (A-PPDU), it is considered that the STA receives multiple PPDUs. For example, an AP may receive an A-PPDU. For example, an A-PPDU triggered (solicited) by an AP may be received by the AP. Alternatively, an AP may receive an A-PPDU transmitted by another BSS.

According to an embodiment of the present invention, when an STA receives multiple pieces of BSS color information, BSS classification results based on the multiple pieces of BSS color information may not be matched to each other. For example, received BSS color information 1 may indicate an intra-BSS PPDU, and received BSS color information 2 may indicate an inter-BSS PPDU. According to an embodiment of the present invention, in such a case, the STA may classify a BSS upon a pre-configured result. For example, in such a case, the STA may classify the PPDU as an inter-BSS PPDU. Alternatively, in such a case, the STA may classify a BSS on the basis of BSS color information using many bits among received multiple pieces of BSS color information. For example, when there are BSS classification 1 based on received BSS color information 1 and BSS classification 2 based on received BSS color information 2 and BSS color information 1 has more bits than BSS color information 2, the STA may classify the BSS according to BSS classification 2. Accordingly, the same operation performed when an inter-BSS PPDU is received may be performed also for the PPDU including BSS color information 1. For example, an intra-BSS NAV may not be set up, and a spatial reuse operation may be performed.

In addition, when there are a BSS classification result based on BSS color information included in a U-SIG field and a BSS classification result based on a MAC address, the BSS classification result based on the MAC address may be followed as a final result.

Referring to FIG. 19, a PPDU including a U-SIG field and a HE PPDU may be transmitted together, and an STA may receive one of the PPDUs. In addition, a BSS color included in the U-SIG field may be N_B bits, and a BSS color included in the HE-SIG-A field may be 6 bits. In addition, the PPDU may be classified as an inter-BSS PPDU on the basis of the BSS color included in the U-SIG field. The PPDU may be classified as an intra-BSS PPDU on the basis of the BSS color included in the HE-SIG-A field. In such a case, the PPDU may be finally determined as an inter-BSS PPDU. This may be because N_B is greater than 6. Accordingly, an intra-BSS NAV may not be set up on the basis of the BSS color included in the HE-SIG-A field.

According to an embodiment of the present invention, an STA may report a BSS color collision. For example, the STA may report the BSS color collision to an associated AP. The BSS color collision may correspond to a case where the same BSS color as a BSS color corresponding to a BSS associated with the STA exists in another surrounding BSS. For example, when an STA receives, from an inter-BSS, a PPDU using, as the BSS color, the same value as the BSS color corresponding to the BSS associate with the STA, the STA may report the BSS color collision. According to an embodiment of the present invention, there may be signaling indicating whether a BSS color collision has occurred for a 6-bit BSS color and signaling indicating whether a BSS color collision has occurred for a BSS color having a different number of bits. For example, there may be signaling indicating whether a BSS color collision has occurred for a 6-bit BSS color and signaling indicating whether a BSS color collision has occurred for a part remaining after excluding the 6-bit BSS from a BSS color having a different number of bits other than 6 bits. Alternatively, there may be signaling indicating whether a BSS color collision has occurred for a BSS color included in a HE-SIG-A field and signaling indicating whether a BSS color collision has occurred for a BSS color included in a U-SIG field.

Figure 20:
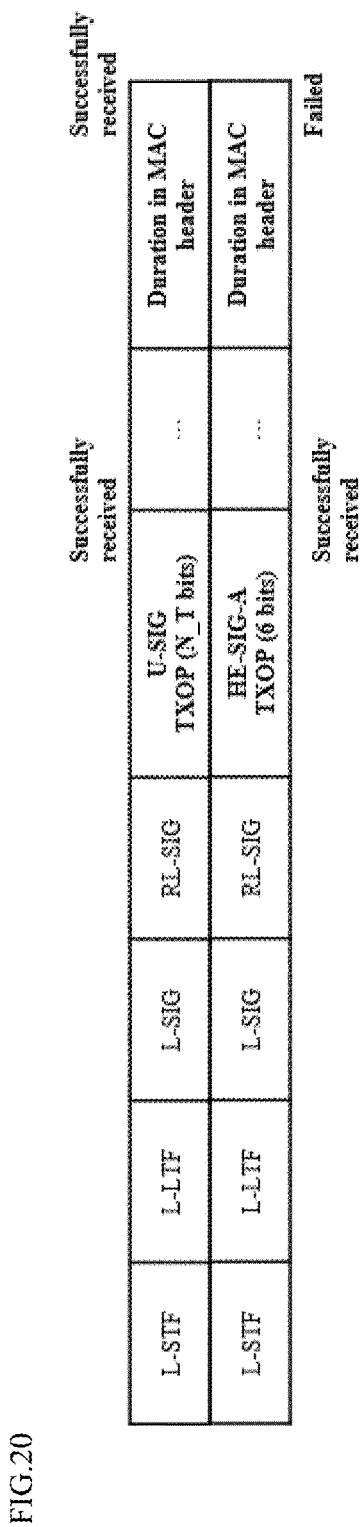
FIG. 20 illustrates an example of a duration information acquisition method according to an embodiment of the present invention.

FIG. 20 illustrates an example of a duration information acquisition method according to an embodiment of the present invention.

As described in FIG. 19, an STA may receive multiple PPDUs or multiple signaling fields. For example, an STA may receive PPDU 1 and PPDU 2. In addition, PPDU 1 may include TXOP information in a preamble, and may include duration information in a MAC header. In addition, PPDU 2 may include TXOP information in a preamble, and may include duration information in a MAC header.

According to an embodiment of the present invention, when the STA receives TXOP information included in the preamble of PPDU 1, and receives duration information from PPDU 2 transmitted together with PPDU 1 even though the STA fails to receive duration information included in a frame included in PPDU 1, the STA may not update (set up) an NAV on the basis of the TXOP information. In this case, PPDU 1 and PPDU 2 may constitute an A-PPDU. Alternatively, when the STA receives TXOP information included in the preamble of PPDU 1, receives duration information included in the frame included in PPDU 1, and fails to receive duration information included in the frame included in PPDU 2 transmitted together with PPDU 1, the STA may update (set up) an NAV on the basis of the TXOP information.

According to an embodiment of the present invention, there may be a case where the STA receives TXOP information 1 included in the preamble of PPDU 1 and receives TXOP information 2 included in the preamble of PPDU 2. According to an embodiment, in such a case, the STA may update an NAV on the basis of TXOP information having a larger number of bits of a corresponding field, among TXOP information 1 and TXOP information 2. According to an embodiment, in such a case, the STA may update an NAV on the basis of a larger value among TXOP information 1 and TXOP information 2. According to an embodiment, in such a case, when PPDU 1 is a HE PPDU and PPDU 2 is not a HE PPDU, the STA may update an NAV on the basis of TXOP information 2. According to an embodiment, in such a case, the STA may update an NAV on the basis of a value included in a U-SIG field, among TXOP information 1 and TXOP information 2. According to an embodiment, in such a case, the STA may update an NAV on the basis of a value included in a PPDU corresponding to the standard of the STA, among TXOP information 1 and TXOP information 2.

Referring to FIG. 20, an STA may receive multiple PPDUs. In this case, one of the received PPDUs may be a PPDU (PPDU 1) including a U-SIG field, and the other may be a HE PPDU (PPDU 2). In addition, the multiple PPDUs may constitute an A-PPDU. In addition, the U-SIG field may include an N_T-bit TXOP field, and a HE-SIG-A field included in the HE PPDU may include a 6-bit TXOP field. In addition, the STA may successfully receive the U-SIG field and the HE-SIG-A. In addition, the STA may have successfully received an MPDU or a frame included in PPDU 1. The STA may have failed to successfully receive an MPDU or a frame included in PPDU 2. In such a case, even though the STA receives TXOP information from PPDU 2 and fails to receive duration information included in the frame, the STA may not update an NAV on the basis of the TXOP information from PPDU 2. This may be because the STA has received duration information include in the frame from PPDU 1 transmitted together with PPDU 2. Alternatively, this may be because TXOP information indicated by a larger number of bits has been received from PPDU 1 transmitted together with PPDU 2.

FIG. 21 is a timing diagram illustrating a transmission scheme using a multi-link.

Referring to FIG. 21, an AP MLD and an STA MLD having completed a negotiation for a multi-link operation may perform a frame transmission/reception operation utilizing a multi-link through a link-specific independent transmission scheme or a simultaneous transmission scheme.

Specifically, when the multi-link operation is performed in the link-specific independent transmission scheme, as described in FIG. 10(a), each AP or terminal belonging to an AP MLD or an STA MLD independently perform a channel contention process for frame transmission in each link, and performs frame transmission in each link. In this case, a transmission start time point and a transmission end time point of a frame transmitted in each link may not be identical. When the independent transmission scheme is performed, a transmission opportunity (TXOP) acquired through the channel contention process in each link may be independently acquired in each link.

When the independent transmission scheme is performed, it is advantageous in that the operation can be more effectively performed in each link since channel access to each link is independently performed according to a channel occupancy state. In this case, when an interval between operation bands of respective APs operated by the AP MLD is not sufficient and an STR operation cannot be performed in the AP MLD or the STA MLD, the multi-link operation may not be performed in the independent scheme.

Meanwhile, when the STR operation cannot be performed in the AP MLD or the STA MLD in the multi-link (for example, when a band interval between links is not sufficient to perform a multi-link operation), the multi-link operation may be performed in the form of the simultaneous transmission operation as described in FIG. 21(b). The simultaneous transmission operation may be performed through a process of matching the transmission start time or the transmission end time of the frame transmitted in each link.

In this case, the transmission start time and the transmission end time of the frame may be called a transmission start time and a transmission end time of a PPDU including the frame. That is, when lengths of frames transmitted in respective links by an AP or a terminal are different, to match the corresponding transmission end time point, padding or a padding bit may be added and transmitted. In addition, TXOP time points for frame transmission may in respective links may be adjusted to be identical to each other. In this case, the multi-link operation in the form of the simultaneous transmission may include a negotiation stage for simultaneous transmission in multiple links, and a stage of performing simultaneous transmission by using the multiple links. The negotiation stage for the simultaneous transmission may include the stages of transmitting, to one or more links at the same time point, a request frame for acquiring a TXOP for simultaneous transmission in an MLD (e.g., an AP MLD or an STA MLD), and transmitting a response frame after a short interframe space (SIFS) from a time point at which the request frame is completed to be received by an MLD receiving data.

In this case, the response frame may be simultaneously transmitted to one or more links having received the request frame. The request frame may be a control frame. For example, the request frame may be an RTS or a multi-user (MU)-RTS frame, and the response frame may be a CTS frame. Meanwhile, when a channel of one link is in a busy state while performing channel contention for the simultaneous transmission operation, a channel access process for the simultaneous transmission operation may be performed or a frame transmission operation using only a link having an empty channel may be performed.

That is, when an AP MLD and a non-AP MLD corresponding to a set of multiple logical entities cannot perform an STR operation in each link (for example, when not supporting STR is transmitted or received through capability information), the AP MLD and the non-AP MLD may form a basic link (e.g., a primary link) for transmitting or receiving a beacon frame, a probe request frame, and a probe response frame for channel access and multiple extended links (e.g., non-primary links) for transmission or reception of other data.

In this case, some or all of the multiple extended links may perform an STR operation, and the AP MLD may be an NSTR soft MLD.

That is, the NSTR soft AP MLD may designate one NSTR link pair as a primary link to transmit the beacon frame and the probe response frame, and designate other links of an NSTR link pair as non-primary links.

When the non-AP MLD transmits a frame (e.g., a probe request frame, etc.) through the extended link rather than the primary link, the NSTR soft AP MLD may not respond to the transmitted frame.

In addition, not only the probe response frame but also an association request frame for requesting connection or association and/or an association response frame may be transmitted or received only through the primary link (basic link).

Accordingly, an AP MLD (e.g., an NSTR soft AP MLD, etc.) transmits, through a primary link, an association response frame only to an association response frame received through the primary link, and when the association request frame is received through a non-primary link (extended link), the AP MLD does not transmit the association response frame as a response to the association request frame. The channel access process for simultaneous transmission may be performed in various manners. For example, when a backoff process is performed in multiple links performing simultaneous transmission, carrier sensing is performed in all link until a backoff value becomes 0 in all links, and a channel is empty in all links as a result of the carrier sensing, a simultaneous transmission scheme may be performed by using the multiple links. Alternatively, when a channel of another link is empty for a specific time (e.g., AIFS, DIFS, or PIFS) before a backoff end time point after a backoff operation is performed in one link, the simultaneous transmission scheme using multiple links may be performed by utilizing a link having an empty channel.

Meanwhile, in a case where a transmission MLD cannot perform an STR operation in a corresponding link, when one link or some links are in a busy state during the channel access process for frame transmission in FIG. 10(b), one of the following methods may be used.

1) Perform simultaneous transmission by using the method of FIG. 10(b) after identifying that channels of both links are empty through carrier sensing for the channels of both links for a specific time (e.g., PIFS, AIFS, or AIFS+backoff time) after a corresponding busy time ends 2) Perform a transmission operation only for a link having an empty channel When the operation of 2) is performed, even after termination of a busy time of a link, the channel state of which is busy, a backoff operation for frame transmission may not be performed until a transmission end time point in a link in which transmission is performed.

Meanwhile, in a case where a transmission MLD may perform an STR operation in a corresponding link and a reception MLD cannot perform an STR operation in a corresponding link, when one link or some links are in a busy state during the channel access process for frame transmission in FIG. 10(b), one of the following methods may be used.

1) Perform simultaneous transmission by using the method of FIG. 10(b) after identifying that channels of both links are empty through carrier sensing for the channels of both links for a specific time (e.g., PIFS, AIFS, or AIFS+backoff time) after a corresponding busy time ends 2) Perform a transmission operation only for a link having an empty channel When the operation of 2) is performed, after termination of a busy time of a link, the channel state of which is busy, a channel access process may be independently performed in the corresponding link and frame transmission may be performed.

In this case, the transmission MLD is an AP MLD, and it may be impossible for the AP MLD to perform the STR operation for some or all configured links. In this case, the AP MLD which cannot perform the STR operation for some or all links may be a soft AP MLD. The soft AP MLD operates as an STA MLD, and may be defined as an MLD operating as an AP MLD under a specific condition only.

As described in FIG. 9, each AP belonging to an AP MLD may operate one link, and perform a communication operation with an STA in each link. In this case, a link which can perform an STR operation with any other link of an AP MLD among links operated by the AP MLD may be referred to as an STR available link. Among the links operated by the AP MLD, if there is one of other links of the AP MLD corresponds to a link in which STR is unavailable, the corresponding link may be referred to as an STR unavailable link. In this case, a group of links in which mutual STR is unavailable may be referred to as an STR unavailable link group. For example, AP 1, AP 2, and AP 3 belong to an AP MLD, and the respective APs may operate link 1, link 2, and link 3. In this case, in the AP MLD, link 3 may perform an STR operation with link 1 and link 2. In link 1 and link 2 of the corresponding AP MLD, a mutual STR operation may not be available. In this case, link 3 of the AP MLD may be referred to as an STR available link. Link 1 and link 2 of the AP MLD may be referred to as STR unavailable links. In this case, a group of link 1 and link 2 which cannot perform an STR operation with each other may be referred to as an STR unavailable link group. In another example, AP 1, AP 2, and AP 3 belong to an AP MLD, and the respective AP may operate link 1, link 2, and link 3. In this case, in the AP MLD, link 1 may perform an STR operation with link 3. Link 1 may not be able to perform an STR operation with link 2. Link 2 and link 3 may not be able to perform an STR operation. In this case, link 1, link 2, and link 3 of the AP MLD may be referred to as STR unavailable links. A group of all of link 1, link 2, and link 3 which cannot perform a mutual STR operation may be referred to as an STR unavailable link group. That is, only when an STR operation is available between random links included in an STR unavailable group, the group of links may be referred to as a separate STR unavailable group.

When the AP MLD cannot perform the STR operation in some or all links, the following frame transmission problem may occur.

Figure 22:
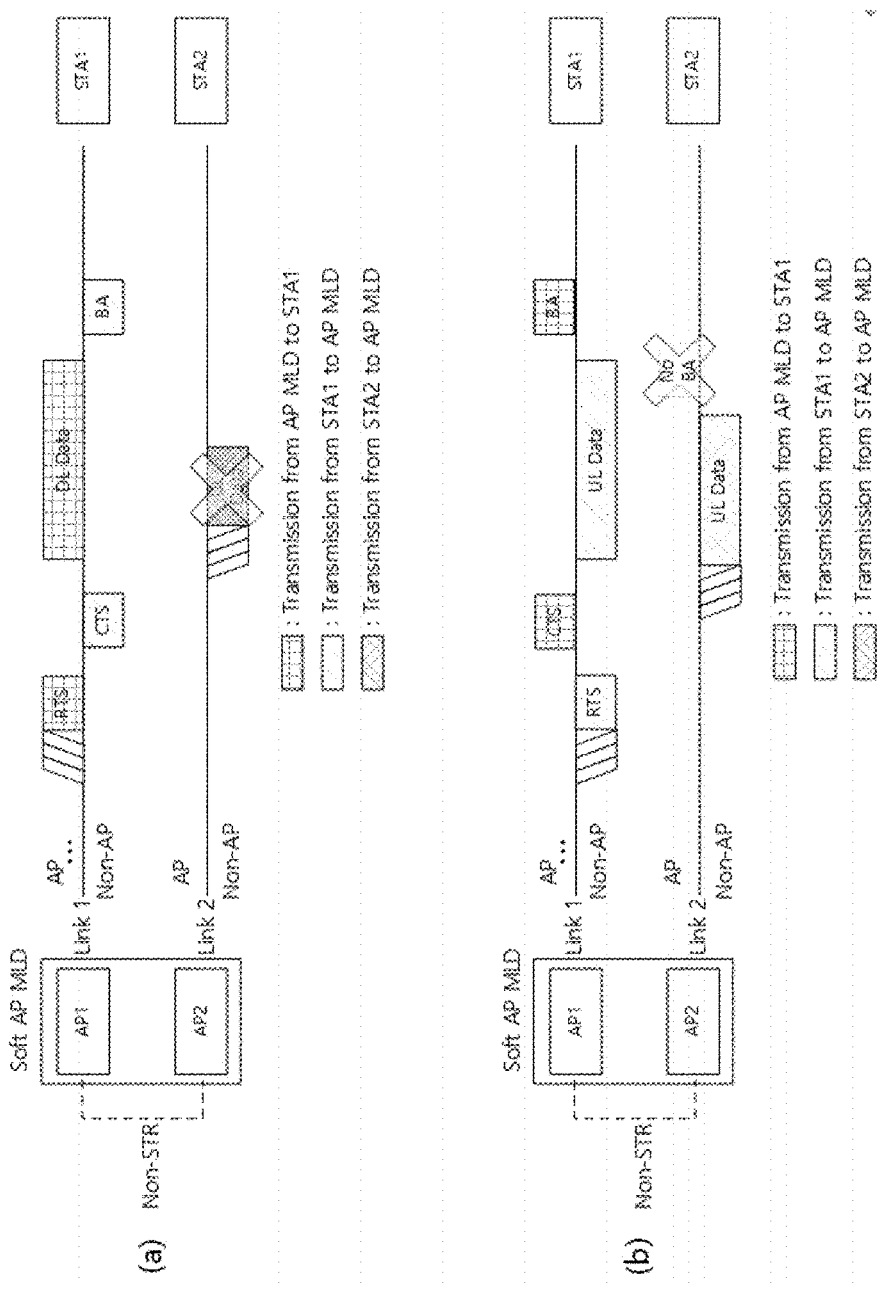
FIG. 22 illustrates an example of a frame transmission/reception process according to an unexpected uplink frame transmission operation when an AP MLD cannot perform STR.

FIG. 22 illustrates an example of a frame transmission/reception process according to an unexpected uplink frame transmission operation when an AP MLD cannot perform STR.

Referring to FIG. 22, an AP MLD may include AP 1 and AP 2. In this case, AP 1 and AP 2 may manage link 1 and link 2, respectively. It may be impossible for link 1 and link 2 to perform an STR operation. That is, link 1 and link 2 may be an STR unavailable link group. In addition, an STA (e.g., IEEE 802.11a/b/g/n/ac/ax STA) not belonging to an STA MLD may be associated with AP 1 and AP 2. For example, STA 1 may be associated with AP 1, and STA 2 may be associated with AP 2. The STA MLD may be additionally associated with the AP MLD.

When the AP MLD cannot perform the STR operation, a frame transmission error may occur due to unexpected uplink transmission. Referring to FIG. 11(a), AP 1 belonging to the AP MLD may transmit a downlink frame to STA 1. In this case, to protect a frame transmission sequence, an exchange of an RTS frame and a CTS frame before the corresponding frame transmission may be additionally performed. While AP 1 transmits a downlink frame, STA 2 which is associates with link 2 may complete a channel contention process for transmitting an uplink frame. STA 2 having completed the corresponding channel contention process may transmit the uplink frame to AP 2. In this case, the AP MLD cannot perform the STR operation in link 1 and link 2, and thus a frame reception error may occur in a frame received from STA 2 due to an influence of interference inside a device, etc. That is, while AP 1 transmits the downlink frame, AP 2 may fail to receive the frame. Due to the characteristic that STR is impossible, while a downlink frame is transmitted in one link among an STR unavailable link group, a frame transmission/reception process in another link may not be smoothly performed.

Meanwhile, a frame transmission error situation due to unexpected uplink transmission may occur between uplink operations. Referring to FIG. 11(b), STA 1 that is associated with link 1 may transmit an uplink frame to AP 1 belonging to an AP MLD. In this case, to protect a frame transmission sequence, an exchange of an RTS frame and a CTS frame before the corresponding frame transmission may be additionally performed. While STA 1 transmits an uplink frame, STA 2 that is associated with to link 2 may complete a channel contention process for transmitting an uplink frame. STA 2 having completed the corresponding channel contention process may transmit the uplink frame to AP 2. In this case, the uplink frame transmitted by STA 2 may be a frame requiring instant transmission of an ACK frame or a Block-Ack frame to an AP. The uplink frame transmitted by STA 2 may have a transmission end time point which is faster than the uplink frame transmitted by STA 1. AP 2 having received the uplink frame from STA 2 may identify the received frame, and may transmit an Ack frame or a Block-Ack frame in response to the received frame. In this case, the AP MLD cannot perform the STR operation in link 1 and link 2, and thus a frame reception error may occur in the frame received from STA 1 due to an influence of interference inside device, etc. Alternatively, AP 1 is receiving the frame STA 1 in link 1, and thus the corresponding AP MLD may recognize the occurrence of the frame reception error during the transmission of the frame in link 2. Accordingly, AP 2 may fail to transmit a response frame in link 2 in which the STA operation with link 1 is impossible. STA 2 having failed to receive the response frame from AP 2 may recognize that the frame has failed to be transmitted. Accordingly, STA 2 may further perform an additional operation for retransmission of the corresponding frame even though the frame transmission operation has been successfully performed. Accordingly, due to the characteristic that the STR is impossible, while an uplink frame is transmitted in one link, a frame transmission/reception process in another link may not be smoothly performed.

In the present invention, an AP MLD which cannot perform an STR operation in some or all links may designate a basic link and allow an association and channel access operation in the corresponding link only. In this case, the configuration of the basic link and the association with the STA or the STA MLD in the AP MLD may be performed as follows.

Figure 23:
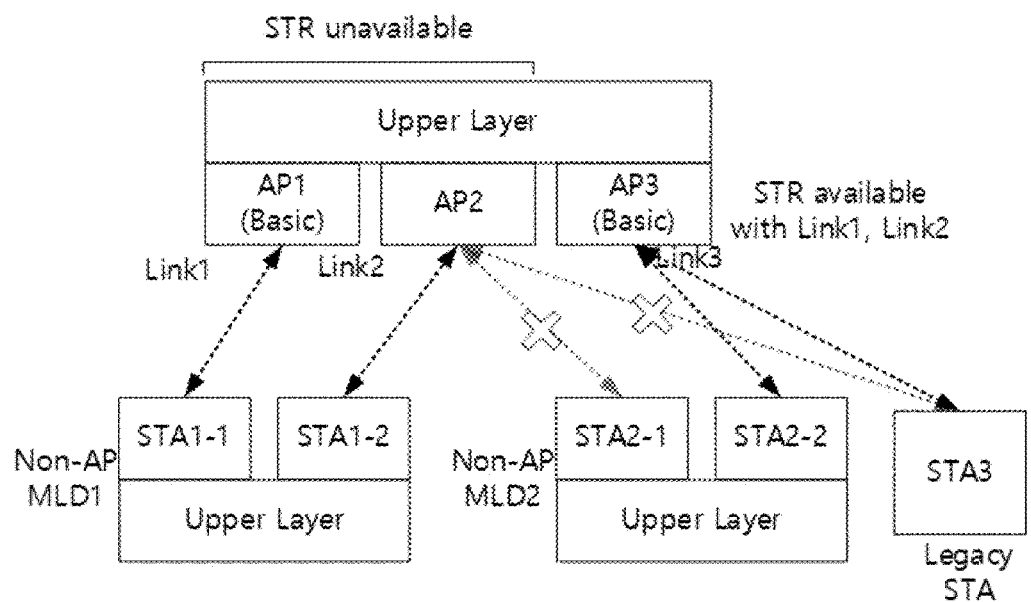
FIG. 23 is a concept diagram illustrating an example of an association state between an AP MLD and an STA or an STA MLD by utilizing a basic link concept when the AP MLD cannot perform STR.

FIG. 23 is a concept diagram illustrating an example of an association state between an AP MLD and an STA or an STA MLD by utilizing a basic link concept when the AP MLD cannot perform STR.

Referring to FIG. 23, an AP MLD may transmit or receive a specific frame only through a basic link (e.g., a primary link, etc.) among links formed with a non-AP MLD, and may perform an STR operation through an extended link (e.g., a non-primary link, etc.).

Specifically, an STR available link in the AP MLD may be configured as a basic link. Additionally, for an STR unavailable link in the AP MLD, one link in a corresponding link group may be configured as a basic link. That is, only one link among an STR unavailable link group may be configured as a basic link. A link other than the basic link in the corresponding STR unavailable link group may be configured as an extended link. Meanwhile, one AP MLD may have multiple basic links configured therein. For example, an AP MLD may include AP 1, AP 2, and AP 3, and each AP may manage link 1, link 2, and link 3. In this case, link 3 may correspond to an STR available link, and link 1 and link 2 may correspond to an STR unavailable link group. In this case, one of link 1 and link 2 in the AP MLD may be configured as a basic link, and link 3 may be also configured as a basic link. For example, the AP MLD may configure link 1 and link 3 as basic links. Alternatively, the AP MLD may configure link 2 and link 3 as basic links.

In this case, a legacy STA may transmit or receive a frame only to or from an AP having a basic link formed therewith, among multiple APs constituting an NSTR AP MLD.

That is, an AP which cannot perform an STR operation may configure a basic link. An STA not belonging to an STA MLD may be associated only in a basic link. The STA not belonging to the STA MLD cannot be associated with an extended link. For example, when the AP MLD configures link 1 and link 3 as basic links, STA 3 not belonging to the STA MLD may be associated with AP 1 or AP 3. That is, STA 3 cannot be associated with AP 2.

Meanwhile, to simplify an operation of the AP MLD and prevent from a phenomenon that a channel load is excessively increased in a basic link, the number of STR unavailable links operated by the AP MLD may be limited. That is, only when the number of STR unavailable links in the MLD is equal to or less than a specific number, the operation as the AP MLD may be allowed. For example, only when the number of STR unavailable links in the corresponding MLD is equal to or less than 2, the operation as the AP MLD may be allowed. In this case, in a case link 1, link 2, and link 3 are configured in the MLD, it may be limited so that the corresponding MLD operates as an AP MLD only when at least one link corresponds to an STR available link.

Specifically, an NSTR soft AP MLD may form a basic link (primary link) with one of multiple entities (STAs) constituting a non-AP MLD by using only one entity among multiple entities (APs) constituting the NSTR soft AP MLD. In this case, an AP and STAs forming a primary link may transmit or receive a beacon frame and a probe response frame through the primary link. In this case, for the NSTR soft AP MLD to form one primary STR unavailable link with a non-AP MLD, the primary link may be formed only when the number of multiple STR unavailable links among the links of the NSTR soft AP MLD is equal to or less than a specific number. For example, the NSTR soft AP MLD may configure a parameter indicating a maximum number of STR available links of a specific field of a control frame as a value smaller by 1 than the number of STR available links, and may configure a value of field indicating whether there are NSTR available links as a specific value (e.g., "1"). If the value of the field indicating whether there are NSTR available links indicates that there are NSTR available links, a link ID value indicating the number of links may be configured within a specific range.

Meanwhile, an STA MLD may perform an association process with an AP MLD. In this case, in a case of performing the multi-link negotiation processing described in FIG. 9 by including the STR unavailable link in the AP MLD, the multi-link negotiation process may be performed only when a basic link in the corresponding STR unavailable link group is included. For example, when an AP MLD cannot perform an STR operation in link 1 and link 2 and link 1 and link 3 are configured as basic links, an STA MLD may perform a negotiation process for a multi-link operation to use link 1 and link 2. Alternatively, the STA MLD may perform a negotiation process for a multi-link operation to use link 1 and link 3. On the other hand, the STA MLD may fail to perform a negotiation process for a multi-link operation to use link 2 and link 3.

An STA not belonging to an STA MLD may perform an association process with the STR unavailable AP MLD. In this case, the AP MLD may reject an association request from the STA in a link other than a basic link as follows.

Figure 24:
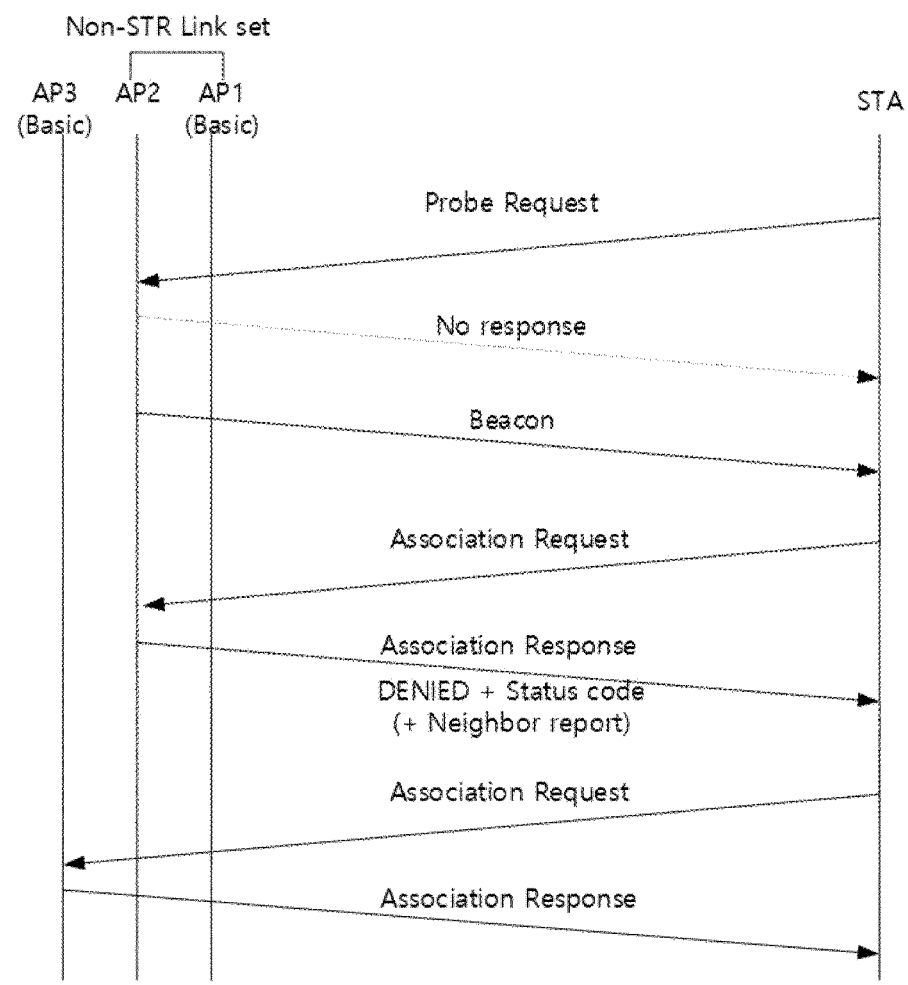
FIG. 24 is a concept diagram illustrating an example of an association process between an AP MLD and an STA not belonging to an MLD when the AP MLD cannot perform STR.

FIG. 24 is a concept diagram illustrating an example of an association process between an AP MLD and an STA not belonging to an MLD when the AP MLD cannot perform STR. In FIG. 24, a description of the same process as the channel access process of FIG. 5 may be omitted.

Referring to FIG. 24, an AP MLD may include APs corresponding to multiple logical entities, and each AP may operate a link. In this case, some or all links operated by the AP MLD may not be able to perform an STR operation. The AP MLD may configure one or more basic links. For example, the AP MLD may configure link 1 and link 3 as basic links. In this case, AP 1 in the AP MLD may operate in link 1, and AP 3 may operate in link 3. In this case, an STA not belonging to an STA MLD may perform a scanning and association process with AP 1 or AP 3 as described in FIG. 5.

When the STA performs the association process in link 2 which is not the basic link, AP 2 may reject a corresponding request. Accordingly, when the STA transmits a probe request frame in link 2, AP 2 may not transmit a response to the corresponding probe request frame. That is, AP 2 may not transmit a probe response frame. That is, an AP may transmit a beacon frame and a probe response frame only through a basic link.

Meanwhile, AP 2 may periodically transmit a beacon frame for a terminal operation in a corresponding link. The beacon frame may be transmitted at the same time point as a time point at which a beacon frame transmitted in a basic link in an STR unavailable link group in a corresponding AP MLD is transmitted. That is, a beacon frame transmitted by AP 2 may be transmitted at the same time point as a time point at which AP 1 transmits a beacon frame. In this case, STA 2 may receive the beacon frame, and may perform a passive scanning operation on the basis of the contents of the received beacon frame. Alternatively, the beacon frame may be configured not to be read in a terminal other than an STA MLD. For example, an IBSS STA subfield and an ESS subfield among a capability information field within a beacon frame may be all configured as 1, so that an STA other than an STA MLD cannot recognize a BSS type of a corresponding AP. An STA having failed to read the beacon frame and failed to perform the scanning operation may determine that there is no valid AP in a corresponding channel, and may not perform an association process. In another example, the beacon frame may include a BSS load information element. The BSS load information element may include an element ID field, a length field, an associated STA number field, a channel use rate field, and an admission control available capacity field. In this case, to control the scanning operation through the beacon frame, the associated STA number field in the BSS load information element may be configured to have a maximum value. Alternatively, the channel use rate field may be configured to have a maximum value. The STA having received the beacon frame may determine that a BSS load of a corresponding AP (e.g., AP 2) is maximum, and may not perform an association process with the corresponding AP.

In another example, a beacon frame may not be transmitted in the extended link. For example, AP 2 may not transmit a beacon frame. The STA having failed to receive the beacon frame and failed to perform the scanning operation may determine that there is no valid AP in a corresponding channel, and may not perform an association process.

Meanwhile, if an STA may read a beacon frame, the corresponding STA may transmit an association request frame to AP 2 on the basis of a result of the passing scanning. AP 2 having received the association request may transmit an association response frame as a response to the association request frame. The association response frame may include an indicator for rejecting the association request. When AP 2 rejects the corresponding association request as a response to the association request frame, a field indicating a state code of suggesting association through another link may be additionally included. For example, by configuring a state code field value as 82, BSS switching may be suggested. In this case, information on a basic link suggesting association may be additionally added and transmitted. The information on the basic link may be transmitted in the form of a neighbor report information element. The neighbor report information element may include at least one of a BSSID, a channel and operation class, and timing information.

An STA having received an association response frame including a reject indicator from AP 2 may identify the contents of the received association frame, and identify that the association request has been rejected. In this case, the STA may identify suggestion of association through another BSS by identifying a state code field value in the association response frame, and identify suggested BSS information by identifying the contents of a neighbor report information element. The STA may identify basic link information included in the neighbor report information element, and perform the association process described in FIG. 5 by moving to a channel indicated by the corresponding information. Alternatively, an association request frame may be transmitted to the AP of the corresponding basic link on the basis of the contents included in the corresponding neighbor report information.

Meanwhile, when a STA MLD performs an association process with an AP MLD, a negotiation process for a multi-link operation in multiple links, described in FIG. 9, may be performed by including a basic link in the STR unavailable link group. In this case, the negotiation process for a multi-link operation may be performed as follows.

Figure 25:
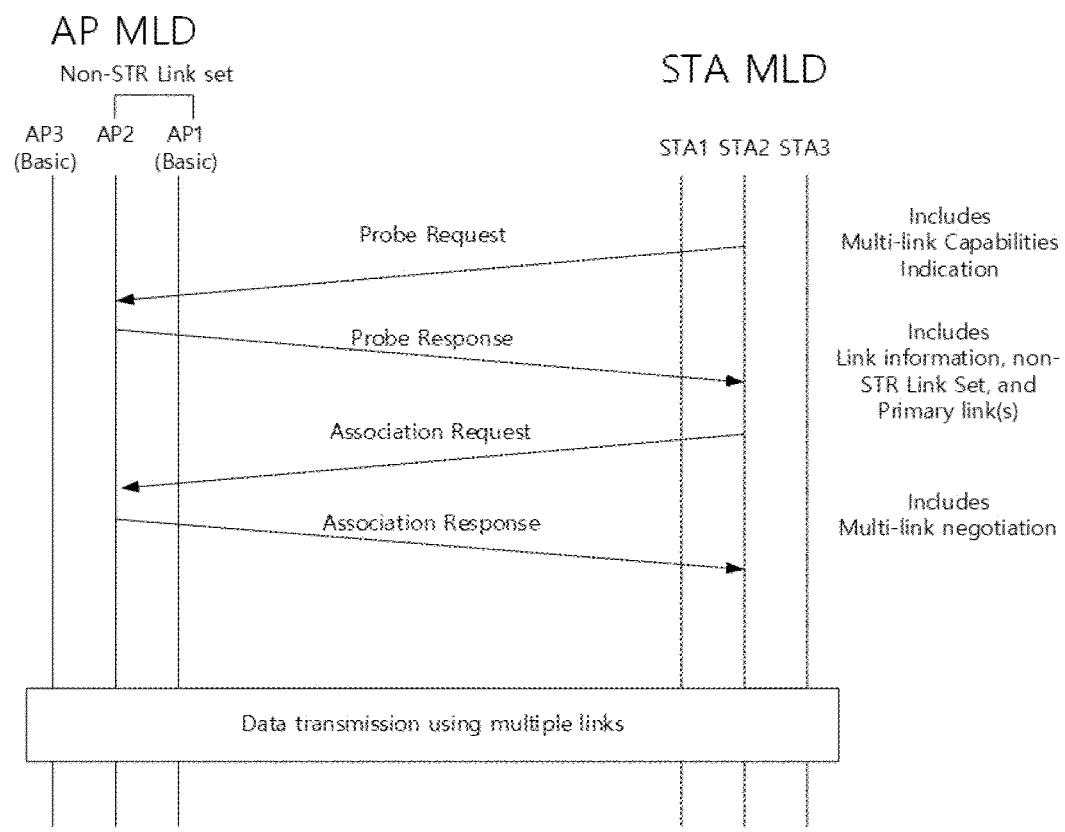
FIG. 25 is a concept diagram illustrating an example of an association process between an AP MLD and an STA MLD when the AP MLD cannot perform STR.

FIG. 25 is a concept diagram illustrating an example of an association process between an AP MLD and an STA MLD when the AP MLD cannot perform STR. In FIG. 25, a description of the same process as the channel association process of FIG. 5 and the negotiation process for performing a multi-link operation of FIG. 9 is omitted.

Referring to FIG. 25, an AP MLD may include multiple APs, and each AP may operate a link. In this case, some or all links operated by the AP MLD may not be able to perform an STR operation. For example, the AP MLD may operate in link 1, link 2, and link 3. In this case, link 1 and link 2 may not be able to perform an STR operation. That is, link 1 and link 2 may correspond to an STR unavailable link group. The AP MLD may configure one or more basic links. For example, the AP MLD may configure link 1 and link 3 as basic links. In this case, AP 1 in the AP MLD may operate in link 1, AP 2 may operate in link 2, and AP 3 may operate in link 3.

An STA MLD may perform an association process and a negotiation process for a multi-link operation with the AP MLD in link 1 or link 3 as described in FIGS. 5 and 9. In this case, the STA MLD may include an indicator requesting link information for a multi-link operation in a probe request frame, and transmit the same. The AP MLD having received the probe request frame may identify the corresponding indicator, and transmit a probe response frame by including the link information for the multi-link operation. The probe response frame including the link information may additionally indicate an STR available link, an STR unavailable link, and basic link information. The STA MLD may receive the probe response frame, and receive link information included in the corresponding frame. In addition, the STA MLD may additionally identify the STR available link, the STR unavailable link group, and the basic link information indicated by the probe response frame. The STA MLD having identified the probe response frame may transmit an association request frame to the AP MLD. In this case, a request indicator for requesting to perform the multi-link operation may be included. The AP MLD having received the association request frame from the STA MLD may identify an indicator for requesting the multi-link operation, and may identify whether use of a link in the STR unavailable link group is requested and whether use of a basic link in the STR unavailable link group is requested while using the corresponding link. For example, the STA MLD may identify whether it is requested to use one or more links among link 1 and link 2. When the corresponding link is used, whether it is requested to use link 1 corresponding to a basic link may be identified. As a result of the identification, when the STA MLD requests the use of the STR unavailable link and the use of the basic link in the STR unavailable link group including the corresponding link is not requested, the AP MLD may transmit an association response frame indicating rejection, as a response to the association request frame. For example, when the STA MLD requests to use link 2 and link 3 only, the AP MLD may reject the same. Alternatively, the AP MLD may transmit an association response frame allowing the multi-link operation by including information on a link different from the requested link group. Meanwhile, when the STA MLD request the multi-link operation by including the STR available link and the basic link of the STR unavailable link group, the AP MLD may transmit an association response frame allowing the multi-link operation as described in FIG. 9.

Meanwhile, the STA MLD may also perform the above-described association process in link 2. That is, the STA MLD may transmit the probe request frame by including an indicator for requesting link information for a multi-link operation in link 2. In this case, the AP MLD may transmit a probe response frame including link information, as a response to the probe request frame only when a request indicator for the corresponding multi-link operation is included. In the probe response frame including the link information, an STR available link, an STR unavailable link group, and a basic link may be additionally indicated. The STA MLD having received the probe response frame may identify the link information, the STR available link, the STR unavailable link group, the basic link information, etc. in the probe response frame, and may perform exchange of the association request frame and the association response frame with the AP MLD, including the negotiation process for the multi-link operation, according to the identified contents.

Meanwhile, the STR available link, the STR unavailable link group, the basic link information, etc. may be included in an RNR element in the form of a TBTT information field. Alternatively, the STR available link, the STR unavailable link group, the basic link information, etc. may be included in a multi-link information element including separate link information. When the STR available link, the STR unavailable link group, the basic link information, etc. are included in the multi-link information element and transmitted, the multi-link information element may be configured as follows.

Figure 26:
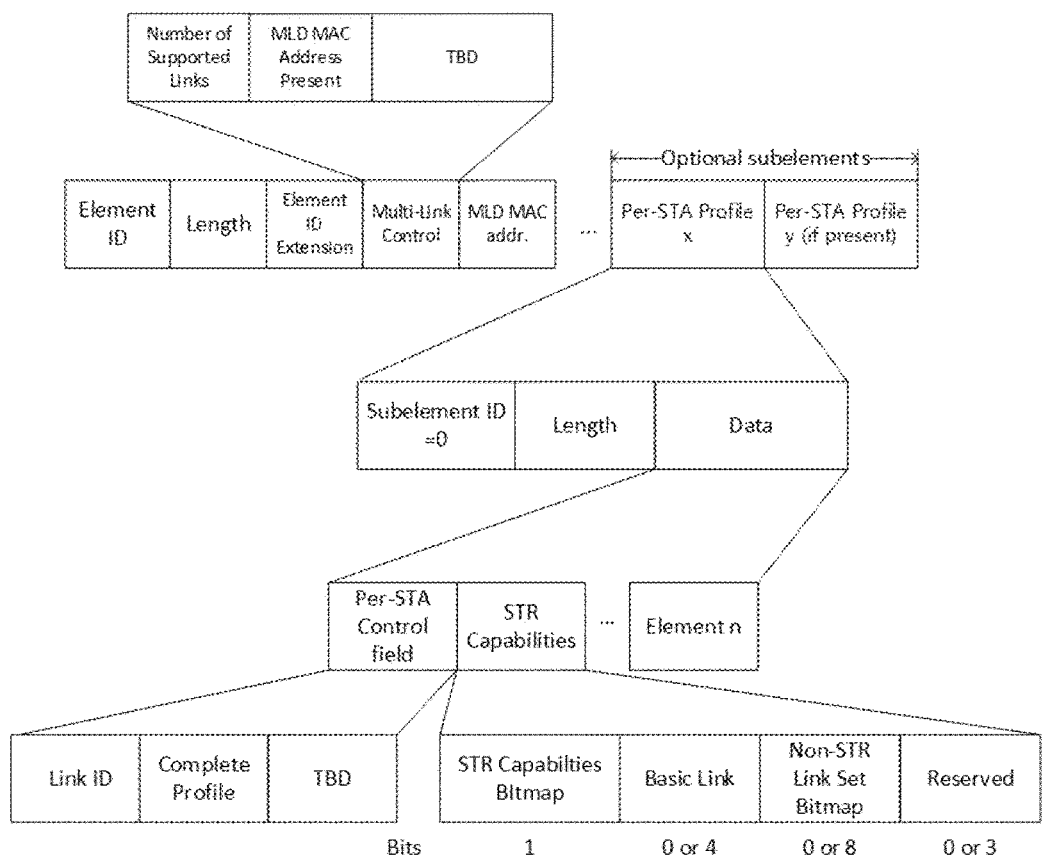
FIG. 26 is a block diagram illustrating an example of a link indication information element including an indicator for indicating a basic link.

FIG. 26 is a block diagram illustrating an example of a link indication information element including an indicator for indicating a basic link.

Referring to FIG. 26, a multi-link information element may include information for frame transmission/reception and channel association between an AP MLD and a non-AP MLD.

Specifically, the multi-link information element may include integrated information relating to MLD and individual information relating to each link. The integrated information relating to the multi-link may include information such as an address of a corresponding MLD and the number of links supported by the corresponding MLD. The multi-link information element may not include the individual information relating to each link. Alternatively, when the multi-link information element is included in a probe response frame transmitted as a response to a probe request frame including a request indicator for a multi-link operation, the corresponding information element may include the individual information relating to each link. When the multi-link information element is transmitted within an association request frame and an association response frame including the negotiation process for the multi-link operation described in FIGS. 9 and 25, the corresponding multi-link information element may include individual information relating to each link.

The individual information relating to the link may be included in the form of a sub information element within the multi-link information element. In this case, the individual information relating to the link may be individually included for each link, and the corresponding sub information element may include a link ID field, an indication field indicating whether all information (e.g., all information included in a beacon frame transmitted in the corresponding link) relating to the corresponding link is included in the corresponding multi-link information element, and a field indicating whether an STR operation can be performed with another link. The field indicating whether the STR operation can be performed may include whether STR is available for another link ID, in a bitmap format. For example, when a value at the position of bit x in the corresponding field is 0, the corresponding link may indicate that an STR operation with a link having a link ID corresponding to x is not available. The value of the position of the bit corresponding to the corresponding link ID may be configured as 1. Accordingly, when all fields of the corresponding bitmap are configured as 1, the corresponding link may indicate an STR available link. On the other hand, when any one bit is configured as 0, the corresponding link may indicate an STR unavailable link which cannot perform an STR operation with a link ID corresponding to the location of a bit configured as 0. When the corresponding link is an STR unavailable link, a field indicating whether the STR operation can be performed may additionally include information on a basic link and information on an STR unavailable link group. In this case, the information on the basic link may indicate a link ID of a link configured as a basic link, among links belonging to the corresponding STR unavailable link group. The STR unavailable link group may include a link ID corresponding to the STR unavailable link group in the corresponding link and display the same in a bitmap format. For example, when a link having a link ID corresponding to 0 and a link having a link ID corresponding to 1 constitute an STR unavailable link group, bit values of a bit 0 position and a bit 1 position of the corresponding bitmap may be configured as 1.

That is, an AP MLD (including an NSTR soft AP MLD) may transmit, to a non-AP MLD, link information related to at least one link formed between the AP MLD and the non-AP MLD. In this case, the link information may include the number of multiple links formed between the non-AP MLD and the AP MLD, a bitmap indicating whether each of the multiple links supports an STR operation, and at least one of the above-described information.

When the AP MLD cannot perform an STR operation in some links, the AP MLD may configure a basic link and perform a frame transmission operation with an STA and an STA MLD as follows.

Figure 27:
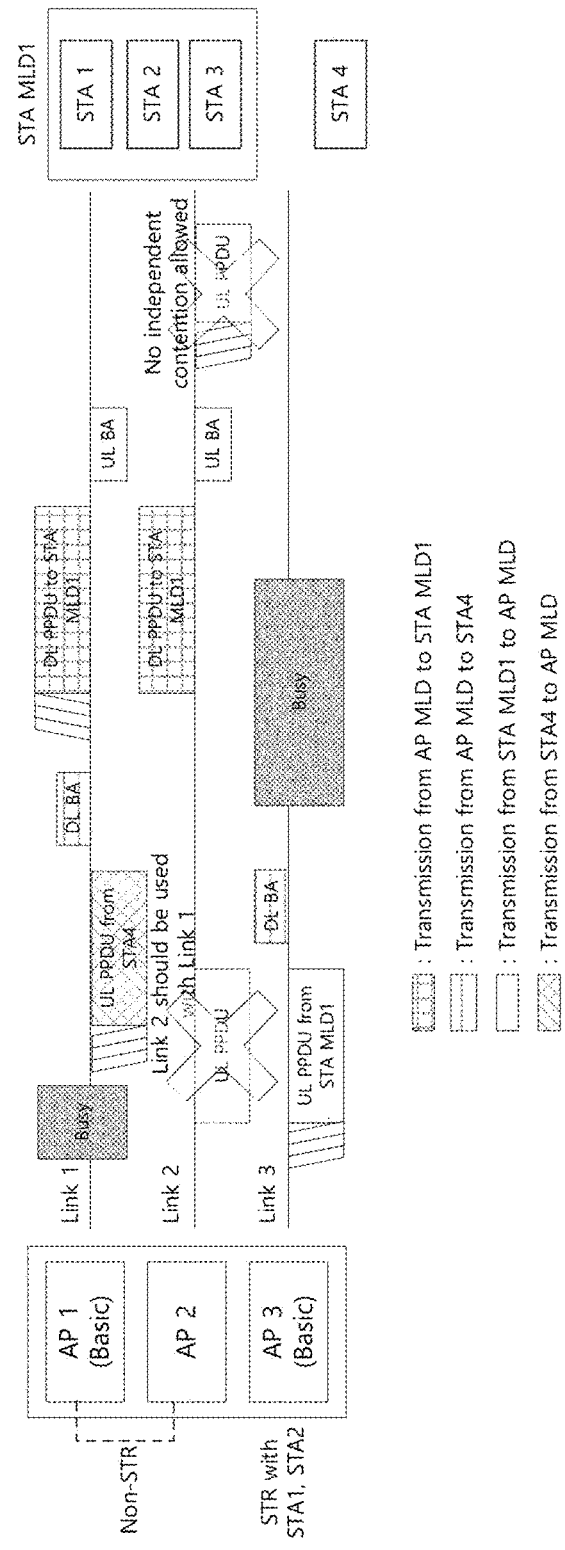
FIG. 27 is an embodiment illustrating an example of a frame transmission procedure between an AP MLD and an STA MLD by utilizing a concept of a basic link when the AP MLD cannot perform STR.

FIG. 27 is an embodiment illustrating an example of a frame transmission procedure between an AP MLD and an STA MLD by utilizing a concept of a basic link when the AP MLD cannot perform STR.

Referring to FIG. 27, when an AP MLD configures one or more links as basic links, the corresponding AP MLD may allow an independent channel access operation only in the configured basic link. That is, frame transmission through a channel access operation may fail be to performed in an extended link. In addition, an STA or an STA MLD associated with the AP MLD may also allow an independent channel access operation only in a basic link configured by the AP MLD. In this case, the AP MLD and the STA MLD may perform a multi-link operation through a simultaneous transmission scheme as shown in FIG. 10(b) by using an extended link in an STR unavailable link group. In this case, the multi-link operation may be limitedly used only when a basic link in an STR unavailable link group can be used. That is, when the corresponding basic link corresponds to a channel busy state, a frame transmission operation using the remaining links in the STR unavailable link group may not be allowed.

That is, as described above, an NSTR soft AP MLD not supporting an STR operation may form multiple links with a non-AP STA, and when the number of links not supporting the STR operation among the multiple formed links is equal to or less than a specific number, one of one or more links not supporting the STR operation may be configured as a basic link (or a primary link), and links remaining after excluding the basic link from the one or more links may be configured as extended links (or non-primary links).

An NSTR soft AP MLD may transmit a beacon frame and a probe response frame for channel access through a basic link, and if a non-AP STA transmits a probe request frame for channel access through an extended link, the NSTR soft AP MLD may not transmit a response to the transmitted probe request frame.

In this case, as described above, the NSTR soft MLD may transmit link information related to a link configured with the non-AP MLD to the non-AP MLD through control information, and the like.

For example, an AP MLD may operate in link 1, link 2, and link 3. In this case, link 1 and link 2 may not be able to performed an STR operation. That is, link 1 and link 2 may correspond to an STR unavailable link group. The AP MLD may configure one or more basic links. For example, the AP MLD may configure link 1 and link 3 as basic links. In this case, AP 1 in the AP MLD may operate in link 1, AP 2 may operate in link 2, and AP 3 may operate in link 3. In this case, in link 2, an STA not belonging to an STA MLD may not be associated. The AP MLD and the STA MLD may fail to perform frame transmission using only a corresponding link through a channel access process in link 2. In addition, the AP MLD and the STA MLD may use link 2 together with link 1 so that link 2 and link 1 are utilized to be used only for a multi-link operation through a simultaneous transmission scheme. That is, when link 1 corresponds to a channel busy state, frame transmission using only link 2 except for link 1 may not be allowed.

In general, a transmission operation using only an extended link in an STR unavailable link group may not be allowed. Meanwhile, when a frame transmitted by the STA MLD does not request an instant response frame, independent channel access may be exceptionally performed in the extended link. In addition, to further increase efficiency of a frame transmission operation, the STA MLD may start a frame exchange sequence in the extended link to induce that a multi-link operation in a simultaneous transmission scheme is performed. The exceptional independent channel access operation in the extended link of the STR unavailable link group may be performed as follows.

Figure 28:
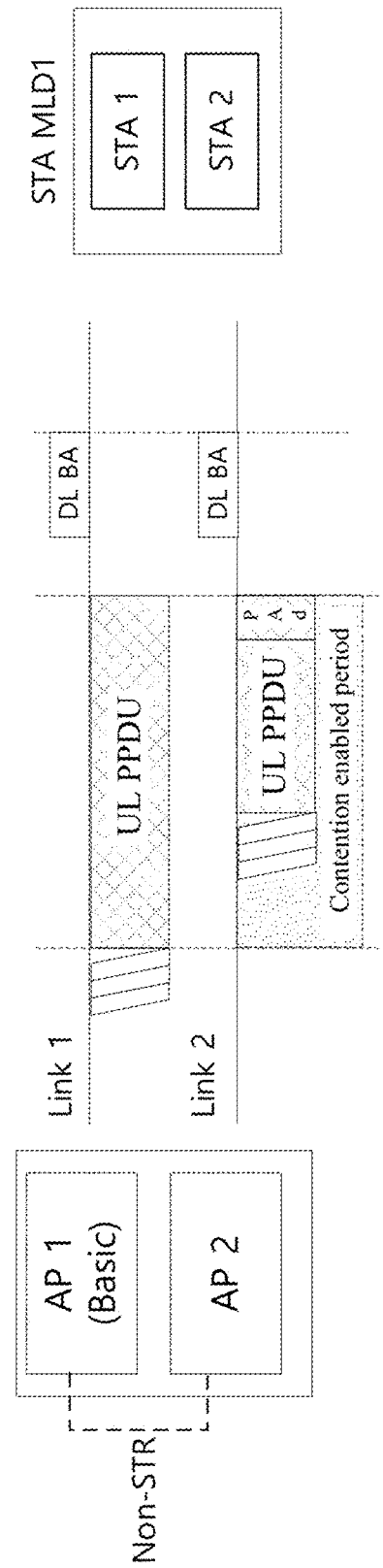
FIG. 28 is a first embodiment illustrating an operation of exceptionally performing a channel association and frame transmission operation in an extended link when an AP MLD cannot perform STR.

FIG. 28 is a first embodiment illustrating an operation of exceptionally performing a channel association and frame transmission operation in an extended link when an AP MLD cannot perform STR.

Referring to FIG. 28, when an STA MLD performs uplink frame transmission in a basic link of an STR unavailable link group, the corresponding STA MLD may perform a channel contention process for transmitting a frame not requesting a response from another link in the corresponding STR unavailable link group. The STA MLD may perform an STR operation in the corresponding STR unavailable link group. In this case, the STA MLD may compare a transmission end time point of a PPDU including a frame to be transmitted in another link at a time point at which the channel contention process is completed in another link with a transmission end time point of a PPDU including a frame transmitted in the basic link. When it is determined that transmission of the PPDU transmitted in another link ends before the transmission end time point of the PPDU including the frame transmitted in the basic link, the STA MLD may transmit the frame not requesting the response in an extended link in the corresponding STR unavailable link group. On the other hand, when it is determined that the transmission end time point of the PPDU including the frame to be transmitted at a time point at which the corresponding channel access operation is completed is after the transmission end time point of the PPDU including the frame transmitted in the basic link, the STA MLD may not perform frame transmission in the extended link.

For example, an AP MLD may operate link 1 and link 2, and link 1 and link 2 may not be able to perform an STR operation. In this case, the AP MLD may configure link 1 as a basic link. AP 1 of the AP MLD may operation in link 1, and AP 2 may operate in link 2. The STA MLD associated with the AP MLD may perform a multi-link operation by using link 1 and link 2. In this case, when link 2 is in a channel busy state during channel access for a multi-link operation, the STA MLD may perform the channel access process by using link 1 only, and perform a frame transmission operation. Alternatively, when there is no frame to be transmitted in link 2, the STA MLD may perform the channel access process in link 1, and perform a frame transmission operation. In a case where the channel state of link 2 changes to a channel idle state while the STA MLD performs the frame transmission operation in link 1, or a case where there is data to be transmitted using link 2 while the corresponding channel is empty, when the frame to be transmitted in link 2 does not request a response frame, the STA MLD may perform the channel access process in the corresponding link. Alternatively, a channel state during a period from a transmission frame generation time point to a time point a specific time (e.g., AIFS+time corresponding to a backoff value) before the transmission frame generation time point may be identified. The STA MLD may compare the transmission time end time point of the PPDU including the frame to be transmitted at a time point at which channel access in link 2 is completed or the identification of the channel state is completed in link 2 with the transmission end time point of the PPDU including the frame transmitted in link 2. In this case, when the transmission end time point of the PPDU including the frame transmitted in link 2 is before the transmission end time point of the PPDU including the frame transmitted in link 2, the STA MLD may transmit the corresponding frame in link 2.

Meanwhile, in the operation of FIG. 28, when the frame transmitted in the basic link of the STR unavailable link group is not a frame transmitted by the AP MLD, the channel content process for frame transmission may be performed even though the frame is not an uplink frame transmitted by the corresponding STA MLD. That is, as descried below, when a transmission end time point of an uplink frame in a basic link is recognized, frame transmission may be performed in another link as follows.

Figure 29:
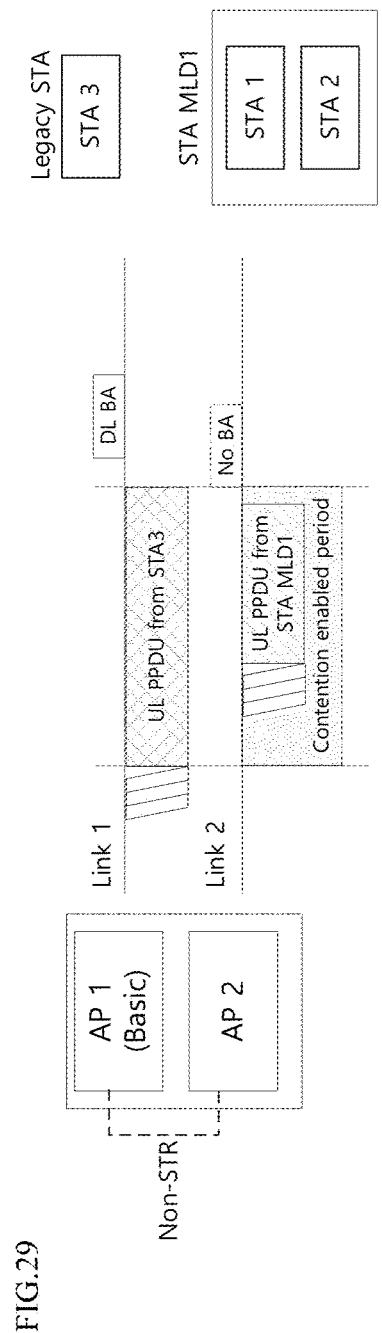
FIG. 29 is a second embodiment illustrating an operation of exceptionally performing a channel association and frame transmission operation in an extended link when an AP MLD cannot perform STR.

FIG. 29 is a second embodiment illustrating another example of an operation of exceptionally performing a channel association and frame transmission operation in an extended link when an AP MLD cannot perform STR.

Referring to FIG. 29, when recognizing that another terminal is performing uplink frame transmission in a basic link of an STR unavailable link group, an STA MLD may perform a channel contention process for transmitting a frame not requesting a response within a corresponding transmission time in another link in the corresponding STR unavailable link group. For example, when link 1 and link 2 correspond to an STR unavailable link group and link 1 is a basic link, an STA MLD may recognize a frame transmitted by another terminal (e.g., STA 3), and identify a transmission end time point and a transmission terminal address of a PPDU including the corresponding frame. In this case, the transmission end time point of the PPDU including the corresponding frame may identify and recognize an L-SIG field in a preamble. When a transmission address of a frame transmitted in link 1 is not an address of an AP MLD, the STA MLD may perform the channel contention process for transmitting the frame not requesting the response in link 2 for the transmission time of the PPDU including the corresponding frame. In this case, the STA MLD may compare a transmission end time point of a PPDU including a frame to be transmitted at a time point at which the channel content process is completed in another link and a transmission end time point of a PPDU including a frame transmitted in a basic link. When it is determined that transmission of the PPDU transmitted in another link ends before the transmission end time point of the PPDU including the frame transmitted in the basic link, the STA MLD may transmit the frame not requesting the response in an extended link in the corresponding STR unavailable link group. For example, when the STA MLD recognizes the PPDU including the frame transmitted by another terminal in link 1, the STA MLD may perform a channel access process for transmitting a frame not requesting a response in link 2. When it is determined, at a time point at which the corresponding channel access operation is completed, that the transmission end time point of the PPDU including the corresponding frame is before the transmission end time point of the PPDU recognized in link 1, the STA MLD may transmit the corresponding frame in link 2. On the other hand, when a transmission address of the frame transmitted in the basic link and an address of an AP MLD are matched to each other, the STA MLD may not be able to perform the channel access operation for frame transmission in the extended link for the transmission time of the PPDU including the corresponding frame. In addition, if the transmission end time point of the PPDU transmitted by another terminal in the basic link cannot be determined, the STA MLD may not be able to perform the channel access process in another ink in the same STR unavailable link group. Alternatively, when it is determined that the transmission end time point of the PPDU including the frame to be transmitted at a time point at which the corresponding channel access operation is completed is after the transmission end time point of the PPDU including the frame transmitted in the basic link, the STA MLD may not perform frame transmission in the extended link.

Meanwhile, in the above-described operation in FIG. 28, when the frame to be transmitted in the extended link of the STR unavailable link group is a frame requesting a response frame (e.g., an ACK frame or a BlockAck frame) from an AP MLD and the transmission end time point of the PPDU including the corresponding frame is before the transmission end time point of the PPDU including the frame pre-transmitted, the multi-link operation may be performed as follows.

Figure 30:
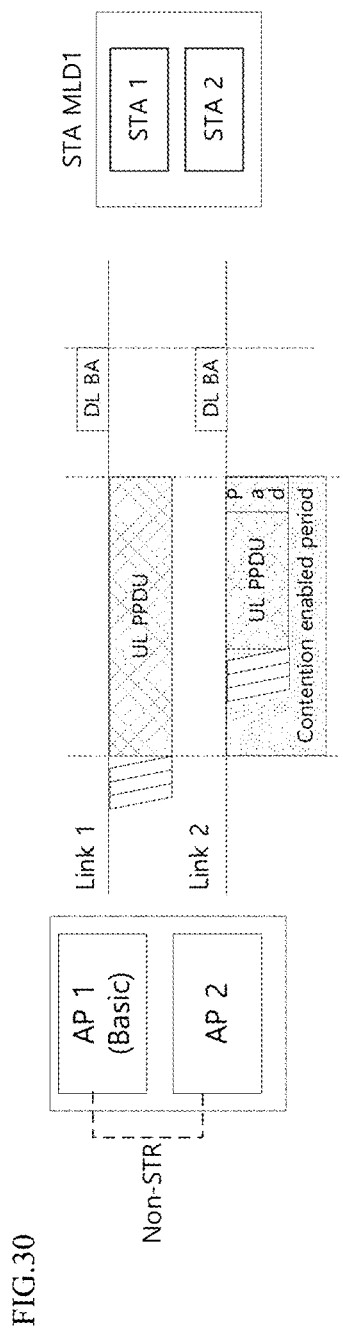
FIG. 30 is a third embodiment illustrating an operation of exceptionally performing a channel association and frame transmission operation in an extended link when an AP MLD cannot perform STR.

FIG. 30 is a third embodiment illustrating another example of an operation of exceptionally performing a channel association and frame transmission operation in an extended link when an AP MLD cannot perform STR.

Referring to FIG. 30, when an STA MLD performs uplink frame transmission in a basic link of an STR unavailable link group, the corresponding STA MLD may perform a channel contention process for transmitting a frame requesting a response in another in the corresponding STR unavailable link group. The STA MLD may perform an STR operation in the corresponding STR unavailable link group. For example, when link 1 and link 2 may correspond to an STR unavailable link group and link 1 is a basic link, an STA MLD may perform a channel contention process for transmitting a frame requesting a response in link 2 for a transmission time of a frame transmitted in link 1. In this case, the STA MLD may compare a transmission end time point of a PPDU including a frame to be transmitted at a time point at which a channel content process is completed in another link with a transmission end time point of a PPDU including a frame transmitted in a basic link. In this case, when it is determined that transmission of the PPDU transmitted in another link ends before a transmission time point of the PPDU including the frame transmitted in the basic link, the STA MLD may transmit the frame not requesting the response in the extended link of the corresponding STR unavailable link group. In this case, to match the transmission end time points of the frames of in two links, a padding bit may be added to the PPDU and the frame transmitted in the extended link. For example, when an STA MLD is transmitting a frame in link 1, a channel access process for transmitting a frame requesting a response may be performed in link 2. When it is determined, at a time point at which the corresponding channel access operation is completed, that the transmission end time point of the PPDU including the corresponding frame is before the transmission end time point of the PPDU transmitted in link 1, the corresponding frame may be transmitted in link 2. In this case, the match the transmission end time points of the PPDUs transmitted in link and link 2, a padding bit may be added. In this case, when a difference between the PPDU transmission end time point in link 1 and the transmission end time point in link 2 is within a specific time (e.g., 4 µs), it may be determined that the transmission end time points in two links are matched.

An MLD may receive a frame transmitted from the STA MLD, and may transmit a response frame (e.g., an ACK frame or a BlockAck frame) as a response to the received frame. In this case, transmission lengths of the PPDUs including the frames transmitted in the multiple links may be configured to be identical to each other. When there is a frame to be additionally transmitted after reception of the response frame, the STA MLD may perform a frame exchange operation by using a simultaneous transmission-type multi-link operation, as shown in FIG. 10(b).

Meanwhile, when an AP MLD performs a frame exchange sequence for downlink frame transmission in a basic link in an STR unavailable link group, an STA MLD receiving the corresponding downlink frame may perform channel access in another link in the corresponding link group. After the corresponding channel access process, the STA MLD may transmit, to the AP MLD, an indicator indicating that another link is available, so as to induce the simultaneous transmission-type multi-link operation to be performed. In this case, the exceptional frame transmission process may be performed as follows.

Figure 31:
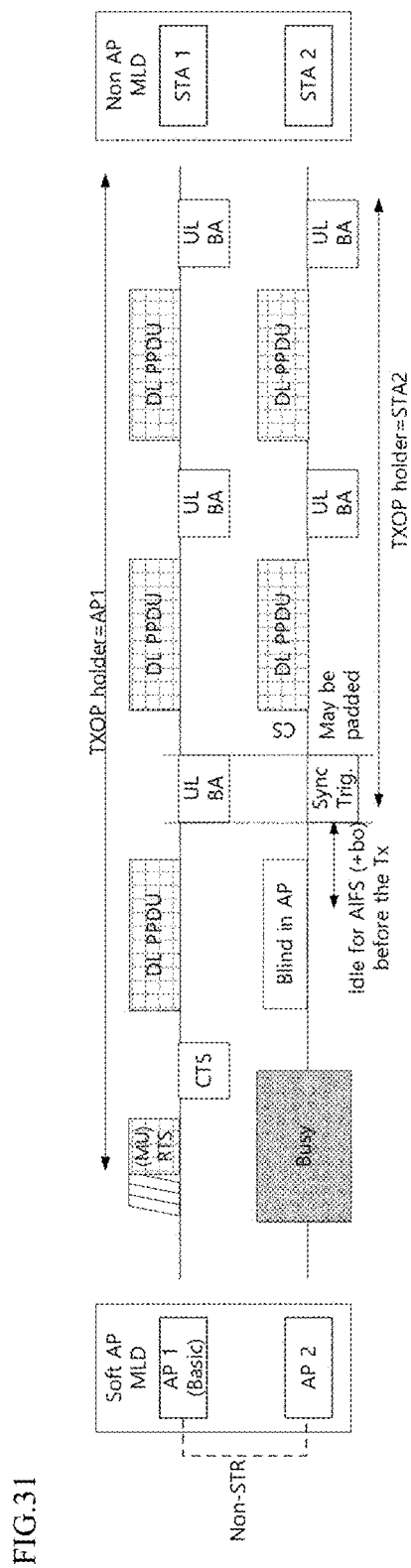
FIG. 31 is a fourth embodiment illustrating an operation of exceptionally performing a channel association and frame transmission operation in an extended link when an AP MLD cannot perform STR.

FIG. 31 is a fourth embodiment illustrating another example of an operation of exceptionally performing a channel association and frame transmission operation in an extended link when an AP MLD cannot perform STR.

Referring to FIG. 31, an AP MLD may not be able to perform an STR operation for some or all links. In this case, the AP MLD may perform a channel access process to perform a simultaneous transmission-type multi-link operation by utilizing an STR unavailable link group. That is, the AP MLD may perform channel access for frame transmission by using the scheme corresponding to FIG. 21(b). In this case, a channel may be in a busy state for an extended link. In this case, as described in FIG. 21, frame transmission may be performed by using only a basic link having an empty channel or some links including a basic link. For example, in a case where link 1 and link 2 of an AP MLD correspond to an STR unavailable link group and link 1 is a basic link, when a channel of link 2 is in a busy state during channel access for a multi-link operation, a frame transmission operation may be performed using link 1 only. In this case, to protect a transmitted frame, the AP MLD may perform a procedure of exchanging an RTS frame and a CTS frame before the frame transmission. In this case, the RTS frame may be transmitted in the form of a multi-user (MU)-RTS frame.

When the AP MLD has performed channel access for the multi-link operation but transmits the frame by using only some links due to the channel state, the AP MLD may include an indicator indicating the same. In this case, the indicator may be a link use request indicator for transmission of a simultaneous transmission request frame to a reception STA MLD of the corresponding frame when a link in a busy state is switched to an idle state. The link use request indicator may be included in the MU-RTS frame and transmitted. For example, when a UL length field in the MU-RTS is configured as a value other than 0, a link ID of an extended link for simultaneous transmission may be displayed in a bitmap format. Alternatively, the UL length field in the MU-RTS may indicate a link ID of an extended link through which the STA MLD is to transmit a simultaneous transmission request frame. Alternatively, the link use request indicator may be included, in the form of an A-control field, in an HT control field in the frame transmitted by the AP MLD and transmitted. In this case, first two bits of the HT control field may be configured as 1, so that it may be indicated that the HT control field is configured in the form of an A-control field later. The A-control field period may include one or more subfields including transmission information. In this case, the subfield may include a subfield indicating information on an extended link through which simultaneous transmission is to be performed. The subfield indicating the use link information may include a control ID and multiple pieces of link information. The control ID may indicate a subfield configured as a value (e.g., 7, etc.) not used by another information subfield, and indicating information on an extended link through which the corresponding subfield uses and performs simultaneous transmission. The multiple pieces of link information may include a link ID. Alliteratively, the subfield may not include link information. When the subfield does not include link information, the subfield may refer to all extended links not used for frame transmission, among the STR unavailable link group used by the AP MLD.

The AP MLD may transmit a frame transmitted in a basic link or some links including the basic link, and the STA MLD may receive the corresponding frame. In this case, when the corresponding STA MLD identifies a link use request indicator in an MU-RTS frame received from the AP MLD, the STA MLD may identify a channel state of an extended link indicated among the STR unavailable link group. Alternatively, when the STA MLD identifies a link use request indicator in a data frame received from the AP MLD, the STA MLD may identify a channel state of an extended link indicated among the STR unavailable link group. Alternatively, even though the STA MLD has received a link use request indicator but fails to identify information on a requested link, the STA MLD may identify a channel state of all extended links included in the corresponding STR unavailable link group. Alternatively, when the AP MLD and the STA MLD perform a negotiation process for multi-link use for the corresponding STR unavailable link group, the STA MLD may randomly identify a channel state of another extended link while receiving a frame from the AP MLD in some links among the STR unavailable link group. As a result of the operation of identifying the channel state of the extended link among the STR unavailable link group, when a channel is empty for another link of the corresponding link group during a period from a transmission start time point at which a response frame (e.g., an ACK frame or a BlockAck frame) to frame transmission for a basic link and some links to a time point before a specific time from the transmission start time point (e.g., a period from a transmission start time point of a response frame to a time point before "AIFS+backoff time" from the transmission start time point), the STA MLD may transmit a frame by using both links. In this case, the response frame may be transmitted in the basic link and some links including the basic links, and a request frame for requesting simultaneous transmission may be transmitted in the remaining links. The request frame may be identical or similar to a trigger frame, a PS-poll frame, or a U-APSD trigger frame. When the request frame is a trigger frame, the corresponding trigger frame may be an MU-RTS frame. Alternatively, an uplink transmission length field of a basic-type trigger frame may be configured as 0. In this case, to match a PPDU transmission end time point with a response frame transmitted in another link, a padding bit may be added and transmitted.

The AP MLD having received the request frame for requesting the simultaneous transmission may identify that the corresponding STA MLD requests simultaneous transmission by using the remaining links of the corresponding STR unavailable link group, and may perform the next frame transmission sequence by additionally utilizing the corresponding links. That is, the AP MLD may transmit a downlink frame by additionally utilizing a link through the request frame is transmitted, as shown in FIG. 21(b). In this case, when the transmission end time point of the PPDU including the downlink frame does not match, a padding bit may be added and transmitted. Meanwhile, the AP MLD may detect a channel state before receiving the request frame and transmitting the downlink frame. That is, the AP MLD may perform a carrier sensing operation from a request frame reception completion time point to a downlink frame transmission start time point. The carrier sensing operation may include one or more operations of energy detection, virtual detection through a preamble value of a reception frame, and network allocation vector (NAV) identification.

Meanwhile, when there is not data to be transmitted to the STA MLD through simultaneous transmission, the AP MLD having received the request frame for requesting the simultaneous transmission may transmit the frame to another STA MLD with which the AP MLD has negotiated to use the corresponding link. In this case, the simultaneous transmission operation is performed using multiple links, but STA MLDs receiving data in the respective links may be different devices. The operation of transmitting data to another STA MLD in each link may be performed as follows.

Figure 32:
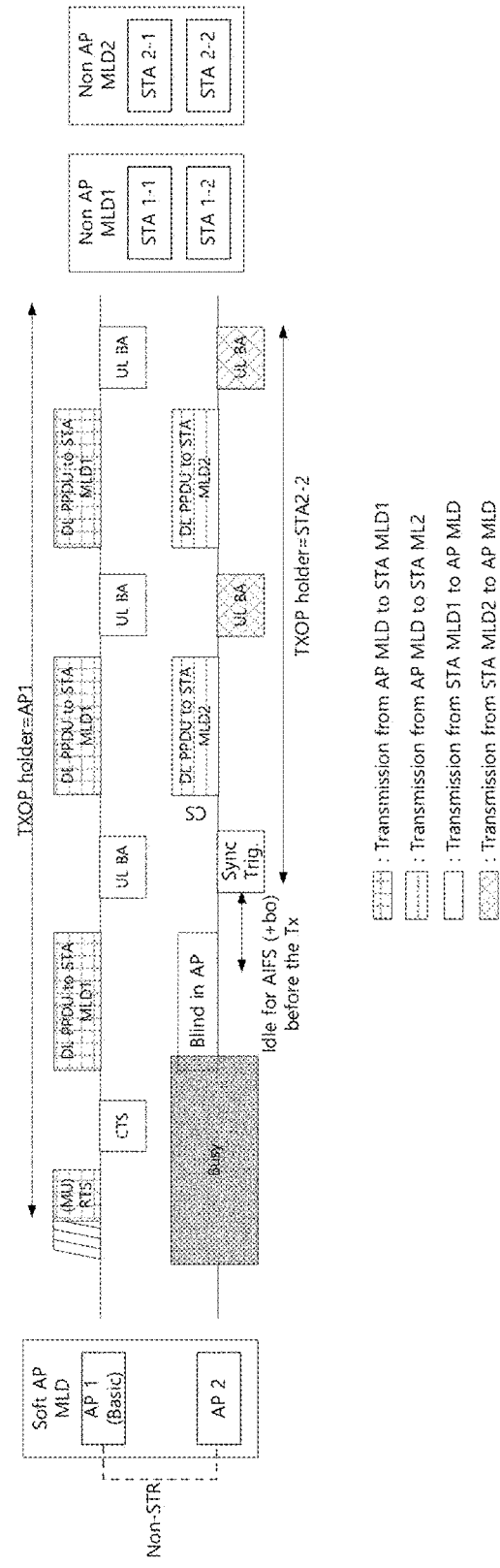
FIG. 32 is a fifth embodiment illustrating an operation of exceptionally performing a channel association and frame transmission operation in an extended link when an AP MLD cannot perform STR.

FIG. 32 is a fifth embodiment illustrating another example of an operation of exceptionally performing a channel association and frame transmission operation in an extended link when an AP MLD cannot perform STR.

Referring to FIG. 32, an AP MLD may not be able to perform an STR operation for some or all links. In this case, the AP MLD may perform a channel access process to perform a simultaneous transmission-type multi-link operation by utilizing an STR unavailable link group. That is, the AP MLD may perform channel access for frame transmission by using the scheme corresponding to FIG. 21(b). In this case, a channel may be in a busy state for an extended link. In this case, as described in FIG. 21, frame transmission may be performed by using only a basic link having an empty channel or some links including a basic link. For example, in a case where link 1 and link 2 of an AP MLD correspond to an STR unavailable link group and link 1 is a basic link, when a channel of link 2 is in a busy state during channel access for a multi-link operation, a frame transmission operation may be performed using link 1 only. In this case, to protect a transmitted frame, the AP MLD may perform a procedure of exchanging an RTS frame and a CTS frame before the frame transmission. In this case, the RTS frame may be transmitted in the form of a multi-user (MU)-RTS frame.

When the AP MLD transmits a frame by using only some links of the STR unavailable link group, the AP MLD may include a link use request indicator in an RTS frame, an MU-RTS frame, or a frame and transmit the same, as described in FIG. 31. The STA MLD may receive a link use request indicator included in the RTS frame, the MU-RTS frame, or the data frame transmitted in some links of the STR unavailable link group. According the contents of the received link use request indicator, the STA MLD may identify a channel state of an extended link for a transmission time of a downlink frame among the STR unavailable link group. Alternatively, when the AP MLD and the STA MLD perform a negotiation process for multi-link use for the corresponding STR unavailable link group, the STA MLD may randomly identify a channel state of another extended link while receiving a frame from the AP MLD in some links among the STR unavailable link group. As a result of the operation of identifying the channel state of the extended link among the STR unavailable link group, when a channel is empty for another link of the corresponding link group during a period from a transmission start time point at which a response frame (e.g., an ACK frame or a BlockAck frame) to frame transmission for a basic link and some links to a time point before a specific time from the transmission start time point (e.g., a period from a transmission start time point of a response frame to a time point before "AIFS+ backoff time" from the transmission start time point), the STA MLD may transmit a request frame for requesting simultaneous transmission in the corresponding extended link. The request frame may be a frame for requesting, from the AP MLD, use of multiple links by utilizing a simultaneous transmission scheme. The request frame may be identical or similar to a trigger frame, a PS-poll frame, or a U-APSD trigger frame. When the request frame is a trigger frame, the corresponding trigger frame may be an MU-RTS frame. Alternatively, an uplink transmission length field of a basic-type trigger frame may be configured as 0. In this case, to match a PPDU transmission end time point with a response frame transmitted in another link, a padding bit may be added and transmitted.

The AP MLD having received the request frame for requesting the simultaneous transmission may identify that the corresponding STA MLD requests simultaneous transmission by using the remaining links of the corresponding STR unavailable link group. In this case, when there is not data to be transmitted to the STA MLD having transmitted the request frame in the link through which the request frame is transmitted, the corresponding AP MLD may transmit a downlink data frame to another STA MLD with which the AP MLD has negotiated to use the corresponding link. That is, when there is no frame to be transmitted to STA MLD 1 in the corresponding link even through the request frame is received from STA MLD 1, the AP MLD may transmit a downlink data frame to STA MLD 2. The process of transmitting frames to multiple terminals by utilizing multiple links may be similar to a simultaneous transmission-type multi-link operation. That is, as shown in FIG. 21(*b*), a downlink frame may be transmitted by additionally utilizing a link through which the request frame is transmitted. In this case, when a transmission end time point of the PPDU including the downlink frame is not matched, a padding bit may be added and transmitted. Meanwhile, before receiving the request frame and transmitting the downlink frame, the AP MLD may detect a channel state in a link through which the request frame is transmitted. That is, the AP MLD may perform a carrier sensing operation from a request frame reception completion time point to a downlink frame transmission start time point. The carrier sensing operation may include one or more operations of energy detection, virtual detection through a preamble value of a reception frame, and network allocation vector (NAV) identification.

Meanwhile, as described in FIG. 31, the process of inducing a simultaneous transmission operation by exceptionally performing a channel access operation in an extended link by the STA MLD may be also performed by the AP MLD. That is, when an STA MLD performs a frame exchange sequence for uplink frame transmission in a basic link of an STR unavailable link group, an AP MLD receiving the corresponding uplink frame may perform channel association and frame transmission in another extended link of the corresponding STR unavailable link group. In this case, the transmitted frame may be a frame for requesting use of multiple links by utilizing a simultaneous transmission scheme. The uplink multi-link operation, described in FIG. 21(*b*), may be induced through the corresponding process. In this case, the exceptional frame transmission process in the extended link may be performed as follows.

Figure 33:
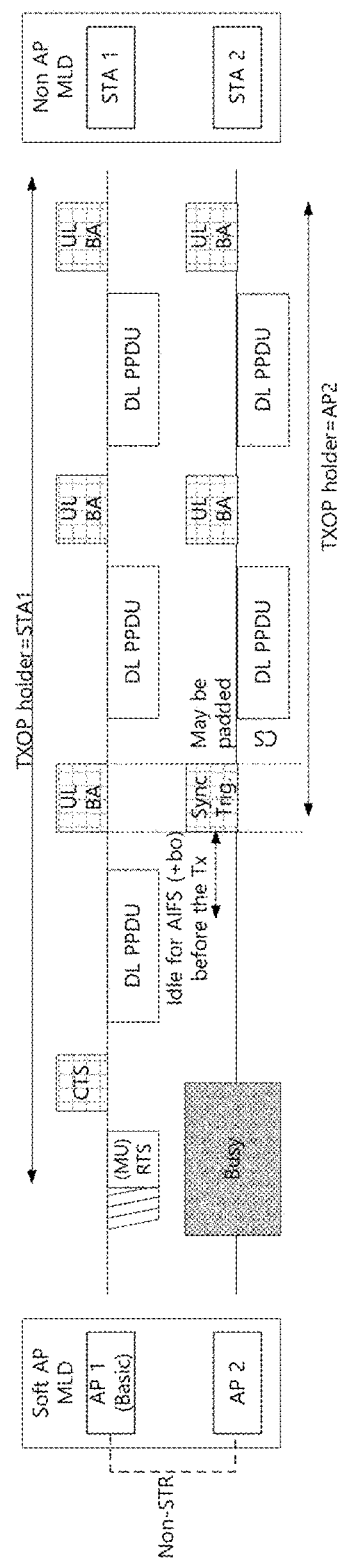
FIG. 33 is a sixth embodiment illustrating an operation of exceptionally performing a channel association and frame transmission operation in an extended link when an AP MLD cannot perform STR.

FIG. 33 is a sixth embodiment illustrating another example of an operation of exceptionally performing a channel association and frame transmission operation in an extended link when an AP MLD cannot perform STR. A description of the operation identical or similar to the operation described in FIG. 31 is omitted from FIG. 33.

Referring to FIG. 33, an AP MLD may not be able to perform an STR operation for some or all links. The links in which the STR operation cannot be performed by the AP MLD may be referred to as an STR unavailable link group. A link in which an STR operation can be performed in the AP MLD may be configured as a basic link. In addition, one of the links included in the STR unavailable link group in the AP MLD may be additionally configured as a basic link. A link other than the basic link in the STR unavailable link group may be referred to as an extended link.

In this case, an STA MLD having completed a negotiation for a multi-link operation with an AP MLD may perform a channel access process to perform a simultaneous transmission-type multi-link operation by utilizing an STR unavailable link group. That is, channel access for frame transmission may be performed by using the scheme corresponding to FIG. 31(*b*). In this case, a channel may be in a busy state for an extended link. In this case, as described in FIG. 31, frame transmission may be performed using only a basic link having an empty channel or some links including the basic link. For example, in a case where link 1 and link 2 of an AP MLD correspond to an STR unavailable link group and link 1 is a basic link, when a channel of link 2 is in a busy state during channel access for a multi-link operation, a frame transmission operation may be performed using link 1 only. In this case, to protect a transmitted frame, the STA MLD may perform a procedure of exchanging an RTS frame and a CTS frame before the frame transmission. In this case, the RTS frame may be transmitted in the form of a multi-user (MU)-RTS frame.

When the STA MLD has performed channel access for the multi-link operation but transmits the frame by using only some links due to the channel state, the STA MLD may include the link use request indicator described in FIG. 20 in the frame and transmit the same. The link use request indicator may be included in the MU-RTS frame and transmitted. Alternatively, the link use request indicator may be included, in the form of an A-control field, in an HT control field in the frame transmitted by the STA MLD and transmitted.

The AP MLD may receive a frame transmitted in a basic link or some links including the basic link. In this case, when the corresponding AP MLD has received a link use request indicator from the STA MLD, the AP MLD may identify a channel state of an extended link indicated among the STR unavailable link group. Alternatively, even though the AP MLD has received a link use request indicator from the STA MLD but fails to identify information on a requested link, the AP MLD may identify a channel state of all extended links included in the corresponding STR unavailable link group. Alternatively, when the AP MLD and the STA MLD perform a negotiation process for multi-link use for the corresponding STR unavailable link group, the AP MLD may randomly identify a channel state of another extended link while receiving a frame from the STA MLD in some links among the STR unavailable link group. As a result of the operation of identifying the channel state of the extended link among the STR unavailable link group, when a channel is empty for another link of the corresponding link group during a period from a transmission start time point at which a response frame (e.g., an ACK frame or a BlockAck frame) to frame transmission for a basic link and some links to a time point before a specific time from the transmission start time point (e.g., a period from a transmission start time point of a response frame to a time point before "AIFS+backoff time" from the transmission start time point), the AP MLD may transmit a request frame for requesting simultaneous transmission to the STA MLD in an empty extended link. The request frame may be a frame for requesting, from the STA MLD, use of multiple links by utilizing a simultaneous transmission scheme. The request frame may be identical or similar to a trigger frame, a PS-poll frame, or a U-APSD trigger frame. When the request frame is a trigger frame, the corresponding trigger frame may be an MU-RTS frame. Alternatively, an uplink transmission length field of a basic-type trigger frame may be configured as 0. In this case, to match a PPDU transmission end time point with a response frame transmitted in another link, a padding bit may be added and transmitted.

The STA MLD having received the request frame for requesting the simultaneous transmission may identify that the AP MLD requests simultaneous transmission by using the remaining links of the corresponding STR unavailable link group. In this case, when there is data to be transmitted to the AP MLD having transmitted the request frame in the link through which the corresponding request frame is transmitted, the STA MLD may perform the next frame transmission sequence by additionally utilizing the corresponding link. That is, the STA MLD may transmit an uplink frame by additionally utilizing a link through the request frame is transmitted, as shown in FIG. 31(b). In this case, when the transmission end time point of the PPDU including the uplink frame does not match, a padding bit may be added and transmitted. Meanwhile, when there is no data to be transmitted to the AP MLD having transmitted the request frame in a link through which the corresponding request frame is transmitted, the STA MLD may not transmit a response to the request frame. Meanwhile, the STA MLD may detect a channel state before receiving the request frame and transmitting the downlink frame. That is, the STA MLD may perform a carrier sensing operation from a request frame reception completion time point to an uplink frame transmission start time point. The carrier sensing operation may include one or more operations of energy detection, virtual detection through a preamble value of a reception frame, and network allocation vector (NAV) identification.

Meanwhile, in the operation of FIG. 29, when a frame transmitted in a basic link of an STR unavailable link group is a frame transmitted to an AP MLD and a frame to be transmitted in a link other than the basic link is a response frame (e.g., an ACK frame or a BlockAck frame), from the AP MLD, a channel contention process for frame transmission may be performed as follows.

Figure 34:
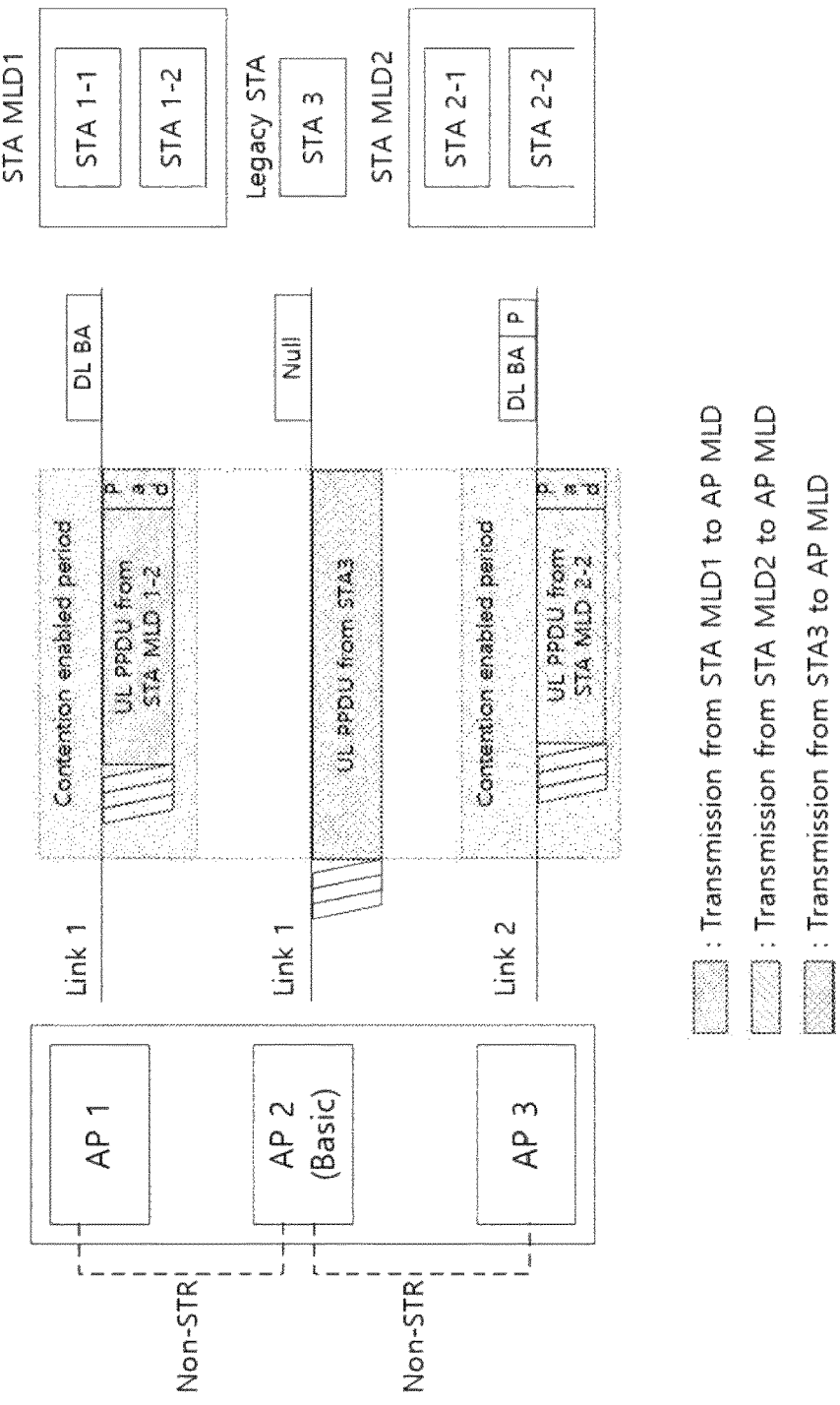
FIG. 34 is a seventh embodiment illustrating an operation of exceptionally performing a channel association and frame transmission operation in an extended link when an AP MLD cannot perform STR.

FIG. 34 is a seventh embodiment illustrating another example of an operation of exceptionally performing a channel association and frame transmission operation in an extended link when an AP MLD cannot perform STR. A description of the operation identical or similar to the operation described in FIG. 29 is omitted from FIG. 34.

Referring to FIG. 34, when recognizing that another terminal is performing uplink frame transmission to an AP MLD in a basic link of the STR unavailable link group, an STA MLD may perform a channel contention process for transmitting a frame for requesting a response within the corresponding transmission time in another link in the corresponding STR unavailable link group. For example, when link 1, link 2, and link 3 correspond to an STR unavailable link group and link 2 is a basic link, the STA MLD may recognize a frame transmitted by another terminal (e.g., STA 3) in link 2. In this case, a transmission end time point of a PPDU including the frame and a transmission/reception terminal address may be identified.

Alternatively, a reception terminal of the corresponding PPDU may be identified through a preamble in the PPDU including the corresponding frame. For example, when the PPDU including the corresponding frame is a HE PPDU or an EHT PPDU, whether the terminal transmitting the corresponding PPDU is another terminal may be identified through a UL/DL field or a BSS color field in the corresponding PPDU. That is, when the UL/DL field indicates an uplink PPDU and the BSS color field indicates a BSS corresponding to the basic link of the corresponding STA MLD, the corresponding PPDU may be determined as a PPDU transmitted from another terminal to the corresponding AP MLD. Alternatively, when the PPDU including the corresponding frame is a VHT PPDU, it may be identified through a group ID field and a partial AID field in the corresponding PPDU that the PPDU is a PPDU transmitted from another terminal. That is, when a group ID value in the corresponding PPDU is 0 and the partial AID is a partial AID configured from a BSSID of an AP of the corresponding basic link, the corresponding PPDU may be determined as a PPDU transmitted from another terminal to the AP MLD. In this case, a transmission end time point of the PPDU including the corresponding frame may be recognized through identification of an L-SIG field in a preamble.

When a reception address of the frame transmitted in the basic link is an address of the AP MLD, or when the PPDU including the frame transmitted in the basic link is a PPDU transmitted to the AP MLD, a channel contention process for transmitting a frame in an extended link may be performed for a transmission time of the PPDU including the corresponding frame. In this case, the STA MLD may perform a channel contention process for frame transmission in the extended link from a time point at which it is recognized that the PPDU including the corresponding frame is the PPDU transmitted to the AP MLD. The channel contention process may be a process of performing channel sensing in the corresponding extended link for an AIFS and a backoff time. The STA MLD may compare a transmission time point of a PPDU including a frame to be transmitted at a time point at which a channel contention process is completed in the extended link with a transmission end time point of a PPDU including a frame transmitted in a basic link. In this case, when it is determined that the transmission end time point of the PPDU to be transmitted is before the transmission end time point of the PPDU transmitted in the basic link, the corresponding frame may be transmitted in the extended link. In this case, the transmission end time point of the PPDU transmitted in the extended link and the transmission end time point of the PPDU transmitted in the basic link may be matched to each other. In this case, to match the end time points, a padding bit may be added to the PPDU including the frame. Alternatively, a padding bit may be added to the PPDU including the frame. In this case, when the frame received in the basic link does not requests transmission of a response frame, the AP MLD may transmit a random frame for the corresponding time. In this case, the random frame may be a frame which blocks transmission of an uplink frame by another terminal during the corresponding time. For example, the random frame may be a QoS null frame having the length corresponding to the length of the response frame transmitted in the extended link.

Meanwhile, with respect to the frame transmission operation in the extended link, only one frame exchange operation may be allowed. That is, a consecutive frame exchange operation through a TXOP acquisition process may not be allowed.

Meanwhile, when exceptionally, there is only one extended link in the STR unavailable link group and the frame transmitted in the basic link is a frame transmitted in another BSS, a TXOP may be acquired and maintained before the transmission end time point of the PPDU including the corresponding frame as follows.

Figure 35:
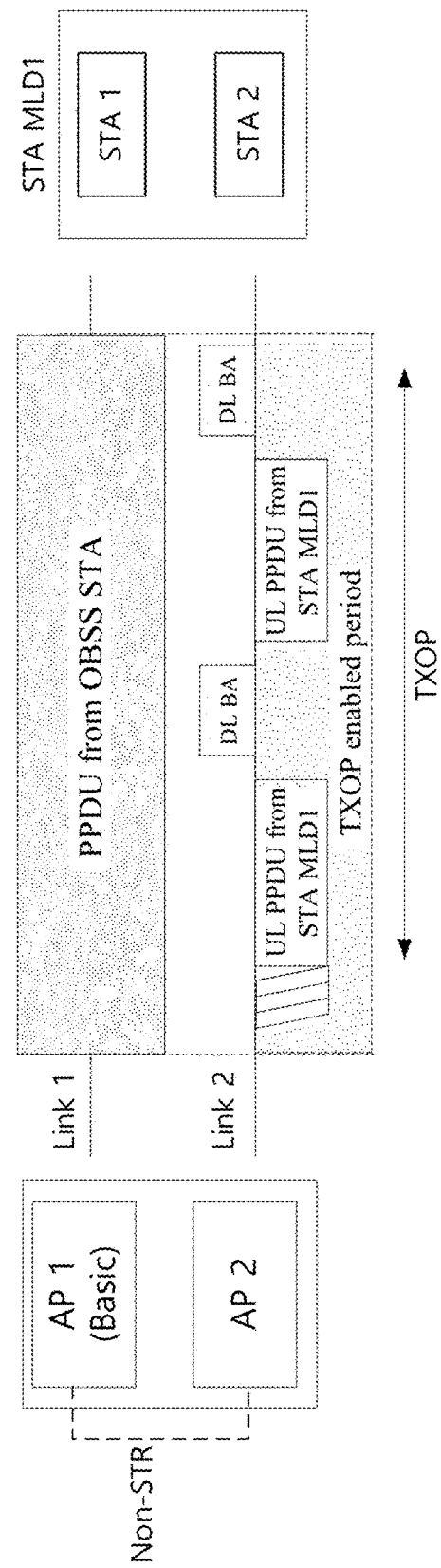
FIG. 35 is an eighth embodiment illustrating an operation of exceptionally performing a channel association and frame transmission operation in an extended link when an AP MLD cannot perform STR.

FIG. 35 is an eighth embodiment illustrating another example of an operation of exceptionally performing a channel association and frame transmission operation in an extended link when an AP MLD cannot perform STR. A description of the operation identical or similar to the operation described in FIG. 29 is omitted from FIG. 35.

Referring to FIG. 35, when there is only one basic link and one extended link in the STR unavailable link group and it is recognized that a terminal belonging to another BSS transmits a frame in the basic link, an STA MLD may perform a channel contention process for frame transmission in an extended link in the corresponding STR unavailable link group. For example, in a case where n link 1 and link 2 operated by an AP MLD correspond to an STR unavailable link group and link 1 is a basic link, when a frame transmitted by another BSS is recognized in link 1, the STA MLD may perform a channel access operation in link 2 for a transmission time of the PPDU including the corresponding frame. In this case, the STA MLD may recognize, through a transmission/reception address of the frame received in the basic link, that the frame is a frame transmitted by another BSS. For example, when a transmission address of the corresponding frame is not an address of the AP MLD and a BSSID field is also not a BSS ID of the AP in the corresponding link, it may be recognized that the frame is a frame transmitted from another BSS. In this case, the transmission end time of the PPDU may be identified through an L-SIG included in a preamble of the corresponding PPDU.

Alternatively, a reception terminal of the corresponding PPDU may be identified through a preamble in the PPDU including the corresponding frame. For example, when the PPDU including the corresponding frame is a HE PPDU or an EHT PPDU, whether the terminal transmitting the corresponding PPDU is a terminal belonging to another BSS may be identified through a corresponding PPDU BSS color field. That is, when the BSS color field indicates a BSS different from the basic link of the corresponding STA MLD, it may be determined that the corresponding PPDU is transmitted by a terminal belonging to another BSS. Alternatively, when the PPDU including the corresponding frame is a VHT PPDU, it may be identified through a group ID field and a partial AID field in the corresponding PPDU that the PPDU is a PPDU transmitted by another terminal. For example, when a group ID value of the corresponding PPDU is 0 and a partial AID is 0 but is not a partial AID obtained from a BSSID of the AP of the corresponding basic link, the corresponding PPDU may be determined as a PPDU transmitted from a terminal of another BSS.

When it is recognized, through an address field and a BSS ID field of the frame transmitted in the basic link or a preamble of the corresponding PPDU, that the corresponding PPDU is a PPDU transmitted by another BSS, a channel contention process for transmitting a frame in an extended link may be performed for a transmission time of the corresponding PPDU. For example, when an STA MLD recognizes a PPDU including a frame transmitted by a terminal of another BSS in link 1, the STA MLD may perform a channel contention process for a transmission time of the PPDU including the corresponding frame in link 2. After performing the channel contention process, the STA MLD may transmit the frame to an AP MLD by using the corresponding extended link. In this case, the frame may request multiple frame exchange procedures. The frame may acquire a TXOP having the length including the multiple frame exchange procedures. In this case, the TXOP end time point may be configured before the transmission end time point of the PPDU including the frame transmitted in the basic link. Meanwhile, when it is impossible to determine whether the frame or the PPDU transmitted in the basic link is transmitted by a terminal of another BSS, or when it is expected that the transmission end time point of the response frame and the frame transmitted after performing the channel contention process in the extended link is after the PPDU transmission end time point in the basic link, the STA MLD may not perform the frame in the corresponding extended link.

The AP MLD may recognize that a terminal belonging to another BSS is transmitting the frame in the basic link. In addition, the STA MLD may receive the frame transmitted using the extended link. The AP MLD may transmit a response frame to the frame received in the extended frame.

Meanwhile, the channel access procedure due to frame transmission in another BSS in the basic link in FIG. 35 may be performed when there are more than one extended link in the STR unavailable link group. In this case, with respect to the exceptional frame transmission operation, when performing channel access for the extended link in FIG. 24, the channel access operation may be performed in all extended links. In this case, the frame transmission in the STA MLD may be performed only when the channel content process is completed in all extended links in the STR unavailable link group and the simultaneous transmission operation can be performed as shown in FIG. 31(b).

Meanwhile, the AP MLD and the STA MLD may make configuration so that data corresponding to all traffic IDs (TIDs) is transmitted to all links after a negotiation process for a multi-link operation. In this case, the AP MLD and the STA MLD may make configuration so that data corresponding to a specific traffic ID (TID) is transmitted only in some links during the negotiation process for the multi-link operation or after the negotiation process for the multi-link operation. For example, data having a TID value corresponding to 1 may be configured to be transmitted in all links, and data having a TID value corresponding to 2 may be configured to be transmitted in some links only. That is, a specific TID may be mapped to be transmitted in some links only. In this case, when the AP MLD is an MLD which cannot perform an STR operation in some links, the TID may be configured to be transmitted in some links as follows.

Figure 36:
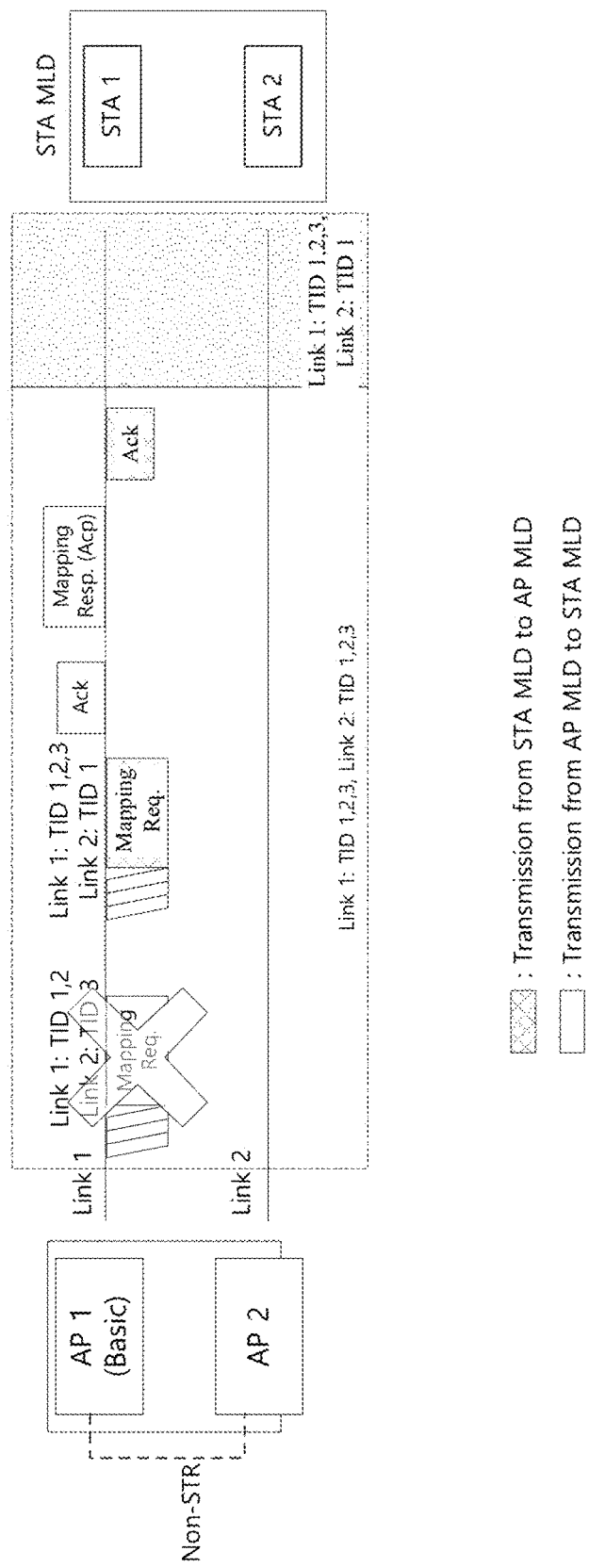
FIG. 36 is an embodiment illustrating a process of performing mapping so that a specific TID is transmitted in some links, by utilizing a concept of a basic link when an AP MLD cannot perform an STR operation.

FIG. 36 is an embodiment illustrating a process of performing mapping so that a specific TID is transmitted in some links, by utilizing a concept of a basic link when an AP MLD cannot perform an STR operation.

Referring to FIG. 36, when an AP MLD cannot perform an STR operation, the AP MLD may configure one link in an STR unavailable link group as a basic link. In this case, an STA MLD may perform a negotiation operation for multi-link use with the corresponding AP MLD as shown in FIG. 14. In this case, the STA MLD and the AP MLD may make configuration so that data of all traffic IDs (TIDs) is transmitted in all links. Alternatively, data of a TID may be configured to be transmitted in a specific link only. In this case, when the AP MLD cannot perform an STR operation in some or all links and a specific TID is to be mapped in an extended link in an STR unavailable link group, mapping needs to be performed so that the corresponding TID is also transmitted in the basic link of the corresponding STR unavailable link group. That is, the specific TID may not be configured to be transmitted only in an extended link in the STR unavailable link group.

For example, an AP MLD may be a link in which an STR operation cannot be performed. The AP MLD may configure link 1 as a basic link, among link 1 and link 2 in which the STR operation cannot be performed. In this case, in a case where the AP MLD and the STA MLD attempt to transmit data having a TID value corresponding to 1, 2, or 3 by utilizing a multi-link operation, when the AP MLD and the STA MLD do not perform a separate mapping process, data of all TIDs may be allowed to be transmitted in all links. In this case, to limit a link in which data of a specific TID can be transmitted, the STA MLD may transmit, to the AP MLD, a request frame for requesting mapping of the TID to a specific link. In this case, when the TID configured to be transmitted in an extended link is not configured, in the request frame, to be transmitted in the basic link in the corresponding STR unavailable link group, transmission of the corresponding frame may not be allowed. For example, in the request frame, configuration that data having TID values corresponding to 1 and 2 is transmitted in the basic link and data having a TID value corresponding 3 is transmitted in link 2 may fail to be configured in the request frame. Meanwhile, when the AP MLD receives the request frame from the STA MLD, the corresponding AP MLD may identify that data having a TID value corresponding to 3 is transmitted in the extended link but is not transmitted in the basic link. Accordingly, the AP MLD may transmit a response frame indicating rejection to the request.

Meanwhile, when the STA MLD attempts to map a specific TID to a specific link, a request can be made by making configuration so that a TID transmitted in the extended link is mapped to be transmitted in all basic links. For example, the STA MLD may request to transmit data having a TID value corresponding to 1, 2, or 3 in link 1 and transmit data having a TID value corresponding to 1 also in link 2. The AP MLD having received the request frame may receive a mapping request frame from the STA MLD. In this case, according to the contents included in the request frame, it may be identified that TID 1 mapped to link 2 corresponding to the extended link is also mapped to link 1 corresponding to the basic link. Accordingly, the AP MLD may transmit a response frame indicating acceptance of the request frame to the STA MLD.

Alternatively, the process mapping a specific TID may not be performed in the extended link. That is, the extended link may not be a link to which the TID is mapped. In this case, a process of making configuration so that a specific TID is transmitted in some links only may be performed for a basic link only.

Figure 37:
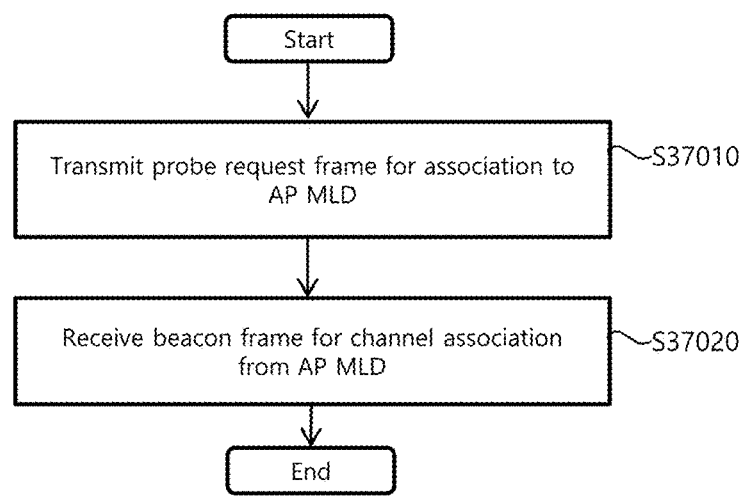
FIG. 37 is a flow chart illustrating an example of a method for channel association according to the present invention.

FIG. 37 is a flow chart illustrating an example of a method for channel association according to the present invention.

Referring to FIG. 37, a non-AP MLD may perform an operation for channel association with an AP MLD, and may transmit a frame for channel association through a specific link only.

Specifically, the non-AP MLD and the AP MLD may include multiple logical entities. In this case, the AP MLD may be an NSTR soft AP MLD, and for the AP MLD to operate as an NSTR soft AP MLD, the number of links supporting NSTR needs to be less than a predetermined number.

That is, the non-AP MLD may include multiple stations (STAs), and one of the multiple STAs constituting the non-AP MLD may form the basic link with one of multiple APs constituting the AP MLD.

STAs remaining after excluding the one of the multiple STAs constituting the non-AP MLD may form the at least one extended link with APs remaining after excluding the one of the multiple APs constituting the AP MLD.

The non-AP STA may transmit a probe request for channel association to the AP MLD.

The non-AP STA may receive a beacon frame for the association from the AP MLD (S37010). In this case, for the AP MLD, multiple links may be set up, and the multiple links may include one basic link and at least one extended link. In addition, the beacon frame may be transmitted or received through the basic link.

When the probe request frame is transmitted through the basic link, a probe response frame may be received through the basic link, as a response to the probe request frame (S37020).

In this case, the beacon frame and the response frame may be received only through the basic link except for the at least one extended link.

When the probe request frame is transmitted through the at least one extended link, the AP MLD may not transmit a probe response frame corresponding to a response to the probe request frame through the at least one extended link.

In this case, link information related to a link formed between the AP MLD and the non-AP MLD is received from the AP MLD, wherein the link information may include the number of the multiple links formed between the non-AP MLD and the AP MLD and a bitmap indicating whether each of the multiple links supports an STR operation.

The basic link and the at least one extended link may not support STR by the AP MLD.

In addition, the non-AP MLD may transmit an association request frame to the AP MLD, and the AP MLD may transmit an association response frame as a response to the association request frame. In this case, the association request frame and the association response frame may be transmitted through the basic link only, as described above.

Accordingly, when the non-AP MLD transmits the association request frame through a non-primary link corresponding to the extended link, rather than a primary link corresponding to the basic link, the AP MLD may not transmit the association response frame as a response thereto.

Thereafter, the non-AP MLD may transmit a physical layer protocol data unit (PPDU) to the AP MLD through the basic link and/or the at least one extended link which correspond to links that are set up. In this case, the non-AP MLD may transmit the PPDU through the extended link only when occupying the primary link. That is, transmission of the PPDU through the extended link may be dependent on the primary link. In addition, the non-AP MLD may configure transmission start time points of the PPDUS in the primary link and the extended link to be the same by using an offset, etc. That is, the transmission start time points of the PPDUs in the primary link and the at least one extended link may be identical.

The above-described method for configuring the transmission start time points of the PPDUs in the primary link and the at least one extended link to be the same may be applied the same to not only a method for transmitting a PPDU to the AP MLD by the non-AP MLD but also a method for transmitting a PPDU to the non-AP MLD by the AP MLD.

That is, when the AP MLD transmits a PPDU to the non-AP MLD through the basic link and the at least one extended link, the transmission start time points of the PPDUs transmitted through the basic link and the at least one extended link may be configured to be the same.

In addition, as described above, the link information may further include information such as a link ID, in addition to the information above.

In the embodiments of the present invention, the embodiment related to association (e.g., the embodiment of transmitting a beacon frame and a probe response frame in an association procedure and/or the embodiment of transmitting an association request frame and an association response frame) may be applied the same to a procedure related to reassociation.

For example, also in a case where a beacon frame, a probe request frame, and a probe response frame are transmitted or received for reassociation, the transmission or reception may be performed through a primary link only, and also in a case where a reassociation request frame and a reassociation response message are transmitted or received for reassociation, the transmission or reception of the frames may be performed through the primary link only.

The above-mentioned description of the present invention is for illustrative purposes, and it will be understood that those who skilled in the art to which the present invention belongs can easily modify the present invention in other specific forms, without altering the technical ideas or essential characteristics of the present invention. Therefore, it should be understood that the embodiments described above are illustrative and are not limited in all aspects. For example, each element described as a single entity may be distributed and implemented, and likewise, elements described as being distributed may also be implemented in a combined form.

The scope of the present invention is defined by the appended claims rather than the above detailed description, and all changes or modifications derived from the meaning and range of the appended claims and equivalents thereof should be interpreted as being included within the scope of the present invention.

The invention claimed is:

1. A non-access point multi-link device (non-AP MLD) configured to operate in a wireless communication system, the MLD comprising:
a communication module; and
a processor configured to control the communication module, wherein the processor is configured to:
transmit a probe request frame for association to an AP MLD, and
receive a beacon frame for the association from the AP MLD,
wherein multiple links are set up for the AP MLD, wherein the multiple links comprise i) a primary link and ii) one or more non-primary links, wherein the primary link and the one or more non-primary links operate as a non simultaneous transmit and receive (NSTR) link pair that does not support simultaneous transmission and reception,
wherein at least one traffic identifier (TID) among a plurality of TIDs is mapped to at least one non-primary link, which is enabled, among the one or more non-primary links, and
wherein all of the plurality of TIDs are mapped to the primary link.

2. The MLD of claim 1, wherein the processor is configured to receive a probe response frame as a response to the probe request frame through the primary link when the probe request frame is transmitted through the primary link.

3. The MLD of claim 2,
wherein the beacon frame and the probe response frame are received through only the primary link among the multiple links.

4. The MLD of claim 1,
wherein the non-AP MLD comprises multiple stations (STAs),
wherein one STA of the multiple STAs constituting the non-AP MLD sets up the primary link with one AP of multiple APs constituting the AP MLD, and
wherein STAs that do not include the one STA among the multiple STAs set up the one or more non-primary links with APs that do not include the one AP among the multiple APs.

5. The MLD of claim 1,
wherein when the AP MLD operates as an NSTR soft AP MLD, a number of the multiple links set up by the AP MLD is equal to or less than a specific number.

6. The MLD of claim 5, wherein the processor is configured to;
receive link information related to the multiple links set up between the AP MLD and the non-AP MLD from the AP MLD,
wherein the link information comprises at least one of i) the number of the multiple links set up between the non-AP MLD and the AP MLD and ii) a bitmap indicating whether each of the multiple links supports an STR operation.

7. The MLD of claim 1, wherein the processor is configured to transmit PPDUs to the AP MLD through the primary link and the at least one non-primary link, wherein transmission start time points of the PPDUs in the primary link and the at least one non-primary link are identical.

8. A method for performing association by a non-access point multi-link device (non-AP MLD) in a wireless communication system, the method comprising:

transmitting a probe request frame for association to an AP MLD; and receiving a beacon frame for the association from the AP MLD, wherein multiple links are set up for the AP MLD, wherein the multiple links comprise i) a primary link and ii) one or more non-primary links, wherein the primary link and the one or more non-primary links operate as a non simultaneous transmit and receive (NSTR) link pair that does not support simultaneous transmission and reception, wherein at least one traffic identifier (TID) among a plurality of TIDs is mapped to at least one non-primary link, which is enabled, among the one or more non-primary links, and wherein all of the plurality of TIDs are mapped to the primary link.

9. The method of claim 8, further comprising receiving a probe response frame as a response to the probe request frame through the primary link when the probe request frame is transmitted through the primary link.

10. The method of claim 9, wherein the beacon frame and the probe response frame are received through only the primary link among the multiple links.

11. The method of claim 8, wherein the non-AP MLD comprises multiple stations (STAs), wherein one STA of the multiple STAs constituting the non-AP MLD sets up the primary link with one AP of multiple APs constituting the AP MLD, and wherein STAs that do not include the one STA among the multiple STAs set up the one or more non-primary links with APs that do not include the one AP among the multiple APs.

12. The method of claim 8, wherein when the AP MLD operates as an NSTR soft AP MLD, a number of the multiple links set up by the AP MLD is equal to or less than a specific number.

13. The method of claim 12, further comprising:

receiving link information related to the multiple links set up between the AP MLD and the non-AP MLD from the AP MLD, wherein the link information comprises at least one of i) the number of the multiple links set up between the non-AP MLD and the AP MLD and ii) a bitmap indicating whether each of the multiple links supports an STR operation.

14. The method of claim 8, further comprising:

transmitting PPDUs to the AP MLD through the primary link and the at least one non-primary link, wherein transmission start time points of the PPDUs in the primary link and the at least one non-primary link are identical.

\* \* \* \* \*